United States Patent
Yokokawa et al.

(10) Patent No.: US 10,999,562 B2
(45) Date of Patent: May 4, 2021

(54) IMAGE PROCESSING DEVICE, IMAGE PROCESSING METHOD AND IMAGING DEVICE CAPABLE OF PERFORMING PARALLAX COMPENSATION FOR CAPTURED COLOR IMAGE

(71) Applicant: SONY CORPORATION, Tokyo (JP)

(72) Inventors: Masatoshi Yokokawa, Kanagawa (JP); Masashi Uchida, Tokyo (JP); Takahiro Nagano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/488,787

(22) PCT Filed: Jan. 11, 2018

(86) PCT No.: PCT/JP2018/000464
§ 371 (c)(1),
(2) Date: Aug. 26, 2019

(87) PCT Pub. No.: WO2018/179671
PCT Pub. Date: Oct. 4, 2018

(65) Prior Publication Data
US 2020/0112705 A1 Apr. 9, 2020

(30) Foreign Application Priority Data
Mar. 27, 2017 (JP) .............................. JP2017-060694

(51) Int. Cl.
*H04N 9/09* (2006.01)
*H04N 9/04* (2006.01)
*H04N 9/64* (2006.01)

(52) U.S. Cl.
CPC ........... *H04N 9/09* (2013.01); *H04N 9/04515* (2018.08); *H04N 9/646* (2013.01)

(58) Field of Classification Search
CPC ...... H04N 9/09; H04N 9/04515; H04N 9/646; H04N 2013/0088; H04N 13/25; H04N 9/093; H04N 5/2258
See application file for complete search history.

(56) References Cited

U.S. PATENT DOCUMENTS

| 5,825,915 | A | * | 10/1998 | Michimoto | ............. G06T 7/593 382/154 |
| 6,163,337 | A | * | 12/2000 | Azuma | ................... G06T 15/10 348/43 |

(Continued)

FOREIGN PATENT DOCUMENTS

| JP | 2011-151798 A | 8/2011 |
| JP | 2011-239259 A | 11/2011 |

(Continued)

OTHER PUBLICATIONS

Mar. 24, 2020, European Search Report issued for related EP Application No. 18776730.6.

*Primary Examiner* — Luong T Nguyen
(74) *Attorney, Agent, or Firm* — Paratus Law Group, PLLC

(57) ABSTRACT

On the basis of a first imaging signal corresponding to a first viewpoint and including white pixels and color component pixels and a second imaging signal corresponding to a second viewpoint different from the first viewpoint and including fewer white pixels than the first imaging signal to increase a rate of the color component pixels in the second imaging signal, a parallax detecting section detects a parallax of the second viewpoint with respect to the first viewpoint. A parallax compensating section performs parallax compensation for the imaging signal for the second viewpoint on the basis of the detected parallax to generate a parallax-compensated color difference signal for the first viewpoint. A fallback determining section and a signal (Continued)

selecting section selects a parallax-compensated second color difference signal or a color difference signal for the first viewpoint to obtain a high-sensitivity captured image while suppressing degradation of the image quality performance.

19 Claims, 37 Drawing Sheets

(56) References Cited

U.S. PATENT DOCUMENTS

| | | | |
|---|---|---|---|
| 8,890,942 | B2 | 11/2014 | Ogasahara et al. |
| 9,055,181 | B2 * | 6/2015 | Ogasahara ............... H04N 9/09 |
| 9,509,971 | B2 * | 11/2016 | Sutou ................... H04N 13/128 |
| 2012/0188409 | A1 | 7/2012 | Gallagher et al. |
| 2013/0033575 | A1 * | 2/2013 | Kobayashi ........... H04N 13/261 |
| | | | 348/46 |
| 2013/0229544 | A1 | 9/2013 | Bando |
| 2016/0309084 | A1 * | 10/2016 | Venkataraman ... H04N 5/23293 |

FOREIGN PATENT DOCUMENTS

| | | |
|---|---|---|
| JP | 2013-183353 A | 9/2013 |
| JP | 2013-219525 A | 10/2013 |
| JP | 2015-088824 A | 5/2015 |

* cited by examiner

FIG. 1
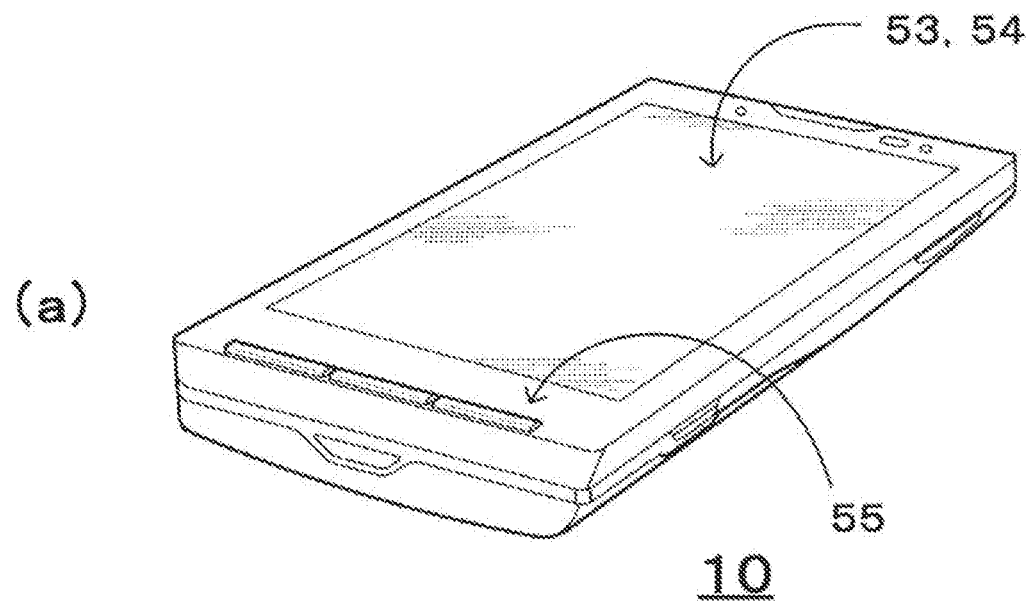
(a)
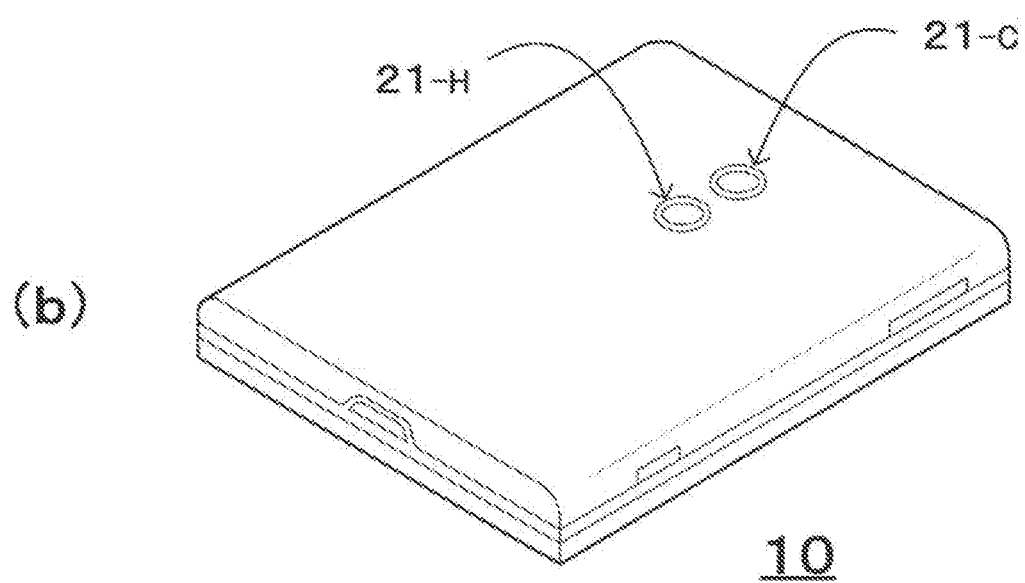
(b)

FIG. 5
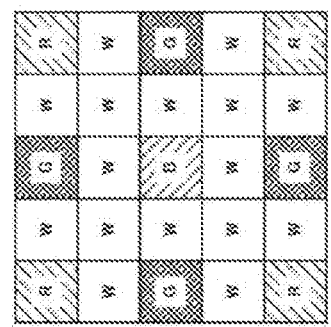
(d)
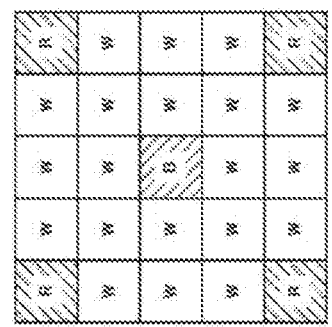
(c)
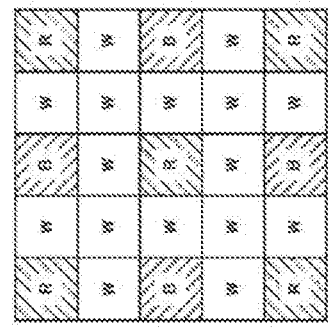
(b)
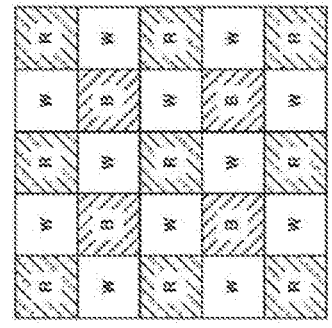
(a)

IMAGE PROCESSING DEVICE, IMAGE PROCESSING METHOD AND IMAGING DEVICE CAPABLE OF PERFORMING PARALLAX COMPENSATION FOR CAPTURED COLOR IMAGE

CROSS REFERENCE TO PRIOR APPLICATION

This application is a National Stage Patent Application of PCT International Patent Application No. PCT/JP2018/000464 (filed on Jan. 11, 2018) under 35 U.S.C. § 371, which claims priority to Japanese Patent Application No. 2017-060694 (filed on Mar. 27, 2017), which are all hereby incorporated by reference in their entirety.

TECHNICAL FIELD

The present technology relates to an image processing device, an image processing method, and an imaging device, and uses captured images acquired by a plurality of imaging sections to obtain high-sensitivity captured images while suppressing degradation of image quality performance.

BACKGROUND ART

In related art, in portable electronic devices, for example, information processing terminals such as smartphones, an imaging section provides degraded image quality compared to a single-lens reflex camera due to a reduced size and thickness of the information processing terminal. Thus, for example, as described in PTL 1, an information processing terminal is supplied, by radio communication, with a captured image generated by a camera that can be installed in and removed from the information processing terminal. In addition, PTL 2 discloses that a plurality of imaging sections are provided to simultaneously generate a plurality of images with different levels of image quality, for example, an image with a first angle of view and an image with a second angle of view smaller than the first angle of view.

CITATION LIST

Patent Literature

[PTL 1]
 Japanese Patent Laid-Open No. 2015-088824
[PTL 2]
 Japanese Patent Laid-Open No. 2013-219525

SUMMARY

Technical Problems

Additionally, the removable camera has a larger size than the imaging section of the information processing terminal, and in a case where the removable camera is utilized, communication needs to be established between the removable camera and the information processing terminal. Thus, operations for obtaining favorable captured images are complicated, leading to degraded portability. In addition, even with the plurality of imaging sections, acquirable images correspond to the capabilities of respective imaging sections.

Thus, an object of the present technology is to provide an image processing device, an image processing method, and an imaging device in which captured images acquired by a plurality of imaging sections can be used to obtain high-sensitivity captured images while suppressing degradation of image quality performance.

Solution to Problems

A first aspect of the present technology is an image processing device including: a parallax detecting section detecting, on the basis of a first imaging signal for a first viewpoint and a second imaging signal for a second viewpoint different from the first viewpoint, a parallax of the second viewpoint with respect to the first viewpoint, and an image generating section generating a color image using the first imaging signal and a parallax-compensated second imaging signal resulting from parallax compensation for the second imaging signal based on the parallax detected by the parallax detecting section, in which the first imaging signal includes white pixels and color component pixels, and the second imaging signal includes fewer white pixels and more color component pixels than the first imaging signal.

In the present technology, the parallax detecting section, for example, detects the parallax of the second viewpoint with respect to the first viewpoint on the basis of the first imaging signal corresponding to the first viewpoint and including, within a 2×2-pixel block, white pixels equal or larger in number to or than color component pixels and the second imaging signal corresponding to the second viewpoint different from the first viewpoint and including fewer white pixels than the first imaging signal to increase the number of the color component pixels in the second imaging signal. The image generating section performs parallax compensation for the second imaging signal on the basis of the parallax detected by the parallax detecting section to generate a parallax-compensated second imaging signal. The image generating section uses the first imaging signal and the parallax-compensated second imaging signal to generate the color image in a case where a predetermined condition is satisfied, that is, in a case where a risk that the color image generated using the first imaging signal and the parallax-compensated second imaging signal has degraded image quality performance compared to the color image generated from the first imaging signal is lower than a threshold, and generates the color image from the first imaging signal in a case where the predetermined condition is not satisfied. The image generating section, for example, determines the risk of degradation of the image quality performance on the basis of the first imaging signal and the parallax-compensated second imaging signal, and synthesizes the first imaging signal with the parallax-compensated second imaging signal in a synthesis ratio corresponding to the determined risk to generate a color image.

In addition, the image generating section generates a first luminance signal and a first color signal from the first imaging signal, generates a second luminance signal and a second color signal from the second imaging signal, generates a parallax-compensated second color signal on the basis of the second color signal and the parallax detected by the parallax detecting section, and selects one of the first color signal and the parallax-compensated second color signal or synthesizes the first color signal and the parallax-compensated second color signal, in accordance with a risk that the color image generated using the parallax-compensated second imaging signal has degraded image quality performance compared to the color image generated from the first imaging signal. In addition, in accordance with the risk, the image generating section selects one of the first color signal and the parallax-compensated second color signal in captured image units or synthesizes the first color signal and the parallax-compensated second color signal in pixel units.

The parallax detecting section performs parallax detection using the first luminance signal and the second luminance signal, or the first luminance signal, the second luminance signal, the first color signal, and the second color signal. In addition, the image processing device includes a parallax detection control section performing frequency detection on the basis of the first imaging signal and controlling the parallax detecting section in accordance with a detection result, the parallax detecting section performs parallax detection using a cost value calculated on the basis of the first luminance signal and the second luminance signal and a cost value calculated on the basis of the first color signal and the second color signal, and the parallax detection control section causes the parallax detection to be performed on the basis of an integrated cost value resulting from integration of the two cost values in a synthesis ratio corresponding to the frequency detection result.

In addition, the image generating section performs frequency detection on the basis of the first luminance signal and executes image quality improvement processing on the first color signal in accordance with the frequency detection result. In addition, the image generating section performs parallax compensation for the second luminance signal to generate a parallax-compensated second luminance signal, and synthesizes the first luminance signal with the parallax-compensated second luminance signal to improve image quality of the first luminance signal. For example, a luminance image quality improving section sets a synthesis ratio between the first luminance signal and the parallax-compensated second luminance signal in accordance with a noise intensity of an imaging section generating the first luminance signal.

In addition, the image generating section generates the first color signal by interpolation processing for a white pixel signal in the first imaging signal, demosaic processing using a pixel signal for the color component pixels and the white pixel signal resulting from the interpolation processing, and color space conversion on the signal resulting from the demosaic processing. For example, the image generating section uses a color ratio based on the white pixel signal resulting from the interpolation processing and the pixel signal for color component pixels and the white pixel signal for a processing target pixel, to generate a pixel signal for each color component of the processing target pixel. In addition, the image generating section executes the interpolation processing for the white pixel signal in the first imaging signal to generate a first luminance signal, and the parallax detecting section performs parallax detection using the first imaging signal generated by the signal generating section by the interpolation processing for the white pixel signal.

A second aspect of the present technology is an image processing method including: on the basis of a first imaging signal corresponding to a first viewpoint and including white pixels and color component pixels and a second imaging signal corresponding to a second viewpoint different from the first viewpoint and including fewer white pixels than the first imaging signal to increase a rate of the color component pixels in the second imaging signal, detecting, in a parallax detecting section, a parallax of the second viewpoint with respect to the first viewpoint, and generating a color image in an image generating section using the first imaging signal and a parallax-compensated second imaging signal resulting from parallax compensation based on the parallax detected by the parallax detecting section.

A third aspect of the present technology is an imaging device including: a first imaging section generating a first imaging signal corresponding to a first viewpoint and including white pixels and color component pixels, a second imaging section generating a second imaging signal corresponding to a second viewpoint different from the first viewpoint and including fewer white pixels than the first imaging section to increase a rate of the color component pixels in the second imaging signal, a parallax detecting section detecting a parallax of the second viewpoint with respect to the first viewpoint on the basis of the first imaging signal and the second imaging signal, and an image generating section generating a color image using the first imaging signal and a parallax-compensated second imaging signal resulting from parallax compensation based on the parallax detected by the parallax detecting section.

Advantageous Effects of Invention

According to the present technology, the parallax detecting section detects the parallax of the second viewpoint with respect to the first viewpoint on the basis of the first imaging signal for the first viewpoint and the second imaging signal for the second viewpoint different from the first viewpoint. In addition, the image generating section generates a color image using the first imaging signal and the parallax-compensated second imaging signal resulting from the parallax compensation based on the parallax detected by the parallax detecting section. Furthermore, the first imaging signal includes the white pixels and the color component pixels, and the second imaging signal includes fewer white pixels than the first imaging signal to increase the number of color component pixels in the second imaging signal. Accordingly, the second imaging signal is fused to the first imaging signal with reference to the first imaging signal including more white pixels than the second imaging signal, allowing a high-sensitivity captured image to be obtained while suppressing degradation of image quality performance. Note that effects described herein are only illustrative and not restrictive and that additional effects may be produced.

BRIEF DESCRIPTION OF DRAWINGS

FIG. 1 is a diagram illustrating appearance of a device to which an imaging device is applied.

FIG. 5 is a diagram illustrating a pixel configuration of an imaging section 21-H.

DESCRIPTION OF EMBODIMENTS

Figure 2:
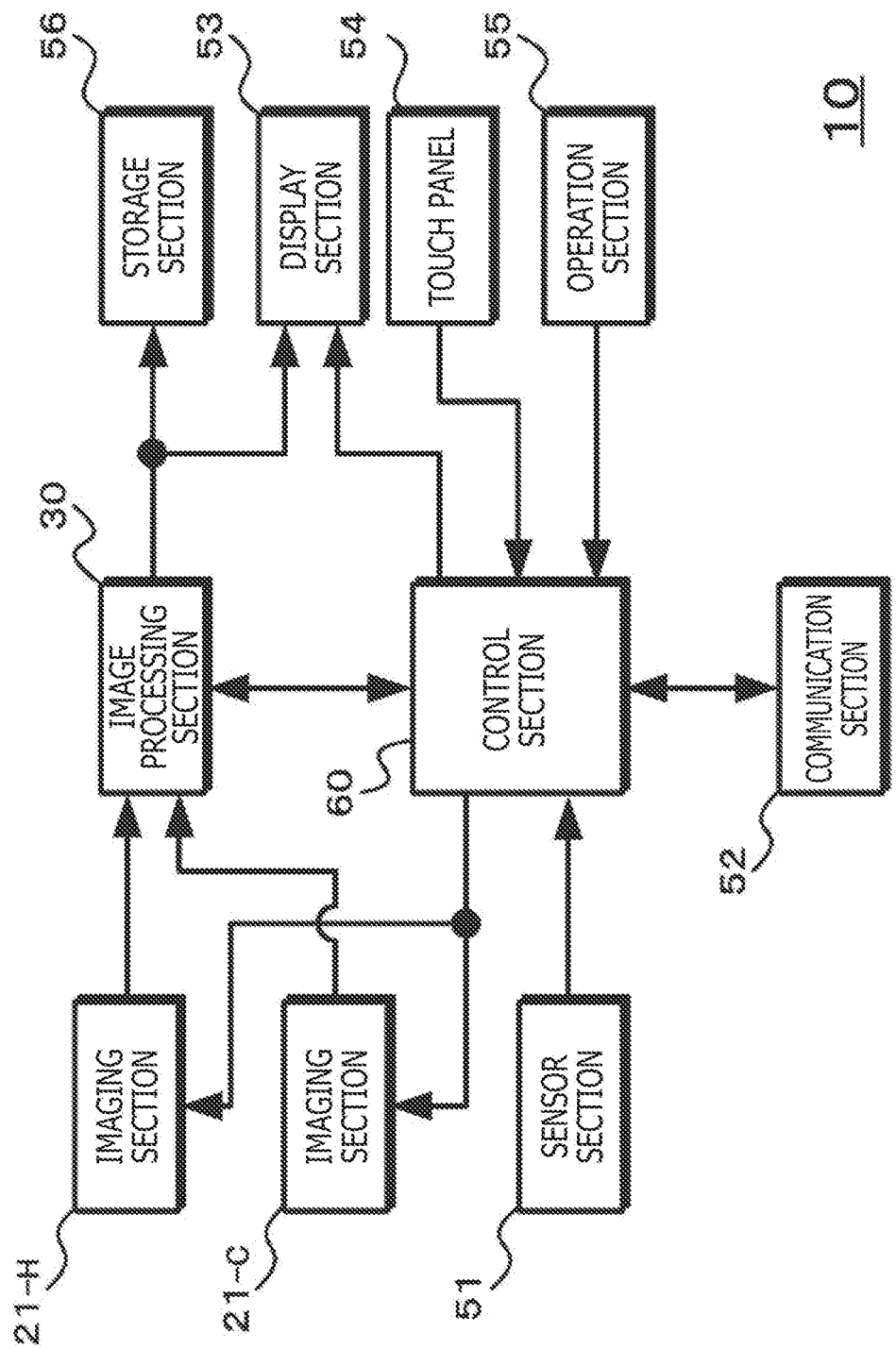
FIG. 2 is a diagram illustrating a configuration of an information processing terminal.

Embodiments of the present technology will be described below. Note that the description is in the following order.

1. Configuration of device to which image processing device is applied
2. Outline of image processing
3. First Embodiment
4. Second Embodiment
5. Third Embodiment
6. Fourth Embodiment
7. Fifth Embodiment
8. Sixth Embodiment
9. Seventh Embodiment
10. Eighth Embodiment
11. Ninth Embodiment
12. Tenth Embodiment
13. Applied example 1. Configuration of Device to which Image Processing Device is Applied FIG. 1 illustrates appearance of a device to which an imaging device of the present technology is applied. Note that, in the following description, the imaging device is applied, for example, to an information processing terminal. (a) in FIG. 1 depicts a front side of an information processing terminal 10, and a display section 53 and an operation section 55 are provided on the front side. (b) in FIG. 1 depicts a back side of the information processing terminal 10, and a plurality of imaging sections, for example, two imaging sections 21-BW and 21-CR, are provided on the back side.

FIG. 2 illustrates a configuration of the information processing terminal. The information processing terminal 10 includes a plurality of imaging sections, for example, two imaging sections 21-H and 21-C, an image processing section 30, a sensor section 51, a communication section 52, a display section 53, a touch panel 54, an operation section 55, a storage section 56, and a control section 60. The imaging sections 21-H and 21-C and the image processing section 30 are functional blocks constituting an imaging device of the present technology, and the image processing section 30 corresponds to an image processing device of the present technology.

The imaging sections 21-H and 21-C are provided on the same surface of the information processing terminal 10 as depicted in (b) in FIG. 1. The imaging sections 21-H and 21-C are configured using imaging elements such as CMOS (Complementary Metal Oxide Semiconductor) image sensors, and perform photoelectric conversion on light captured by a lens (not depicted) to generate image data of a captured image, and outputs the image data to the image processing section 30.

The image processing section 30 uses captured images acquired by the imaging section 21-H and the imaging section 21-C to obtain a high-sensitivity captured image while suppressing degradation of image quality performance. That is, the image generating section 30 executes image processing using captured images acquired by the imaging section 21-H and the imaging section 21-C to generate a high-sensitivity captured image while inhibiting the image quality performance from being degraded compared to the image quality performance of each of the captured images individually acquired by the imaging section 21-H and the imaging section 21-C. The image processing section 30 outputs the captured image to the display section 53 and the storage section 56. Note that details of configuration and operations of the image processing section 30 will be described below.

The sensor section 51 is configured using a gyro sensor or the like and detects vibration occurring in the information processing terminal 10. The sensor section 51 outputs information about the detected vibration to the control section 60.

The communication section 52 communicates with devices on a network such as a LAN (Local Area Network) or the Internet.

The display section 53 displays a captured image on the basis of image data supplied from the image processing section 30 and displays a menu screen and various application screens on the basis of information signals from the control section 60. In addition, the touch panel 54 is placed on a display surface side of the display section 53 and configured to allow a GUI function to be utilized.

The operation section 55 is configured using operation switches and the like and generates and outputs an operation signal corresponding to a user operation to the control section 60.

The storage section 56 stores information generated by the information processing terminal 10, for example, image data supplied from the image processing section 30, and various information used by the information processing terminal 10 for communication and execution of applications.

The control section 60 is constituted of a CPU (Central Processing Unit), a ROM (Read Only Memory), a RAM (Random Access Memory) (not depicted), and the like. The control section 60 executes a program stored in the ROM or the RAM to control operations of each section to cause the information processing terminal 10 to perform an operation corresponding to a user operation on the touch panel 54 or the operation section 55.

Note that the information processing terminal 10 is not limited to the configuration depicted in FIG. 2 but may be provided with, for example, an encoding processing section for encoding image data and storing the encoded image data in the storage section 56 and a resolution converting section matching the image data with the resolution of the display section.

2. Outline of Image Processing

Figure 3:
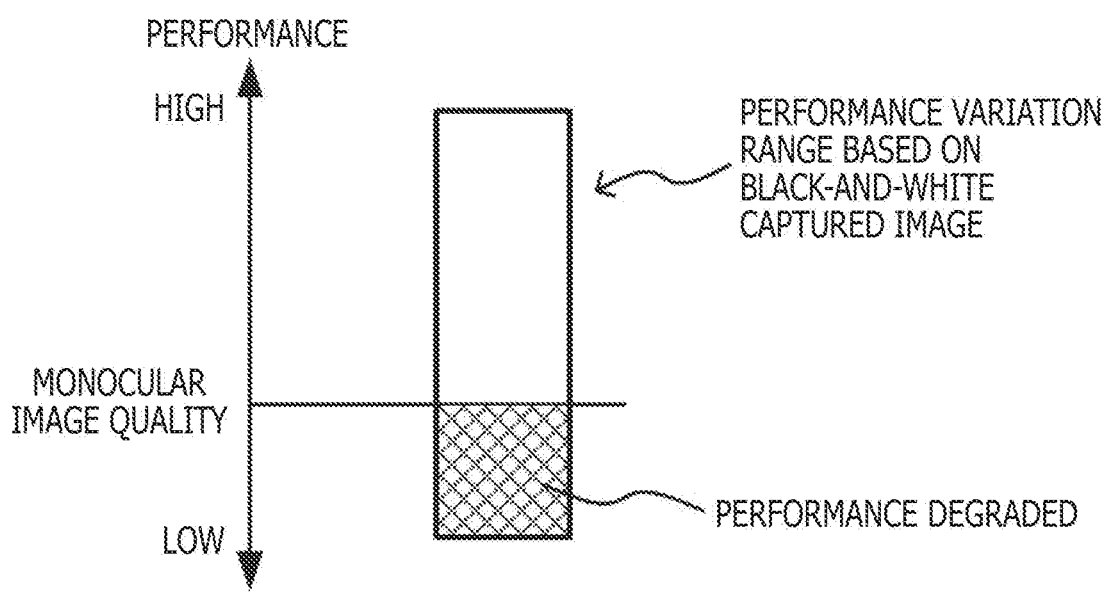
FIG. 3 is a diagram illustrating image quality obtained by fusion processing.
Figure 4:
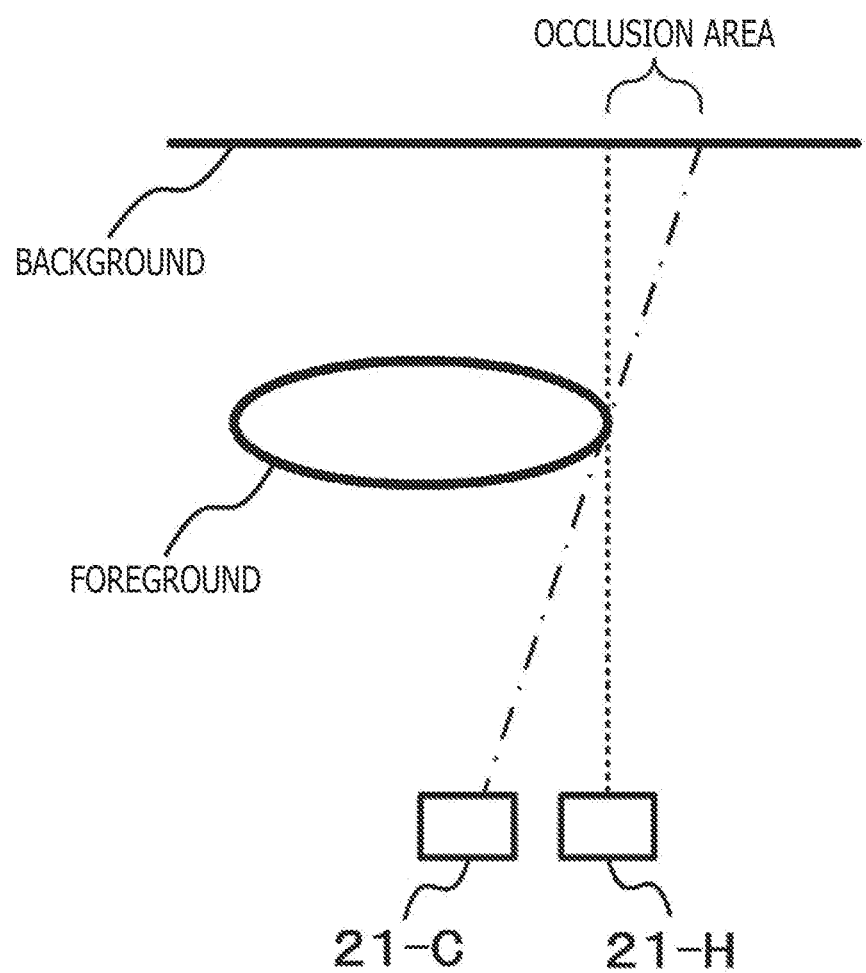
FIG. 4 is a diagram depicting occlusion.

The image processing section 30 executes fusion processing using captured images acquired by the imaging section 21-H and the imaging section 21-C. FIG. 3 is a diagram illustrating image quality obtained by fusion processing. For example, in a case where a black-and-white captured image is acquired by the imaging section 21-H and a color captured image is acquired by the imaging section 21-C, a high-sensitivity fusion image can be generated by using color information obtained by executing fusion processing based on the black-and-white image to perform parallax compensation for the color captured image on the basis of the viewpoint of the black-and-white captured image. Thus, image quality performance can be improved compared to monocular image quality (image quality obtained in a case where only the imaging section 21-C is used). However, the imaging section 21-H and the imaging section 21-C use different viewpoints, and thus, a low parallax detection accuracy leads to a high risk of color shift or missing. The color shift or missing may degrade the image quality performance below the monocular image quality (image quality obtained in a case where only the imaging section 21-C is used). In addition, the fusion processing based on the black-and-white captured image leads to color missing due to occlusion. FIG. 4 depicts occlusion. In a case where occlusion results from the parallax between the imaging section 21-H and the imaging section 21-C, the color captured image acquired by the imaging section 21-C lacks color information corresponding to an occlusion area. Thus, a fusion image generated by the fusion processing lacks colors in the occlusion area, resulting in degraded image quality performance.

Thus, in the present technology, the imaging section 21-H generate a first imaging signal for a first viewpoint as a configuration including white pixels and color component pixels. In addition, the imaging section 21-C generates a second imaging signal for a second viewpoint different from the first viewpoint by including fewer white pixels in the second imaging signal than the imaging section 21-H to increase the rate of the color component pixels in the second imaging signal. That is, the imaging section 21-H generates a first imaging signal having a higher sensitivity than the imaging section 21-C, and the imaging section 21-C generates a second imaging signal having a higher color resolution than the imaging section 21-H. Furthermore, the imaging section 21-H includes color component pixels and has a lower color resolution than the imaging section 21-C. However, the imaging section 21-H generates a color component image similarly to the imaging section 21-C, and selects one of a color component signal generated from the first imaging signal acquired by the imaging section 21-H and a parallax-compensated color signal generated from the second imaging signal acquired by the imaging section 21-C or synthesizes (blends) the color component signal and the parallax-compensated color signal, in accordance with a risk of degradation of the image quality performance such as the color shift or missing resulting from a parallax difference. The imaging section 21-H thus generates a fusion image with high image quality performance.

Figure 6:
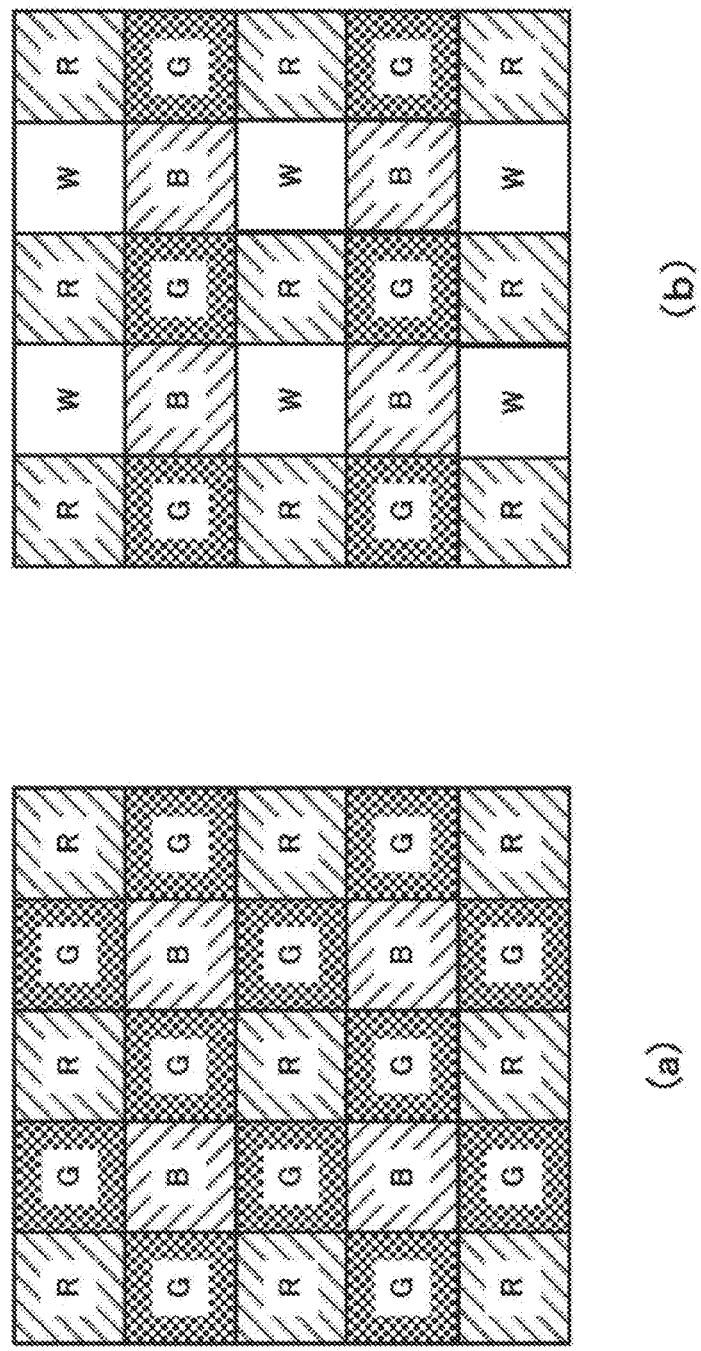
FIG. 6 is a diagram illustrating a pixel configuration of an imaging section 21-c.

FIG. 5 illustrates a pixel configuration of the imaging section 21-H. Note that, in FIG. 5 and FIG. 6 illustrate a 5×5-pixel area that is a partial area of an imaging area. (a) in FIG. 5 illustrates a case where a 2×2-pixel block is constituted of a red pixel (R), a blue pixel (B), and two white pixels (W). In addition, (b) in FIG. 5 illustrates a case where a 2×2-pixel block is constituted of a red pixel (R) or a blue pixel (B) and three white pixels (W). (c) in FIG. 5 illustrates a case where 2×2-pixel blocks each constituted of a red pixel (R) or a blue pixel (B) and three white pixels (W) and 2×2-pixel blocks each constituted of four white pixels (W) are alternately provided in a vertical direction or a horizontal direction. Furthermore, (d) in FIG. 5 illustrates a case where a 2×2-pixel block is constituted of any one of a red pixel (R), a blue pixel (B), and a green pixel (G), and three white pixels (W). Note that (a) to (c) in FIG. 5 are provided with no green pixel (G) and that a green image is thus generated using a luminance image, a red image, and a blue image generated by demosaic processing as described below.

FIG. 6 illustrates a pixel configuration of the imaging section 21-C. (a) in FIG. 6 illustrates a case where three-primary-color pixels including red pixels (R), blue pixels (B), and green pixels (G) are provided in a Bayer array. In addition, (b) in FIG. 6 illustrates a case where a 2×2-pixel block is constituted of three-primary-color pixels of a red pixel (R), a blue pixel (B), and a green pixel (G), and a white pixel (W) provided with no color filter.

In addition, the pixels for each color in the imaging section 21-H need not be identical to the pixels for each color in the imaging section 21-C so long as a spectral sensitivity difference is smaller than a predetermined value. In addition, the pixel configurations of the imaging section 21-H and the imaging section 21-C are not limited to the pixel configurations depicted in FIG. 5 and FIG. 6. For example, the present embodiment is not limited to a case where primary color filters are used as color filters, and complementary filters may be used. In addition, the color array is not limited to the Bayer array, and may be any other color array such as a striped array or a mosaic array.

The image processing section 30 uses a parallax detecting section to detect a parallax of the second viewpoint with respect to the first viewpoint on the basis of the above-described first imaging signal and second imaging signal. In addition, the image processing section 30 allows an image processing section to generate a color image using the first imaging signal and a parallax-compensated second imaging signal resulting from parallax compensation based on the parallax detected by the parallax detecting section. The image generating section generates a color image using the first imaging signal and the parallax-compensated second imaging signal in a case where a predetermined condition is satisfied, that is, in a case where a risk that the color image generated using the first imaging signal and the parallax-compensated second imaging signal has degraded image quality performance compared to the color image generated from the first imaging signal is lower than a threshold, and generates a color image from the first imaging signal in a case where the predetermined condition is not satisfied. For example, the image processing section 30 generates a first luminance signal and a first color signal from the first imaging signal, generates a second luminance signal and a second color signal from the second imaging signal, generates a parallax-compensated second color signal on the basis of the second color signal and the parallax detected by the parallax detecting section, and for example, selects one of the first color signal and the parallax-compensated second color signal or synthesizes the first color signal and the parallax-compensated second color signal, in accordance with the risk that the color image generated using the parallax-compensated second imaging signal has degraded lower image quality performance compared to the color image generated from the first imaging signal. In addition, the first luminance signal or the first luminance signal with image quality improved using the second luminance signal is used as a luminance signal for the color image.

The image processing section 30 executes such fusion processing to allow display or recording of a captured image having higher image quality performance than a captured image acquired by the imaging section 21-H or the imaging section 21-C. In the description of the embodiment below, a luminance signal and a color difference signal are generated from the first imaging signal generated by the imaging section 21-H, a luminance signal and a color difference signal are generated from the second imaging signal generated by the imaging section 21-C, and the fusion processing based on the viewpoint of the imaging section 21-H is executed using the color difference signal or the color difference signal and the luminance signal.

3. First Embodiment

Figure 7:
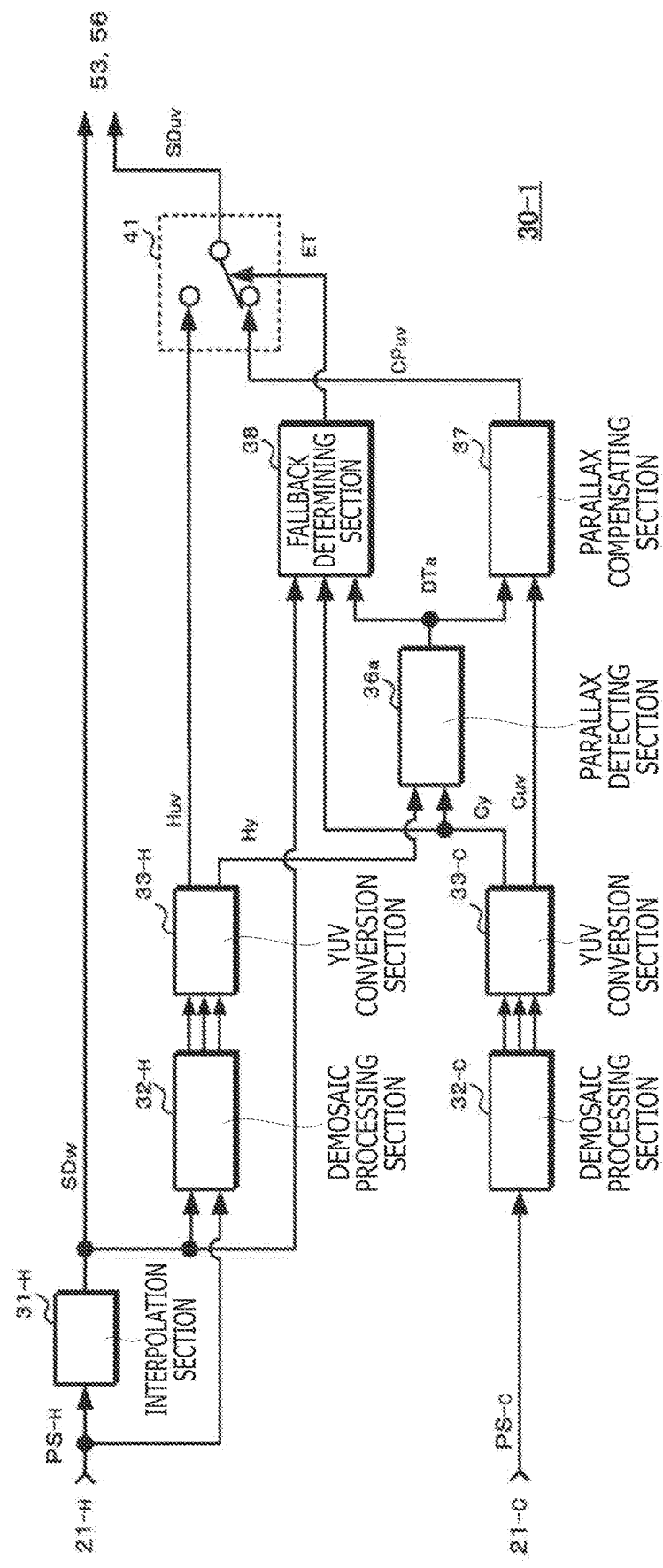
FIG. 7 is a diagram illustrating a configuration of a first embodiment of an image processing section.

Now, a first embodiment of the image processing section will be described. FIG. 7 illustrates a configuration of the first embodiment of the image processing section. An image processing section 30-1 includes an interpolation section 31-H, a demosaic processing section 32-H, a YUV converting section 33-H, a demosaic processing section 32-C, a YUV converting section 33-C, a parallax detecting section 36a, a parallax compensating section 37, a fallback determining section 38, and a signal selecting section 41.

An imaging signal PS-H output from the imaging section 21-H is input to the interpolation section 31-H and the demosaic processing section 32-H. In addition, an imaging signal PS-C output from the imaging section 21-C is input to the demosaic processing section 32-C.

Figure 8:
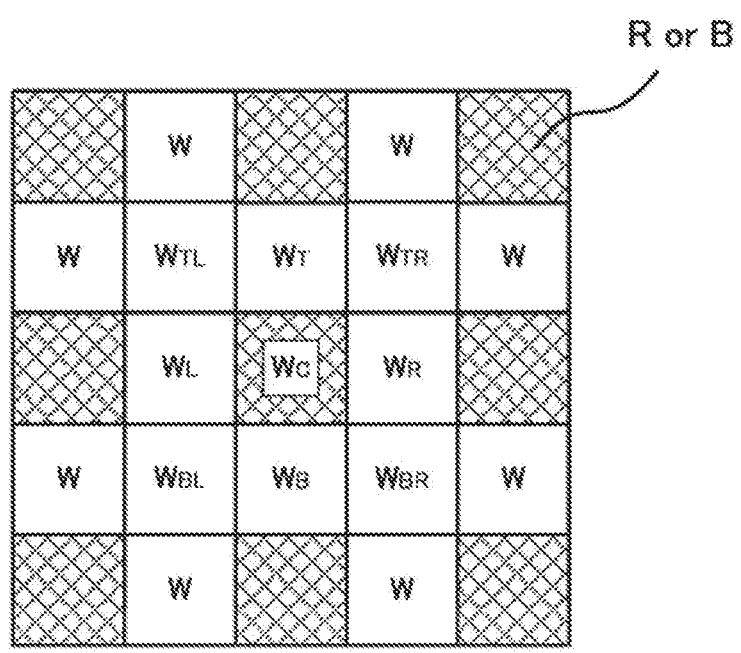
FIG. 8 is a diagram illustrating operations of an interpolation section.

The interpolation section 31-H uses the imaging signal PS-H to execute interpolation processing on white pixels to generate an image signal (hereinafter referred to as a "luminance signal") SDw for a luminance image. FIG. 8 is a diagram illustrating operations of the interpolation section, and in the description below, the imaging section 21-H, for example, executes interpolation processing to calculate a pixel value for each white pixel WC at the position of a red pixel or a blue pixel in the pixel configuration depicted in (b) in FIG. 6.

In the interpolation processing, for example, a calculation in Math (1) is executed using pixel values for an upper white pixel, a lower white pixel, a right white pixel, and a left white pixel to calculate a pixel value $DW_C$ for the white pixel $W_C$. Note that a pixel value for a white pixel $W_T$ located adjacent to and above the white pixel $W_C$ is denoted as $DW_T$, a pixel value for a white pixel $W_B$ located adjacent to and below the white pixel $W_C$ is denoted as $DW_B$, a pixel value for a white pixel $W_R$ located adjacent to and to the right of the white pixel $W_C$ is denoted as $DW_R$, and a pixel value for a white pixel $W_L$ located adjacent to and to the left of the white pixel $W_C$ is denoted as $DW_L$.

$$DW_C = \tfrac{1}{4}(DW_T + DW_B + DW_L + DW_R) \quad (1)$$

In addition, in the interpolation processing, an interpolation cost value may be calculated for each direction, and a pixel value for an interpolation pixel involving a minimum interpolation cost value may be determined to be a pixel value for the white pixel $W_C$. Math (2) indicates a formula for an interpolation cost value $\text{diff}_v$ for vertical interpolation. In addition, Math (3) indicates a formula for an interpolation cost value $\text{diff}_h$ for horizontal interpolation, and Maths (4) and (5) indicate formulae for interpolation cost values $\text{diff}_{s1}$ and $\text{diff}_{s2}$ for oblique interpolation.

[Math 1]

$$\text{diff}_v = \frac{1}{2}\|DW_T - DW_B\| \quad (2)$$

$$\text{diff}_h = \frac{1}{2}\|DW_L - DW_R\| \quad (3)$$

$$\text{diff}_{s1} = \frac{1}{2}\left(\frac{1}{\sqrt{2}}\|DW_T - DW_R\| + \frac{1}{\sqrt{2}}\|DW_L - DW_B\|\right) \quad (4)$$

$$\text{diff}_{s2} = \frac{1}{2}\left(\frac{1}{\sqrt{2}}\|DW_T - DW_L\| + \frac{1}{\sqrt{2}}\|DW_R - DW_B\|\right) \quad (5)$$

Here, in a case where the interpolation cost value $\text{diff}_v$ for vertical interpolation is minimized, the pixel value $DW_v$ for a vertical interpolation pixel is calculated on the basis of Math (6), and the calculated pixel value $DW_v$ is used as the pixel value $DW_C$ for the white pixel $W_C$. In a case where the interpolation cost value $\text{diff}_h$ for horizontal interpolation is minimized, the pixel value $DW_h$ for a horizontal interpolation pixel is calculated on the basis of Math (7), and the calculated pixel value $DW_h$ is used as the pixel value $DW_C$ for the white pixel $W_C$. In a case where the interpolation cost value $\text{diff}_{s1}$ for oblique interpolation is minimized, the pixel value $DW_{s1}$ for an oblique interpolation pixel is calculated on the basis of Math (8), and the calculated pixel value $DW_{s1}$ is used as the pixel value $DW_C$ for the white pixel $W_C$. In addition, in a case where the interpolation cost value $\text{diff}_{s2}$ for oblique interpolation is minimized, the pixel value $DW_{s2}$ for an oblique interpolation pixel is calculated on the basis of Math (9), and the calculated pixel value $DW_{s2}$ is used as the pixel value $DW_C$ for the white pixel $W_C$. Note that a pixel value for a white pixel $W_{TL}$ adjacent to and in the upper left of the white pixel $W_C$ is denoted as $DW_{TL}$, a pixel value for a white pixel $W_{TR}$ adjacent to and in the upper right of the white pixel $W_C$ is denoted as $DW_{TR}$, a pixel value for a white pixel $W_{BL}$ adjacent to and in the lower left of the white pixel $W_C$ is denoted as $DW_L$, and a pixel value for a white pixel $W_{BR}$ adjacent to and in the lower right of the white pixel $W_C$ is denoted as $DW_{BR}$.

$$DW_v = \frac{1}{2}(DW_T + DW_B) \quad (6)$$

$$DW_h = \frac{1}{2}(DW_L + DW_R) \quad (7)$$

$$DW_{s1} = \frac{1}{2}(DW_{TL} + DW_{BR}) \quad (8)$$

$$DW_{s2} = \frac{1}{2}(DW_{TR} + DW_{BL}) \quad (9)$$

The interpolation section 31-H uses the imaging signal PS-H to execute interpolation processing to calculate the pixel value for each white pixel at the position of a red pixel or a blue pixel, generating a luminance signal SDw. The interpolation section 31-H outputs the generated luminance signal SDw to the demosaic processing section 32-H and the fallback determining section 38 and to the display section 53 and the storage section 56.

Figure 9:
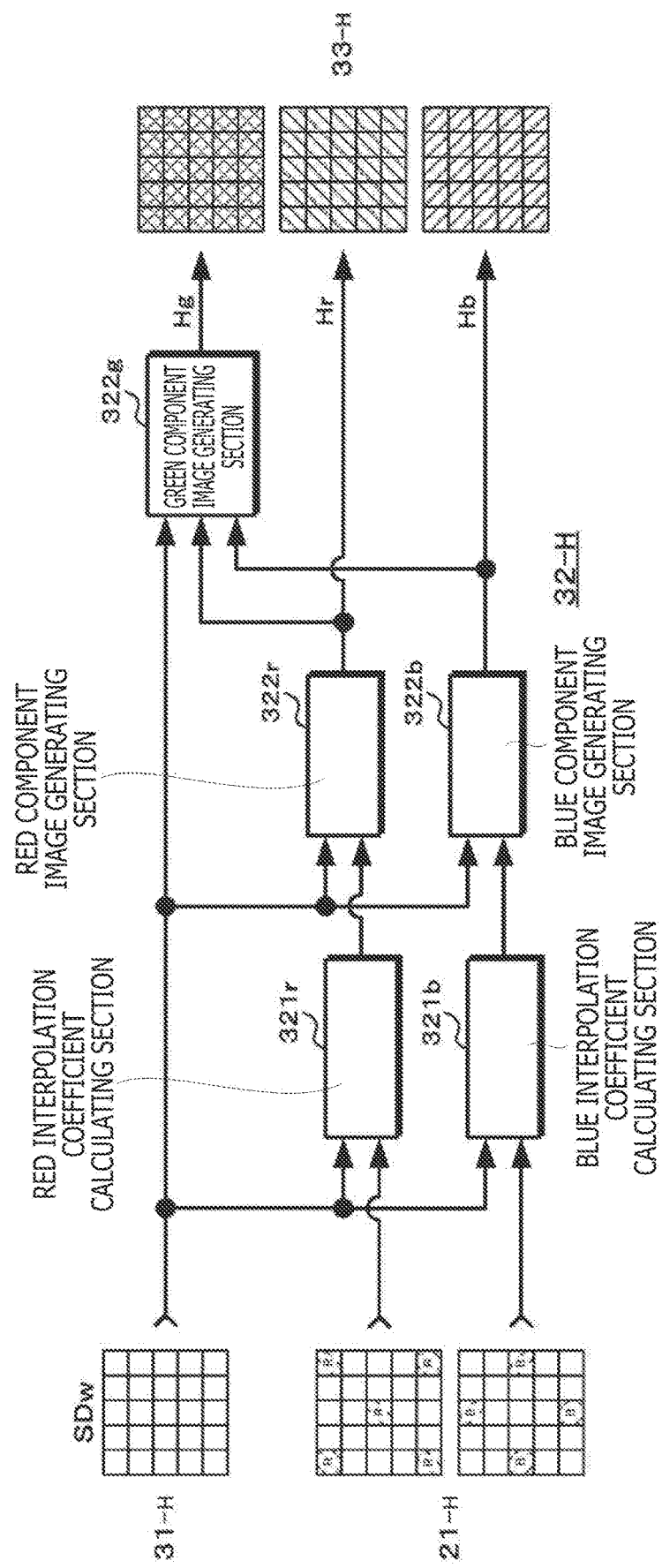
FIG. 9 is a diagram illustrating a configuration of a demosaic processing section 32-H.

The demosaic processing section 32-H uses the imaging signal PS-H output from the imaging section 21-H and the luminance signal SDw generated by the interpolation section 31-H to generate an image signal for each color component, for example, three-primary-color signals. FIG. 9 illustrates a configuration of the demosaic processing section 32-H. The demosaic processing section 32-H includes a red interpolation coefficient calculating section 321*r*, a blue interpolation coefficient calculating section 321*b*, a red component image generating section 322*r*, a blue component image generating section 322*b*, and a green component image generating section 322*g*.

The red interpolation coefficient calculating section 321*r* calculates, on the basis of Math (10), a color ratio that is a ratio between the sum of pixel signals for the white pixels W and the sum of pixel signals for the red pixels R within a block range J with a predetermined size (FIG. 9 depicts, for example, a case of a 5×5 pixel), and outputs the color ratio to the red component image generating section 322*r* as a red interpolation coefficient RTr.

[Math 2]

$$RTr = \frac{\sum_S DR}{\sum_S DW} \quad (10)$$

The blue interpolation coefficient calculating section 321*b* calculates, on the basis of Math (11), a color ratio that is a ratio between the sum of the pixel signals for the white pixels W and the sum of pixel signals for the blue pixels R within the block range J with the predetermined size (FIG. 9 depicts, for example, a case of a 5×5 pixel), and outputs the color ratio to the blue component image generating section 322*b* as a blue interpolation coefficient RTb.

[Math 3]

$$RTb = \frac{\sum_S DB}{\sum_S DW} \quad (11)$$

The red component image generating section 322*r* multiplies a pixel value DW(x, y) for an interpolation pixel position (x, y) in the luminance image generated by the interpolation section 31-H, by the red interpolation coefficient RTr calculated by the red interpolation coefficient calculating section 321*r*, to calculate a pixel value DR(x, y) for the red pixel at the interpolation pixel position (x, y), as indicated in Math (12).

$$DR(x,y) = RTr \times DW(x,y) \quad (12)$$

The blue component image generating section 322*b* multiplies the pixel value DW(x, y) for the interpolation pixel position (x, y) in the luminance image generated by the interpolation section 31-H, by the blue interpolation coefficient RTb calculated by the blue interpolation coefficient calculating section 321*b*, to calculate a pixel value DB(x, y) for the blue pixel at the interpolation pixel position (x, y), as indicated in Math (13).

$$DB(x,y) = RTb \times DW(x,y) \quad (13)$$

The green component image generating section 322*g* subtracts the pixel value DR(x, y) for the interpolation pixel position (x, y) calculated by the red component image generating section 322*r* and pixel value DB(x, y) for the interpolation pixel position (x, y) calculated by the blue component image generating section 322*b*, from the pixel value DW(x, Y) for the interpolation pixel position (x, y) in the luminance image generated by the interpolation section 31-H, to calculate a pixel value DG(x, y) for the green pixel at the interpolation pixel position (x, y), as indicated in Math (14).

$$DG(x,y) = DW(x,y) - DR(x,y) - DB(x,y) \quad (14)$$

The demosaic processing section 32-H uses the imaging signal PS-H output from the imaging section 21-H and the luminance signal SDw generated by the interpolation section 31-H to generate image signals for the three primary colors and outputs the image signals for the three primary colors to the YUV converting section 33-H.

The demosaic processing section 32-C uses the imaging signal PS-C output from the imaging section 21-C to execute demosaic processing similar to that of the related art, and outputs the image signals for the three primary colors to the YUV converting section 33-C.

The YUV converting section 33-H performs color space conversion on the image signals for the three primary colors generated by the demosaic processing section 32-H to generate a luminance signal Hy and a color difference signal Huv. The YUV converting section 33-H outputs the generated luminance signal Hy to the parallax detecting section 36*a* and outputs the generated color difference signal Huv to the signal selecting section 41. Note that the color difference signal Huv indicates a color difference signal Hu indicative of a difference between luminance and blue and a color difference signal Hv indicative of a difference between luminance and red.

The YUV converting section 33-C performs color space conversion on the image signals for the three primary colors generated by the demosaic processing section 32-C to generate a luminance signal Cy and a color difference signal Cuv. The YUV converting section 33-C outputs the generated luminance signal Cy to the parallax detecting section 36*a* and the fallback determining section 38 and outputs the generated color difference signal Cuv to the parallax compensating section 37. Note that the color difference signal Cuv indicates a color difference signal Cu indicative of a difference between luminance and blue and a color difference signal Cv indicative of a difference between luminance and red.

The parallax detecting section 36*a* uses the luminance signal Hy from the YUV converting section 33-H and the luminance signal Cy from the YUV converting section 33-C to detect a parallax of the captured image acquired by the imaging section 21-C using, as a base captured image, the captured image acquired by the imaging section 21-H.

The parallax detecting section 36a generates parallax information by corresponding point detection processing based on cross matching. For example, a position of interest on a base captured image is designated as a reference, and a block area on another captured image that is most similar to a base block area is detected using a cost value such as an SSD (Sum of Squared Difference) or a SAD (Sum of Absolute Difference). The parallax detecting section 36a calculates a parallax vector indicative of a difference in position between the detected block area and the base block area. In addition, the parallax detecting section 36a uses each pixel on the base captured image as a position of interest to calculate a parallax and generates parallax information indicative of a parallax vector calculated for each pixel. Note that for generation of parallax information, instead of the block matching, any other method, for example, a KLT (Kanade-Lucas-Tomasi) method, may be used. The parallax detecting section 36a outputs the generated parallax information DTa to the parallax compensating section 37 and the fallback determining section 38.

The parallax compensating section 37 performs parallax compensation for the color difference signal Cuv generated by the YUV converting section 33-C, on the basis of the parallax information DTa supplied from the parallax detecting section 36a. The parallax compensating section 37 moves the pixel positions on the basis of the parallax information generated by the parallax detecting section 36a with respect to the color difference signal Cuv, to generate a parallax-compensated color difference signal CPuv corresponding to the viewpoint of the captured image acquired by the imaging section 21-H. The parallax compensating section 37 outputs the generated parallax-compensated color difference signal CPuv to the signal selecting section 41.

The fallback determining section 38 determines a risk of degradation of the image quality performance on the basis of the luminance signal SDw supplied from the interpolation section 31-H and the luminance signal Cy supplied from the YUV converting section 33-C, and the parallax information DTa supplied from the parallax detecting section 36a. Furthermore, the fallback determining section 38 generates a signal selection control signal ET for selecting the parallax-compensated color difference signal CPuv, having a higher color resolution than the color difference signal Huv generated by the YUV converting section 33-H, in a case where there is no risk of degradation of the image quality performance, while selecting the color difference signal Huv in a case where there is a risk of degradation of the image quality performance.

Figure 10:
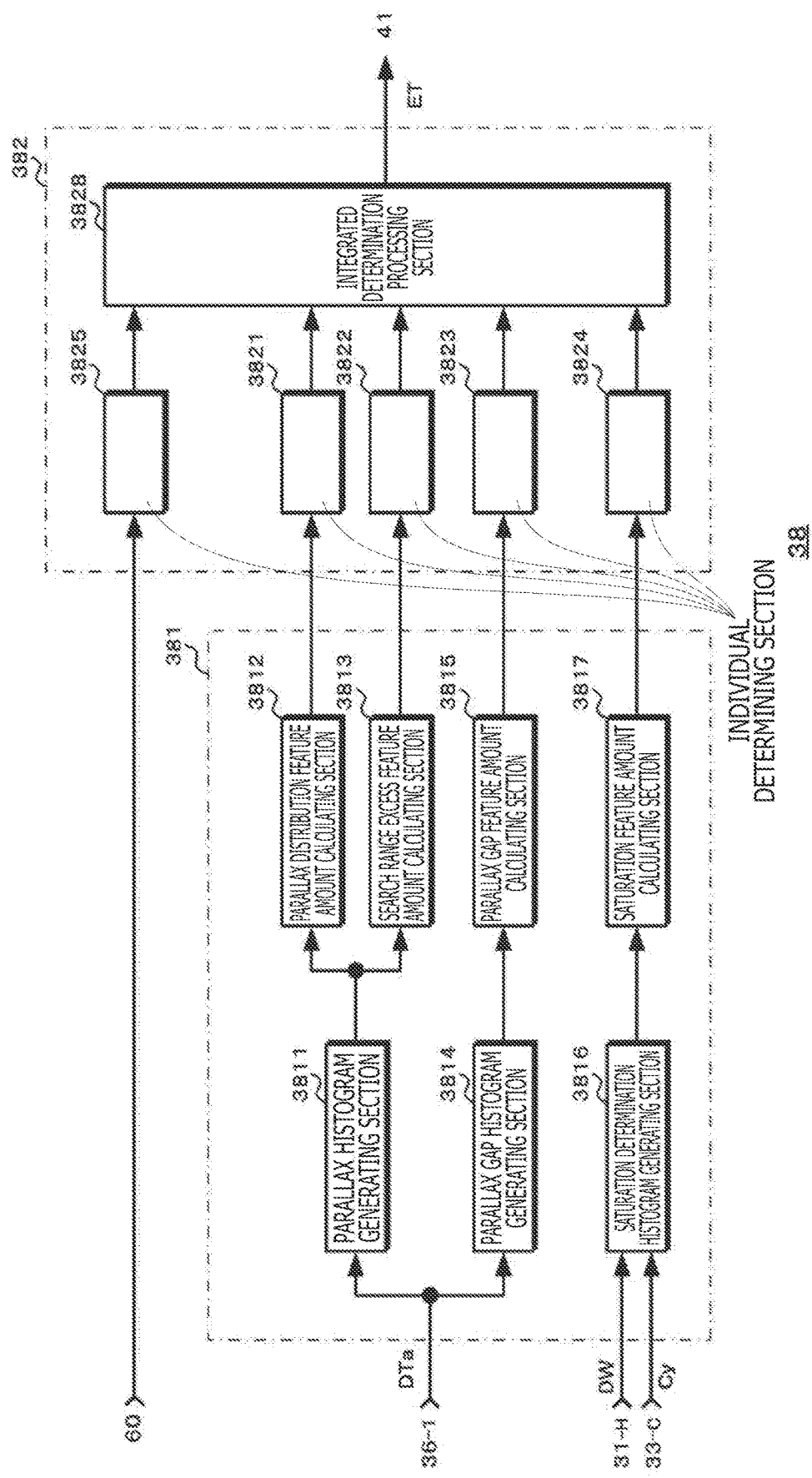
FIG. 10 is a diagram illustrating a configuration of a fallback determination processing section.

FIG. 10 illustrates a configuration of a fallback determination processing section. The fallback determining section 38 includes an image feature amount calculating section 381 and a signal selection determining section 382.

Figure 11:
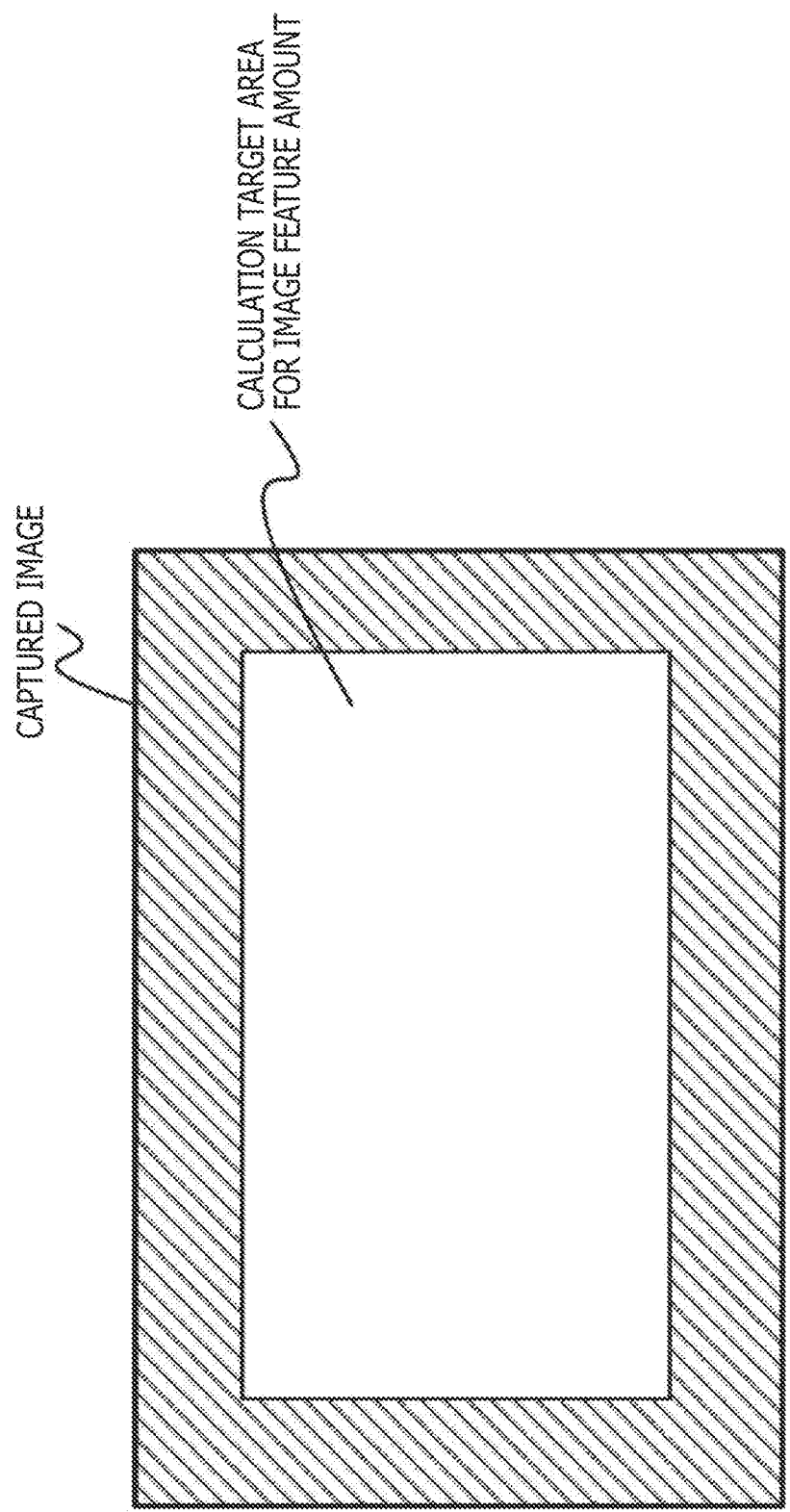
FIG. 11 is a diagram illustrating a calculation target area for an image feature amount.

The image feature amount calculating section 381 calculates an image feature amount used to determine degradation of the image quality caused by a parallax and saturation of pixels. The image feature amount calculating section 381 includes a parallax histogram generating section 3811, a parallax distribution feature amount calculating section 3812, a search range excess feature amount calculating section 3813, a parallax gap histogram generating section 3814, and a parallax gap feature amount calculating section 3815, as functional blocks calculating an image feature amount used to determine degradation of the image quality caused by a parallax. In addition, the image feature amount calculating section 381 includes a saturation determination histogram generating section 3816 and a saturation feature amount calculating section 3817 as functional blocks calculating an image feature amount used to determine degradation of the image quality caused by saturation of pixels. Note that the image feature amount calculating section 381 may use the entire captured image as a calculation target area for the image feature amount or sets the calculation target area as the entire captured image except for the upper, lower, right, and left end side areas (hatched areas) as depicted in FIG. 11. Setting the calculation target area as the entire captured image except for the end side areas as described above, for example, enables prevention of a situation where the parallax, a parallax gap distance described below, or the like fails to be calculated due to the location of a pixel of interest at the side end. Thus, image feature amounts can be accurately calculated. In addition, calculation costs for generation of histograms and the like can be reduced.

Figure 12:
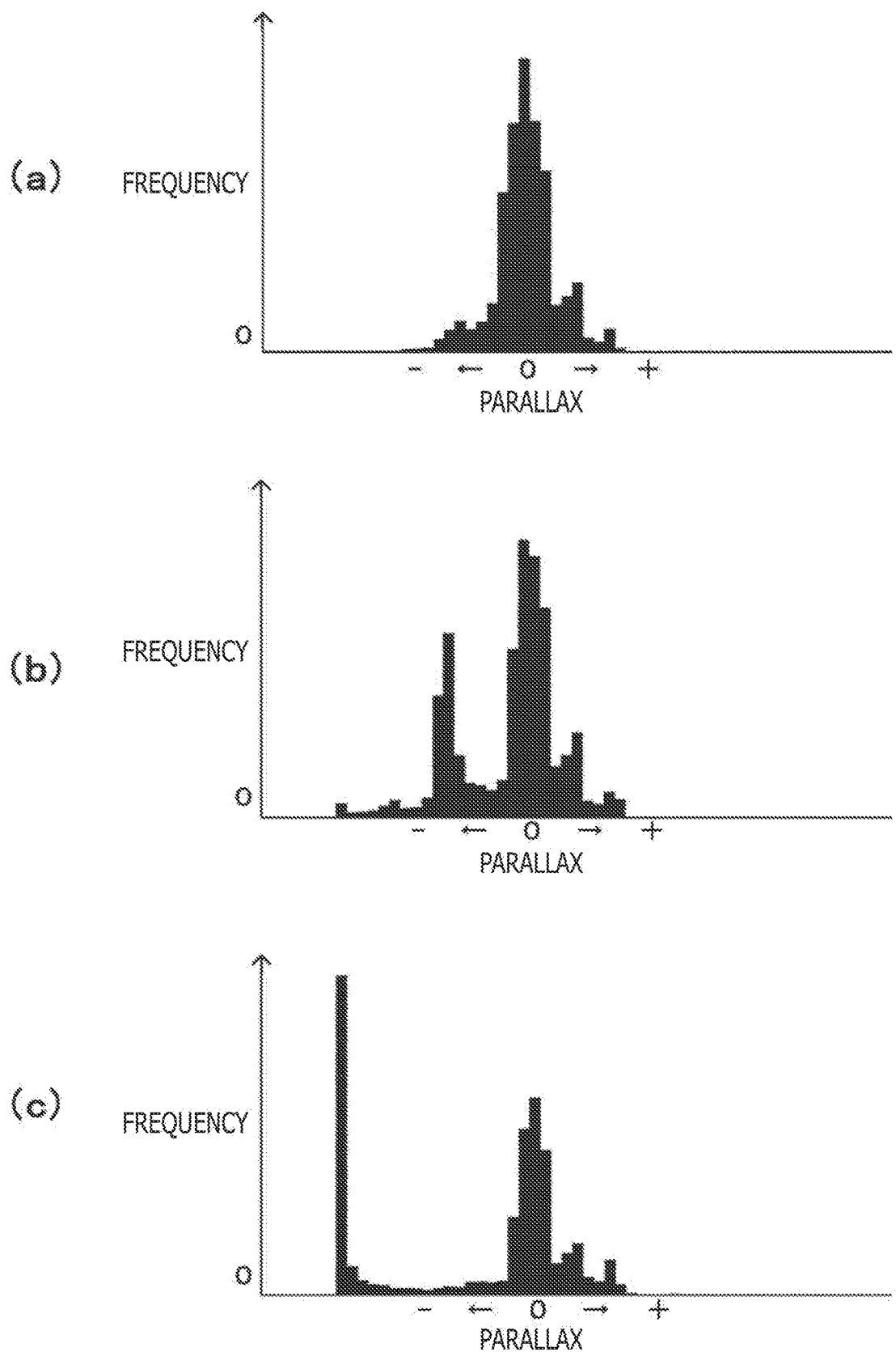
FIG. 12 is a diagram illustrating a parallax histogram.

The parallax histogram generating section 3811 generates a histogram using the parallax vector calculated for each pixel in the calculation target area. Note that FIG. 12 illustrates a parallax histogram and that (a) in FIG. 12 illustrates a parallax histogram of a captured image in which objects are close to the same plane, and that (b) in FIG. 12 illustrates a parallax histogram of a captured image in which objects are located at different distances. In this parallax histograms, a peak occurs at a position away from a parallax "0" in a minus direction due to the difference in distance. (c) in FIG. 12 illustrates a parallax histogram of captured images in which the objects are located at different distances to cause a plurality of parallaxes, and in which the objects are located close and are thus likely to cause a large parallax. In this parallax histogram, the objects are located closer than in (b) in FIG. 12 to cause to a larger parallax, and thus, a peak occurs at a position farther in the minus direction than in (b) in FIG. 12.

The parallax distribution feature amount calculating section 3812 calculates, as a parallax distribution feature amount, a statistical amount indicative of a feature of a parallax distribution from the parallax histogram generated by the parallax histogram generating section 3811. The parallax distribution feature amount calculating section 3812 calculates, for example, a standard deviation as a statistical amount indicative of the feature of the parallax distribution, and designates the calculated standard deviation as a parallax distribution feature amount FVfsd. For example, the parallax distribution feature amount calculated from the histogram in (a) in FIG. 12 is designated as "FVfsd-a," the parallax distribution feature amount calculated from the histogram in (b) in FIG. 12 is designated as "FVfsd-b," and the parallax distribution feature amount calculated from the histogram in (c) in FIG. 12 is designated as "FVfsd-c." In this case, the parallax distribution feature amounts are such that "FVfsd-a<FVfsd-b and FVfsd-c." Thus, in a case where the parallax distribution feature amount calculating section 3812 calculates the standard deviation of the parallax histogram as the parallax distribution feature amount FVfsd, the signal selection determining section 382 described below can determine, on the basis of the parallax distribution feature amount FVfsd, whether the objects are close to the same plane or involves a plurality of parallaxes.

The search range excess feature amount calculating section 3813 calculates, from the parallax histogram generated by the parallax histogram generating section 3811, a search range excess feature amount FVosr indicative of the ratio, to a total frequency (counter), of a frequency (over_search_range_counter) at which a parallax exceeding a preset search range has occurred. The search range excess feature amount calculating section 3813 uses the parallax histogram to execute a calculation in Math (15) to calculate the search range excess feature amount FVosr.

$$FVosr = over\_search\_range\_counter/counter*100 \quad (15)$$

Figure 13:
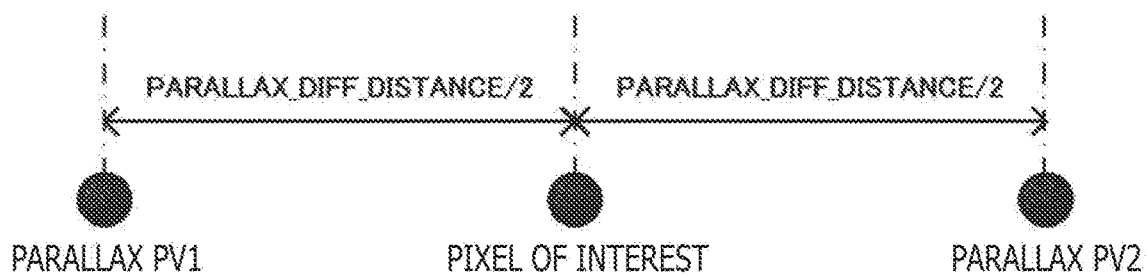
FIG. 13 is a diagram illustrating a parallax difference absolute value.

The parallax gap histogram generating section 3814 generates a parallax gap histogram. FIG. 13 is a diagram illustrating a parallax difference absolute value used to generate a parallax gap histogram. The parallax gap histogram generating section 3814 calculates a parallax PV1 located at a distance from the position of a pixel of interest in the calculation target area in the horizontal direction, the distance corresponding to "−(PARALLAX_DIFF_DISTANCE/2)" pixels, as depicted in FIG. 13. In addition, the parallax gap histogram generating section 3814 calculates a parallax PV2 located at a distance from the position of the pixel of interest in the horizontal direction, the distance corresponding to "(PARALLAX_DIFF_DISTANCE/2)" pixels to calculate a parallax difference absolute value PVapd indicated in Math (16). Note that a parallax gap distance (PARALLAX_DIFF_DISTANCE) is preset.

$$PVapd = ABS(PV1 - PV2) \quad (16)$$

Figure 14:
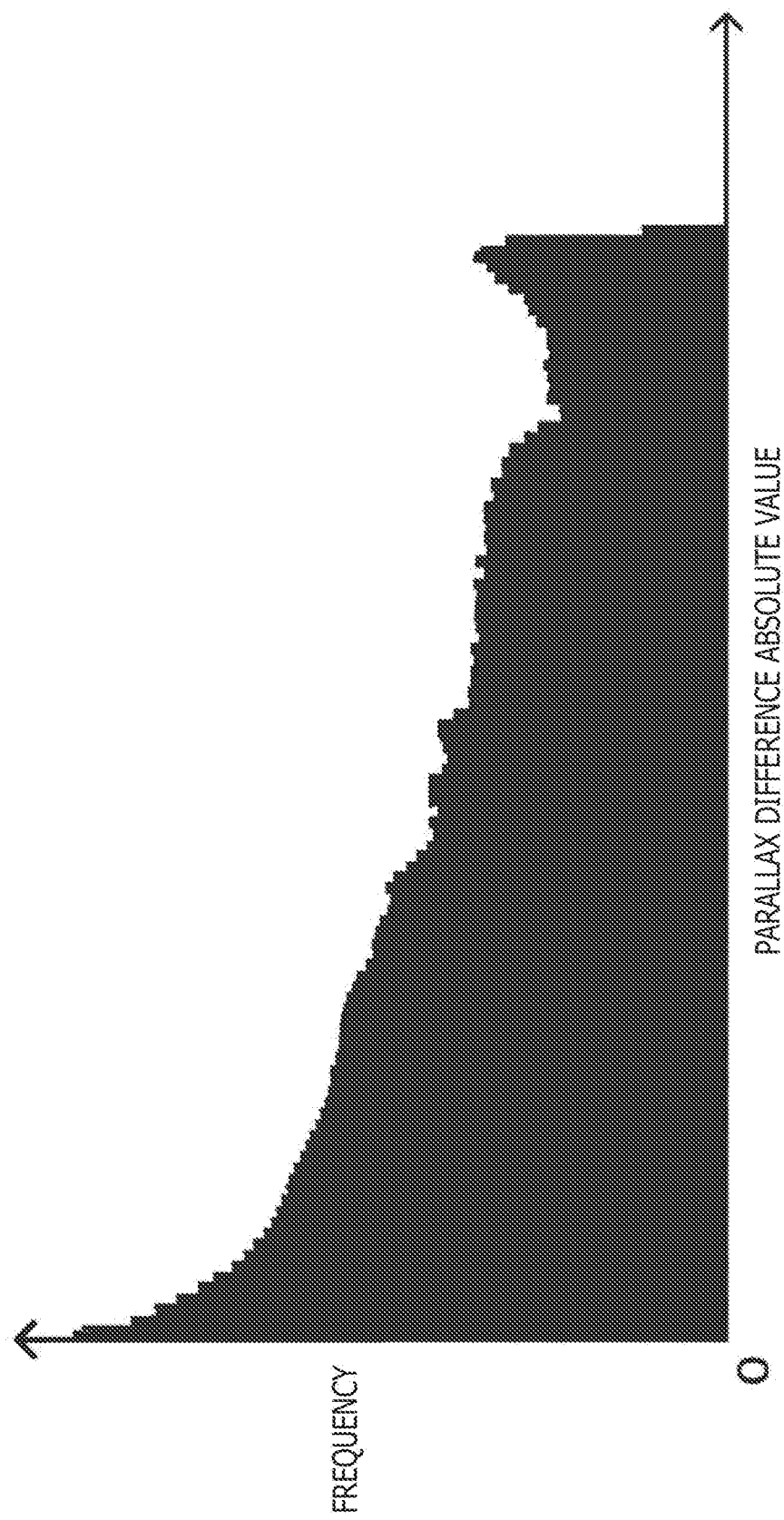
FIG. 14 is a diagram illustrating a parallax gap histogram.

For example, in a case where the objects are close to the same plane, the parallax difference absolute value PVapd is small because a difference between a parallax PV1 and a parallax PV2 is small. In addition, for example, in a case where the objects are located at different distances and the pixel of interest is located at a boundary between the objects at different distances, the parallax difference absolute value PVapd is large because the difference between the parallax PV1 and the parallax PV2 is large. The parallax gap histogram generating section 3814 generates a parallax gap histogram that is a histogram of parallax difference absolute values PVapd calculated using each pixel in the calculation target area as a pixel of interest. Note that FIG. 14 illustrates a parallax gap histogram.

The parallax gap feature amount calculating section 3815 calculates a parallax gap feature amount FVpd from the parallax gap histogram generated by the parallax gap histogram generating section 3814. The parallax gap feature amount calculating section 3815 calculates, from the parallax gap histogram, the parallax gap feature amount FVpd indicative of the ratio, to a total frequency (counter), of a frequency (large_parallax_diff_counter) at which a parallax gap larger than or equal to a preset maximum parallax gap distance has occurred. The parallax gap feature amount calculating section 3815 uses the parallax gap histogram to perform a calculation in Math (17) to calculate the parallax gap feature amount FVpd.

$$FVpd = large\_parallax\_diff\_counter/counter*100 \quad (17)$$

In this manner, the parallax gap feature amount FVpd calculated by the parallax gap feature amount calculating section 3815 is indicative of the ratio of pixels involving the maximum parallax gap distance. Here, the objects located in the same plane have a small parallax gap and the parallax gap is large at an image boundary portion between the objects at different distances, thus enabling determination of an occurrence status of the image boundary between objects located at significantly different distances.

The saturation determination histogram generating section 3816 generates a pixel value histogram indicative of a frequency (number of pixels) for each pixel value on the basis of the luminance signal SDw supplied from the interpolation section 31-H. In addition, the saturation determination histogram generating section 3816 generates a pixel value histogram indicative of a frequency (number of pixels) for each pixel value on the basis of the luminance signal Cy supplied from the YUV converting section 33-C.

Figure 15:
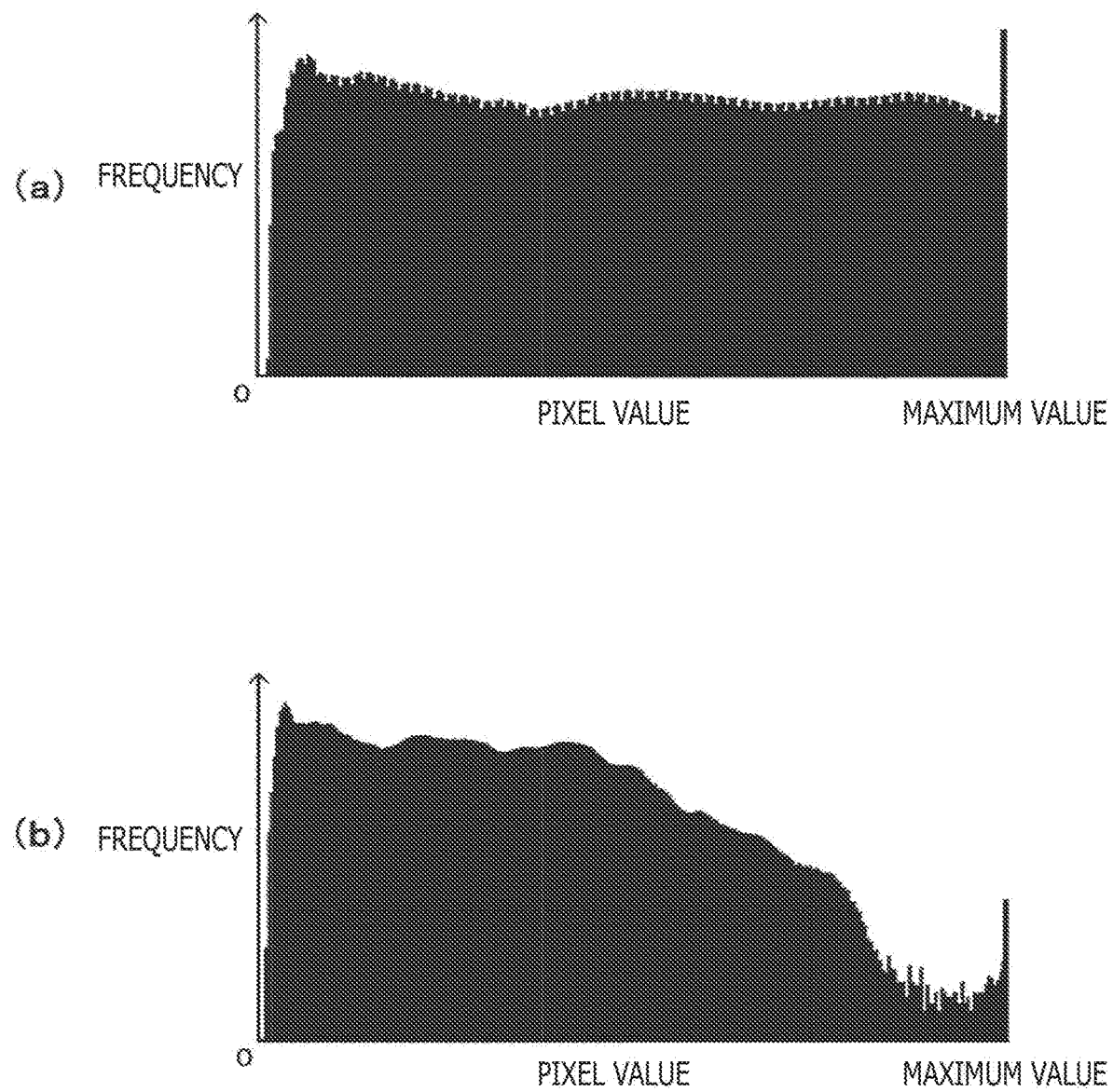
FIG. 15 is a diagram illustrating a pixel value histogram.

FIG. 15 illustrates a pixel value histogram. Note that (a) in FIG. 15 depicts a pixel value histogram based on the luminance signal SDw and that (b) in FIG. 15 depicts a luminance value histogram based on the luminance signal Cy. As described above, the imaging section 21-H is provided with more white pixels than the imaging section 21-C, the white pixels outputting electric signals based on the amount of incident light within the entire wavelength range of visible light. Thus, the imaging section 21-H has a higher sensitivity than the imaging section 21-C. Accordingly, in a case where objects with the same luminance are imaged, the pixel value histogram based on the captured image acquired by the imaging section 21-H has a higher frequency in an area with a high signal value than the luminance value histogram based on the captured image acquired by the imaging section 21-C.

The saturation feature amount calculating section 3817 calculates a saturation feature amount FVsat on the basis of the luminance value histogram generated by the saturation determination histogram generating section 3816. The saturation feature amount calculating section 3817 calculates a frequency (saturation_counter_W) for pixel values larger than or equal to a preset saturation determination set value (SATURATION_AREA_W) in the pixel value histogram based on the captured image acquired by the imaging section 21-H, and a frequency (saturation_counter_Y) for pixel values larger than or equal to a preset saturation determination set value (SATURATION_AREA_Y) in the pixel value histogram based on the captured image acquired by the imaging section 21-C. In addition, the saturation feature amount calculating section 3817 calculates a saturation feature amount FVsat indicative of the ratio, to a total frequency (counter), of a difference between the frequency (saturation_counter_W) and the frequency (saturation_counter_Y). The saturation feature amount calculating section 3817 uses the pixel value histogram based on the captured image acquired by the imaging section 21-H and the pixel value histogram based on the captured image acquired by the imaging section 21-C to perform a calculation in Math (18) to calculate the saturation feature amount FVsat.

$$FVsat = (saturation\_counter\_W - saturation\_counter\_Y)/counter*100) \quad (18)$$

In this manner, the saturation feature amount FVsat calculated by the saturation feature amount calculating section 3817 is indicative of a difference in pixel saturation status. Accordingly, for example, in a case where the saturation feature amount has a large value, the captured image can be determined to suffer degradation of the image quality resulting from saturation of images in the fusion processing based on the captured image acquired by the imaging section 21-H.

The signal selection determining section 382 determines whether the fusion image suffers degradation of the image quality or not on the basis of the image feature amount calculated by the image feature amount calculating section 381 and a camera feature amount acquired from the control section 60 or the like. The signal selection determining section 382 generates a signal selection control signal ET on the basis of a determination result, and outputs the signal selection control signal ET to the signal selecting section 41. The signal selection determining section 382 includes individual determining sections 3821 to 3825 and an integrated determination processing section 3828 as functional blocks determining whether the image quality is likely to be degraded or not.

The individual determining section 3821 determines whether the fusion image is to suffer degradation of the image quality or not, on the basis of the parallax distribution feature amount calculated by the parallax distribution feature amount calculating section 3812. The individual determining section 3821 compares the parallax distribution feature amount FVfsd with a determination threshold Thfsd preset for the parallax distribution feature amount. The individual determining section 3821 determines that the image quality is likely to be degraded in a case where the parallax distribution feature amount FVfsd is larger than the determination threshold Thfsd, that is, in a case where the parallax varies significantly. The individual determining section 3821 outputs an individual determination result to the integrated determination processing section 3828.

The individual determining section 3822 determines whether the fusion image is to suffer degradation of the image quality, on the basis of the search range excess feature amount FVosr calculated by the search range excess feature amount calculating section 3813. The individual determining section 3822 compares the search range excess feature amount FVosr with a determination threshold Thosr preset for the search range excess feature amount. The individual determining section 3822 can determine that the occlusion area occupies a large portion of the image in a case where the search range excess feature amount FVosr is larger than the determination threshold Thosr. The individual determining section 3822 outputs an individual determination result to the integrated determination processing section 3828.

The individual determining section 3823 determines whether the fusion image is to suffer degradation of the image quality or not, on the basis of the parallax gap feature amount FVpd calculated by the parallax gap feature amount calculating section 3815. The individual determining section 3823 compares the parallax gap feature amount FVpd with a determination threshold Thpd preset for the parallax gap feature amount. The individual determining section 3823 can determine that the image includes many image boundaries between objects located at significantly different distances in a case where the parallax gap feature amount FVpd is larger than the determination threshold Thpd. The image boundary between objects located at significantly different distances is likely to suffer occlusion, and thus, the image quality is determined to be degraded in a case where the image includes many image boundaries between objects located at significantly different distances. The individual determining section 3823 outputs an individual determination result to the integrated determination processing section 3828.

The individual determining section 3824 determines whether the fusion image is to suffer degradation of the image quality or not, on the basis of the saturation feature amount FVsat calculated by the saturation feature amount calculating section 3817. The individual determining section 3824 compares the saturation feature amount FVsat with a determination threshold Thsat preset for the saturation feature amount. The individual determining section 3824 determines that the image quality is likely to be degraded in a case where the saturation feature amount FVsat is larger than the determination threshold That, that is, in a case where more pixels are saturated in the captured image acquired by the imaging section 21-H than in the captured image acquired by the imaging section 21-C. The individual determining section 3824 outputs an individual determination result to the integrated determination processing section 3828.

The individual determining section 3825 determines, on the basis of the camera feature amount, whether the fusion image is to suffer degradation of the image quality or not. As the camera feature amount, imaging setting information associated with brightness during imaging or with the object distance is used. A bright object allows an imaging section 21-CR to acquire a high-sensitivity image, and thus, the effect of the fusion processing is lower on the bright object than on a dark object. Accordingly, the imaging setting information associated with the brightness during imaging is used as the camera feature amount. In addition, the occlusion resulting from the difference in viewpoint between the imaging section 21-H and the imaging section 21-C is less significant for a farther object and is more significant for a nearer object. Accordingly, the imaging setting information associated with the object distance is used as the camera feature amount. As the imaging setting information associated with the brightness during imaging, for example, setting information such as ISO sensitivities and exposure times of the imaging section 21-H and 21-C is used. As the imaging setting information associated with the object distance, setting information such as focus distances and zoom magnifications is used. The individual determining section 3825 acquires camera information from the imaging sections 21-H and 21-C and the control section 60. The individual determining section 3825 compares the camera feature amount with a determination threshold preset for the camera feature amount to determine whether the fusion image is to suffer degradation of the image quality or not. The individual determining section 3825 outputs an individual determination result to the integrated determination processing section 3828.

The integrated determination processing section 3828 uses the individual determination results supplied from the individual determining sections 3821 to 3825 to make fallback determination for each captured image, for example, in frame units. The integrated determination processing section 3828 generates a signal selection control signal in accordance with a fallback determination result, and outputs the signal selection control signal to the signal selecting section 41. For example, the integrated determination processing section 3828 determines, in the fallback determination, that the fusion processing is not to lead to degradation of the image quality performance in a case where the risk of degradation of the image quality performance is lower than the threshold, that is, in a case where all of the individual determination results supplied from the individual determining sections 3821 to 3825 indicate that the image quality is not to be degraded. In addition, the integrated determination processing section 3828 determines, in the fallback determination, that the fusion processing is to lead to degradation of the image quality performance in a case where the risk of degradation of the image quality performance is higher than or equal to the threshold, that is, in a case where any of the individual determination results supplied from the individual determining sections 3821 to 3825 indicates that the image quality is likely to be degraded. The integrated determination processing section 3828, for example, generates a signal selection control signal ET for selecting the parallax-compensated color difference signal CPuv, having a higher color resolution than the color difference signal Huv generated by the YUV converting section 33-H, in a case where the image quality performance is determined not to be degraded, while selecting the color difference signal Huv in a case where the image quality performance is likely to be degraded.

The signal selecting section 41 outputs, as a color difference signal SDuv, one of the color difference signal Huv generated by the YUV converting section 33-H or the parallax-compensated color difference signal CPuv generated by the YUV converting section 33-C and on which the parallax compensation has been performed, on the basis of the signal selection control signal ET from the fallback determining section 38.

The image processing section 30-1 outputs the luminance signal SDw output from the interpolation section 31-H and the color difference signal SDuv output from the signal selecting section 41, to the display section 53 and the recording section 56 as image signals for a fusion image. Note that FIG. 7 depicts the configuration in which the luminance signal and the color difference signal are output to the display section 53 and the recording section 56 but that a color space converting section for the luminance signal and the color difference signal may be provided to output, for example, the image signals for the three primary colors to the display section 53 and the recording section 56.

Figure 16:
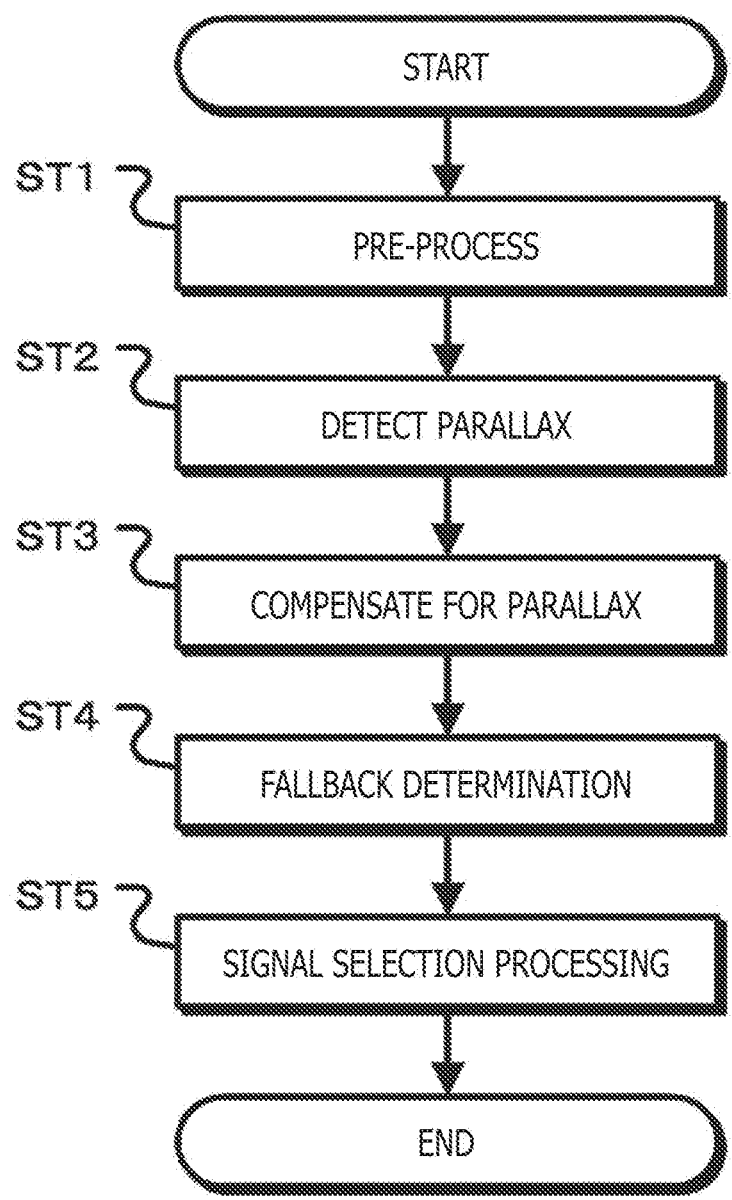
FIG. 16 is a flowchart illustrating operations of the first embodiment of the image processing section.
Figure 17:
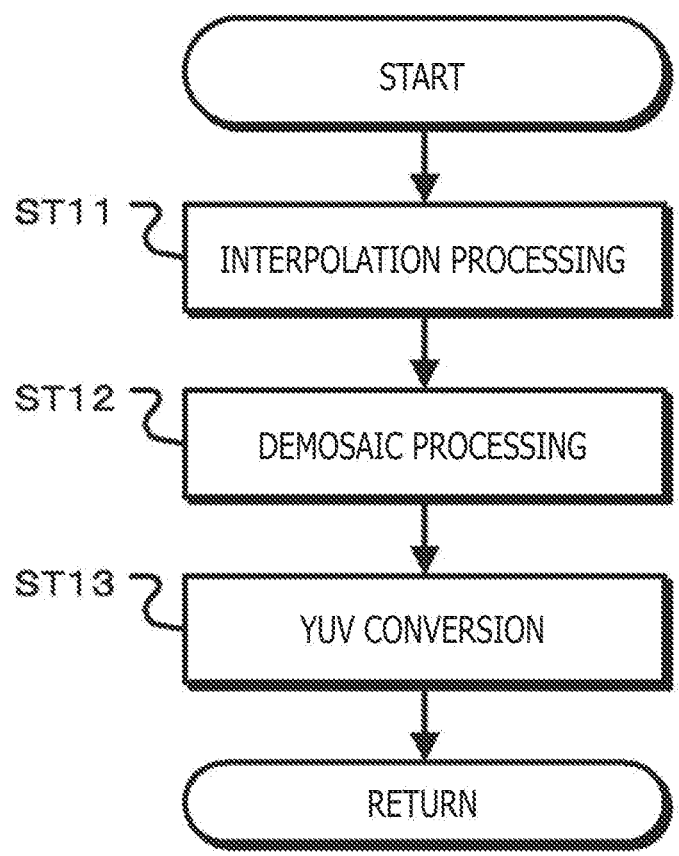
FIG. 17 is a flowchart illustrating preprocessing.

FIG. 16 is a flowchart illustrating operations of the first embodiment of the image processing section. In step ST1, an image processing section 30-1 executes preprocessing. FIG. 17 is a flowchart illustrating the preprocessing. In step ST11, the image processing section 30-1 executes interpolation processing. The image processing section 30-1 uses the white pixels in the captured image generated by the imaging section 21-H to execute the interpolation processing to generate a luminance signal SDw, and proceeds to step ST12.

In step ST12, the image processing section 30-1 executes demosaic processing. The image processing section 30-1 uses the luminance signal SDw generated in step ST11, and for example, pixel signals for red and blue pixels from the imaging section 21-H to execute the demosaic processing to generate image signals for a red component image, a blue component image, and a green component image. In addition, the image processing section 30-1 uses pixel signals for red, blue, and green pixels from the imaging section 21-C to execute the demosaic processing to generate image signals for a red component image, a blue component image, and a green component image. The image processing section 30-1 then proceeds to step ST13.

In step ST13, the image processing section 30-1 performs YUV conversion. The image processing section 30-1 performs color space conversion on the image signal generated in step ST12 by the demosaic processing using the luminance signal SDw and the pixel signals from the imaging section 21-H, to generate a luminance signal Hy and a color difference signal Huv. In addition, the image processing section 30-1 performs color space conversion on the image signal generated in step ST12 by the demosaic processing using the pixel signals for red, blue, and green pixels from the imaging section 21-C, to generate a luminance signal Cy and a color difference signal Cuv. The image processing section 30-1 returns to step ST2 in FIG. 16.

In step ST2, the image processing section 30-1 preforms parallax detection. The image processing section 30-1 uses the luminance signal Hy and luminance signal Cy generated by the preprocessing in step ST1 to perform parallax detection to generate parallax information DTa indicative of a parallax detection result. The image processing section 30-1 then proceeds to step ST3.

In step ST3, the image processing section 30-1 performs parallax compensation. The image processing section 30-1 uses the parallax information DTa generated in step ST2 to perform parallax compensation for the color difference signal Cuv generated in ST1 and corresponding to the viewpoint of the imaging section 21-C. The image processing section 30-1 then proceeds to step ST4.

In step ST4, the image processing section 30-1 makes fallback determination. The image processing section 30-1 determines the risk of degradation of the image quality performance on the basis of the luminance signals SDw and Cy generated by the preprocessing in step ST1 and the parallax information DTa generated in step ST2, and then proceeds to step ST5.

In step ST5, the image processing section 30-1 executes signal selection processing. In a case where the fallback determination in step ST4 indicates that there is no risk of degradation of the image quality performance, the image processing section 30-1 selects the parallax-compensated color difference signal CPuv generated in step ST3 and having a higher color resolution than the color difference signal Huv generated by the preprocessing in step ST1. In addition, in a case where the fallback determination indicates that there is a risk of degradation of the image quality performance, the image processing section 30-1 selects the color difference signal Huv. Furthermore, the image processing section 30-1 outputs the luminance signal SDw generated by the preprocessing in step ST1 and the parallax-compensated color difference signal CPuv or the color difference signal Huv, to the display section, the recording section, and the like.

According to the first embodiment described above, the image processing section 30-1 executes, in captured image units, processing of performing parallax compensation for the color difference signal corresponding to the second viewpoint and having a high color resolution and then selecting the generated parallax-compensated color difference signal in a case where there is no risk of degradation of the image quality performance, and processing of selecting the color difference signal for the first viewpoint in a case where there is a risk of degradation of the image quality performance. In addition, the image processing section 30-1 outputs, to the display section 53 and the recording section 56, the selected color difference signal and the luminance signal corresponding to the first viewpoint and having a high resolution. Accordingly, the use of the image processing section 30-1 allows display or recording of a captured image having higher image quality performance than the captured image acquired by the imaging section 21-H or the imaging section 21-C. In addition, the imaging section 21-H is provided with color component pixels, and the color difference signal is generated from the first imaging signal corresponding to the first viewpoint and generated by the imaging section 21-H. In a case where there is a risk of degradation of the image quality performance, the color difference signal for the first viewpoint is selected. Thus, the color shift or missing can be prevented in the color image resulting from the fusion processing.

4. Second Embodiment

The first embodiment of the image processing section described above includes the selection between the color difference signal Huv generated on the basis of the signal from the imaging section 21-H or the parallax-compensated color difference signal CPuv generated on the basis of the signal from the imaging section 21-C and on which the parallax compensation has been performed, the parallax-compensated color difference signal having a high resolution, and the selection is performed in captured image units so as to obtain a high-sensitivity captured image while suppressing degradation of the image quality performance. Now, a second embodiment will be described in which synthesis is performed on the color difference signal Huv generated on the basis of the signal from the imaging section 21-H and the parallax-compensated color difference signal CPuv generated on the basis of the signal from the imaging section 21-C and on which the parallax compensation has been performed, the parallax-compensated second color difference signal CPuv having a high color resolution and in which the synthesis is performed in pixel units so as not to degrade high-sensitivity image quality performance while suppressing degradation of the image quality performance.

Figure 18:
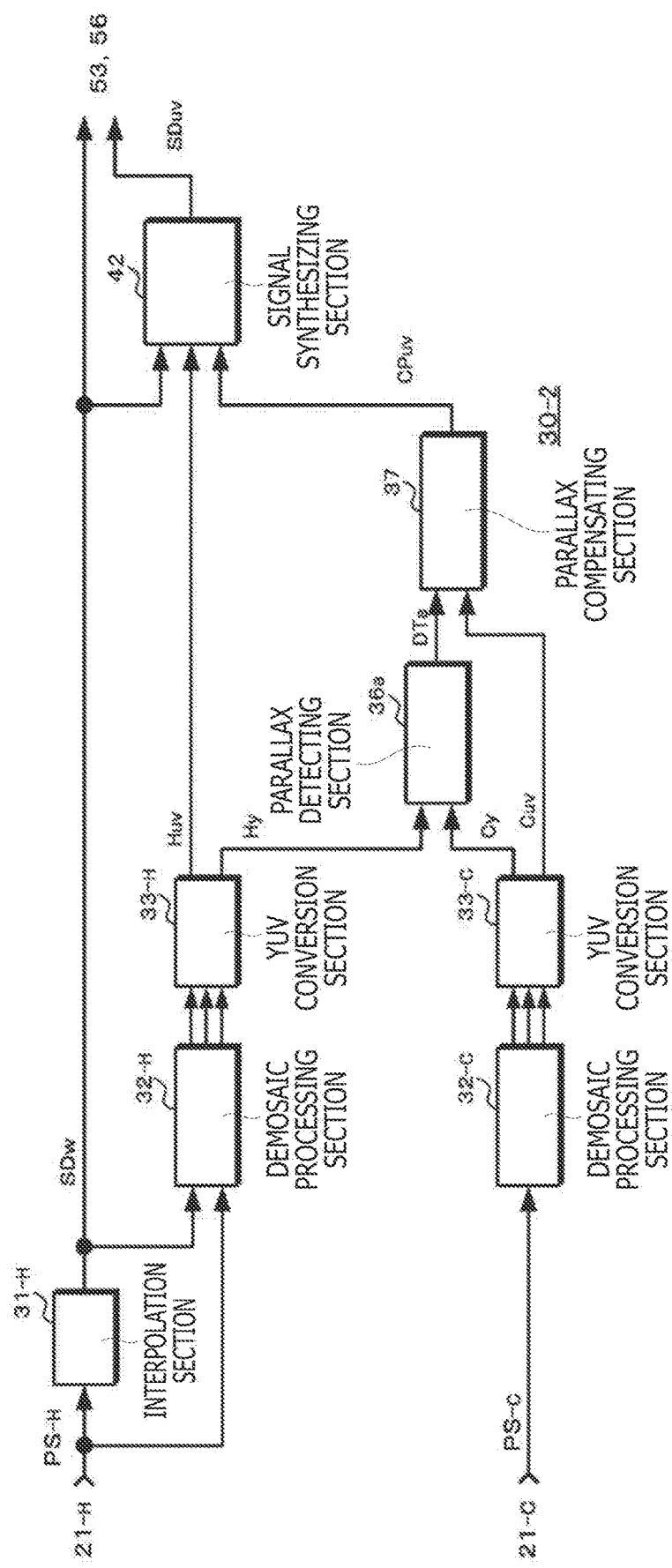
FIG. 18 is a diagram illustrating a configuration of a second embodiment of the image processing section.

FIG. 18 illustrates a configuration of the second embodiment of the image processing section. Note that, compared to the components of the above-described embodiment, corresponding components are denoted by the same reference signs. An image processing section 30-2 includes the interpolation section 31-H, the demosaic processing section 32-H, the YUV converting section 33-H, the demosaic processing section 32-C, the YUV converting section 33-C, the parallax detecting section 36a, the parallax compensating section 37, and a signal synthesizing section 42.

The imaging signal PS-H output from the imaging section 21-H is input to the interpolation section 31-H and the demosaic processing section 32-H. In addition, the imaging signal PS-C output from the imaging section 21-C is input to the demosaic processing section 32-C.

The interpolation section 31-H uses the imaging signal PS-H to execute interpolation processing to calculate the pixel value for each white pixel at the position of a red pixel or a blue pixel, generating a luminance signal SDw. The interpolation section 31-H outputs the luminance signal SDw to the demosaic processing section 32-H and the signal synthesizing section 42 and to the display section 53 and the recording section 56.

The demosaic processing section 32-H uses the imaging signal PS-H output from the imaging section 21-H and the luminance signal SDw generated by the interpolation section 31-H to generate an image signal for each color component and outputs the resultant image signals to the YUV converting section 33-H. The demosaic processing section 32-C uses the imaging signal PS-C output from the imaging section 21-C to execute demosaic processing similar to the demosaic processing in related art to generate an image signal for each color component and outputs the resultant image signals to the YUV converting section 33-C.

The YUV converting section 33-H performs color space conversion on the image signals for the three primary colors generated by the demosaic processing section 32-H to generate a luminance signal Hy and a color difference signal Huv. The YUV converting section 33-H outputs the generated luminance signal Hy to the parallax detecting section 36a and outputs the color difference signal Huv to the signal synthesizing section 42. The YUV converting section 33-C performs color space conversion on the image signals for the three primary colors generated by the demosaic processing section 32-C to generate a luminance signal Cy and a color difference signal Cuv. The YUV converting section 33-C outputs the generated luminance signal Cy to the parallax detecting section 36a and outputs the color difference signal Cuv to the parallax compensating section 37.

The parallax detecting section 36a uses the luminance signal Hy from the YUV converting section 33-H and the luminance signal Cy from the YUV converting section 33-C to detect a parallax of the captured image acquired by the imaging section 21-C using, as a base captured image, the captured image acquired by the imaging section 21-H. The parallax detecting section 36a outputs, to the signal synthesizing section 42, parallax information indicative of a parallax detection result.

The parallax compensating section 37 performs parallax compensation for the color difference signal Cuv generated by the YUV converting section 33-C on the basis of the parallax information DTa supplied from the parallax detecting section 36a, to generate a parallax-compensated color difference signal CPuv corresponding to the viewpoint for the captured image acquired by the imaging section 21-H. The parallax compensating section 37 outputs the generated parallax-compensated color difference signal CPuv to the signal synthesizing section 42.

The signal synthesizing section 42 synthesizes the color difference signal Huv and the parallax-compensated color difference signal CPuv so as not to degrade the image quality performance, and outputs the resultant color difference signal SPuv to the display section 53 and the recording section 56.

Figure 19:
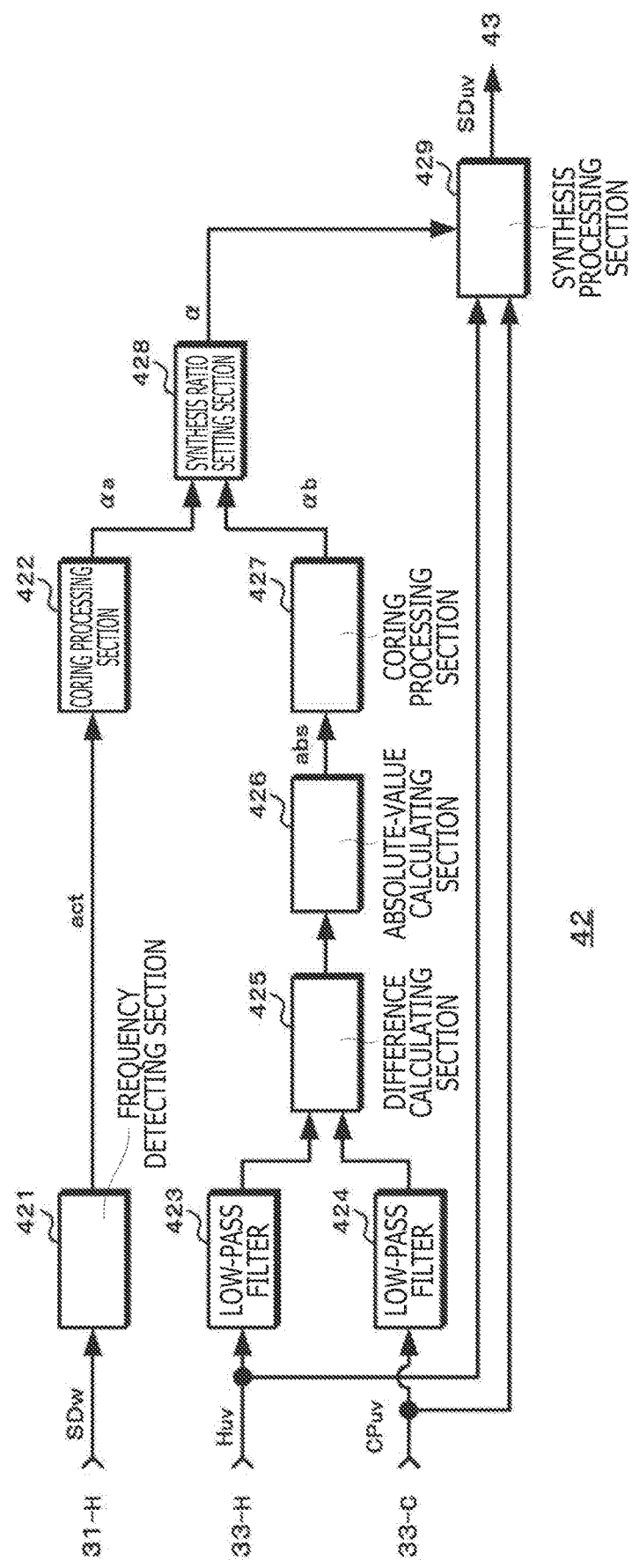
FIG. 19 is a diagram illustrating a configuration of a signal synthesizing section.

FIG. 19 illustrates a configuration of the signal synthesizing section. The signal synthesizing section 42 includes a frequency detecting section 421, a coring processing section 422, low-pass filters 423 and 424, a difference calculating section 425, an absolute-value calculating section 426, a coring processing section 427, a synthesis ratio setting section 428, and a synthesis processing section 429.

Figure 20:
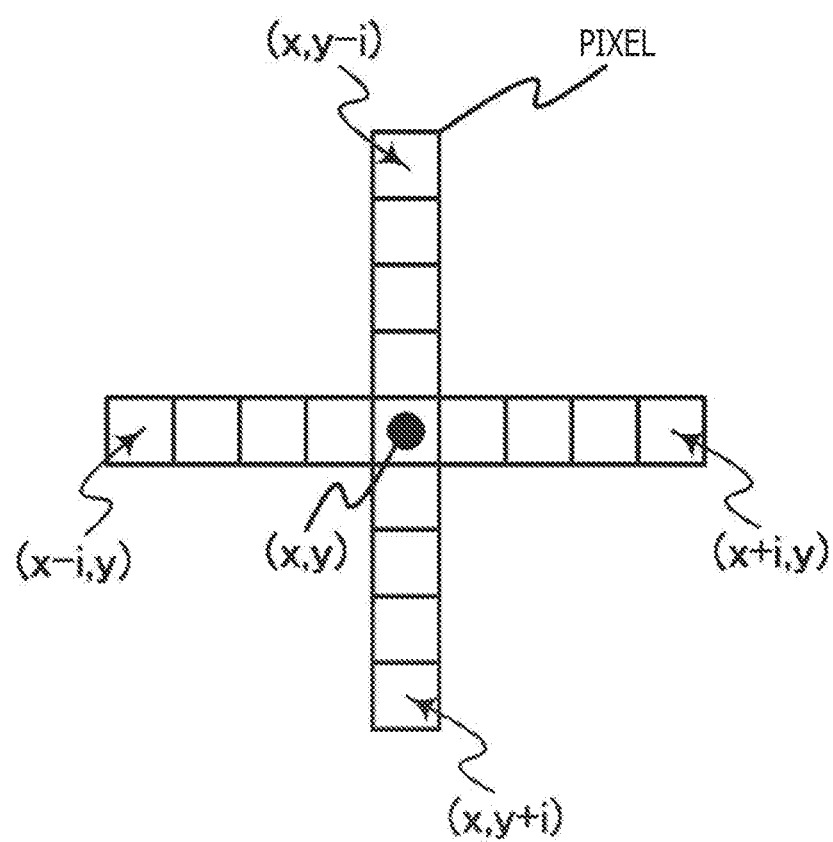
FIG. 20 is a diagram illustrating operations of a frequency detecting section.

The frequency detecting section 421 uses the luminance signal SDw generated by the interpolation section 31-H to detect, for each pixel, what frequency characteristics the image including the detection target pixel has. FIG. 20 is a diagram illustrating operations of the frequency detecting section. The frequency detecting section 421, for example, performs a calculation indicated in Math (19) on a pixel position (x, y) in a luminance image indicated by the luminance signal SDw, to calculate an activity $act_{HOR}$ indicating frequency characteristics in the horizontal direction. Note that, in Math (19), "i" is a parameter indicative of a moving position within a measurement range and that, in FIG. 20, the value of "i=1 to 4" and the measurement range corresponds to nine pixels. In addition, in Math (19), a dynamic range DMR is a difference value between the maximum value and the minimum value of the pixel value DW within the measurement range as indicated in Math (20).

[Math 4]

$$act_{HOR} = \frac{1}{DR}\sum_{i}|DW_{x-i,y} - DW_{x-i+1,y}| \qquad (19)$$

$$DR = \underset{i}{\mathrm{MAX}}(DW) - \underset{i}{\mathrm{MIN}}(DW) \qquad (20)$$

Note that the imaging section 21-H sets the activity $act_{HOR}=0$ in a case where the dynamic range DMR is smaller than or equal to a noise intensity σ of the imaging section 21-H because possible noise in the imaging element degrades the image quality performance.

The frequency detecting section 421 calculates an activity $act_{VER}$ in the vertical direction as is the case with the horizontal direction, and designates the sum of the activity $act_{HOR}$ in the horizontal direction and the activity $act_{VER}$ in the vertical direction as the activity act of the pixel position (x, y) as indicated in Math (21). The frequency detecting section 421 calculates and outputs the activity act for each pixel to the coring processing section 422.

$$\text{act} = \text{act}_{HOR} + \text{act}_{VER} \tag{21}$$

Figure 21:
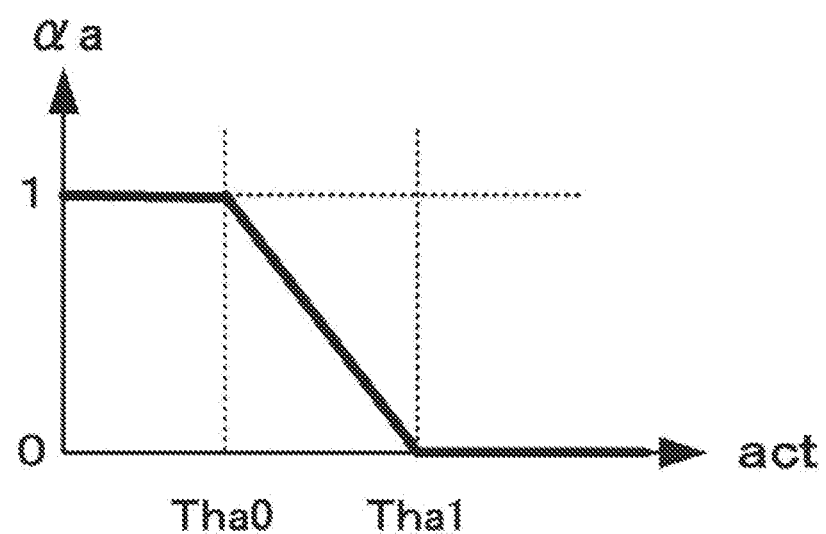
FIG. 21 is a diagram illustrating a coring curve stored in a coring processing section 422.

The coring processing section 422 sets, for each pixel, a synthesis ratio (blend ratio) αa corresponding to the activity act. The coring processing section 422 stores a coring curve indicative of the synthesis ratio αa with respect to the activity act, and determines, from the coring curve, the synthesis ratio αa with respect to the activity act detected by the frequency detecting section 421. FIG. 21 illustrates a coring curve stored in the coring processing section 422. For example, in a case where the activity act is smaller than or equal to a threshold Tha0, the coring curve indicates the synthesis ratio "αa=1." In a case where the activity act is larger than the threshold Tha0 and smaller than or equal to a threshold Tha1, the synthesis ratio is sequentially reduced from "αa=1" to "αa=0" with increasing activity act. Furthermore, in a case where the activity act is larger than the threshold Tha1, the synthesis ratio "αa=0." The coring processing section 422 sets the synthesis ratio αa corresponding to the activity act and outputs the set synthesis ratio αa to the synthesis ratio setting section 428. Note that FIG. 21 and a coring curve described below are illustrative and that the present embodiment is not limited to the linear variation of the synthesis ratio according to the activity act.

The low-pass filter 423 executes low-pass filter processing on the color difference signal Huv and the low-pass filter 424 executes low-pass filter processing on the parallax-compensated color difference signal CPuv to make bands of the respective color difference signals equal. In addition, the low-pass filters 423 and 424 execute the low-pass filter processing to remove noise components such as false colors from the color difference signals. The low-pass filters 423 and 424 output the filtered color difference signals to the difference calculating section 425.

The difference calculating section 425 calculates, for each pixel, the difference between the color difference signal Huv resulting from the low-pass filter processing and supplied from the low-pass filter 423 and the parallax-compensated color difference signal CPuv resulting from the low-pass filter processing and supplied from the low-pass filter 423, and outputs the difference to the absolute-value calculating section 426.

The absolute-value calculating section 426 calculates a difference absolute value abs calculated for each pixel by the difference calculating section 425, and outputs the difference absolute value abs to the coring processing section 427.

Figure 22:
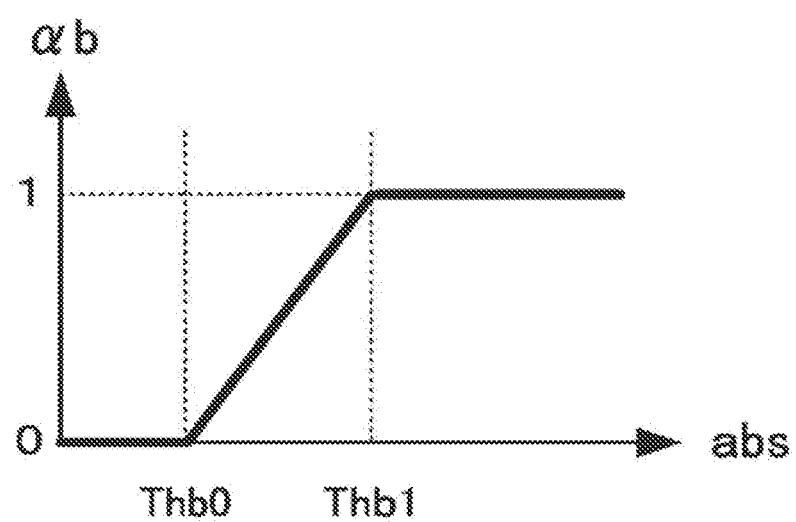
FIG. 22 is a diagram illustrating a coring curve stored in a coring processing section 427.

The coring processing section 427 sets a synthesis ratio αb corresponding to the difference absolute value abs. The coring processing section 427 stores a coring curve indicative of the synthesis ratio αb with respect to the difference absolute value abs, and determines, from the coring curve, a synthesis ratio αb2 with respect to the difference absolute value abs calculated by the absolute-value calculating section 426. FIG. 22 illustrates a coring curve stored in the coring processing section 427. For example, in a case where the difference absolute value abs is smaller than or equal to a threshold Thb0, the coring curve indicates the synthesis ratio "αb=0." In a case where the difference absolute value abs is larger than the threshold Thb0 and smaller than or equal to a threshold Thb1, the synthesis ratio is sequentially reduced from "αb=0" to "αb=1" with increasing difference absolute value abs. Furthermore, in a case where the difference absolute value abs is larger than the threshold Thb1, the synthesis ratio "αb=1." The coring processing section 427 sets the synthesis ratio αb corresponding to the difference absolute value abs and outputs the set synthesis ratio αb to the synthesis ratio setting section 428.

The synthesis ratio setting section 428 uses the synthesis ratio αa supplied from the coring processing section 422 and the synthesis ratio αb supplied from the coring processing section 427 to execute processing in Math (22). The synthesis ratio setting section 428 sets the larger of the values of the synthesis ratios αa and αb as a synthesis ratio for the color difference signal Huv and the parallax-compensated color difference signal CPuv, and outputs the synthesis ratio to the synthesis processing section 429.

$$\alpha = \max(\alpha a, \alpha b) \tag{22}$$

The synthesis processing section 429 uses the synthesis ratio α set by the synthesis ratio setting section 428 to perform a calculation in Math (23) for each pixel to generate a color difference signal SDuv into which the color difference signal Huv and the parallax-compensated color difference signal CPuv are synthesized. That is, in a high frequency region, the image quality performance is degraded by false colors, and thus, in a case where the risk of degradation of the image quality performance is lower than a threshold, the color difference signal Huv and the parallax-compensated color difference signal CPuv are synthesized in a synthesis ratio corresponding to the risk of degradation of the image quality performance, thus making the image quality performance higher than or equal to that achieved by using only the color difference signal Huv. In addition, in a case where the risk of degradation of the image quality performance is higher than or equal to the threshold, the synthesis ratio α=1 is set and the color difference signal Huv is used.

$$\text{SDuv} = \alpha \times \text{Huv} + (1-\alpha) \times \text{CPuv} \tag{23}$$

The image processing section 30-2 outputs the luminance signal SDw output from the interpolation section 31-H and the color difference signal SDuv output from the signal synthesizing section 42, to the display section 53 and the recording section 56 as image signals for a fusion image.

Figure 23:
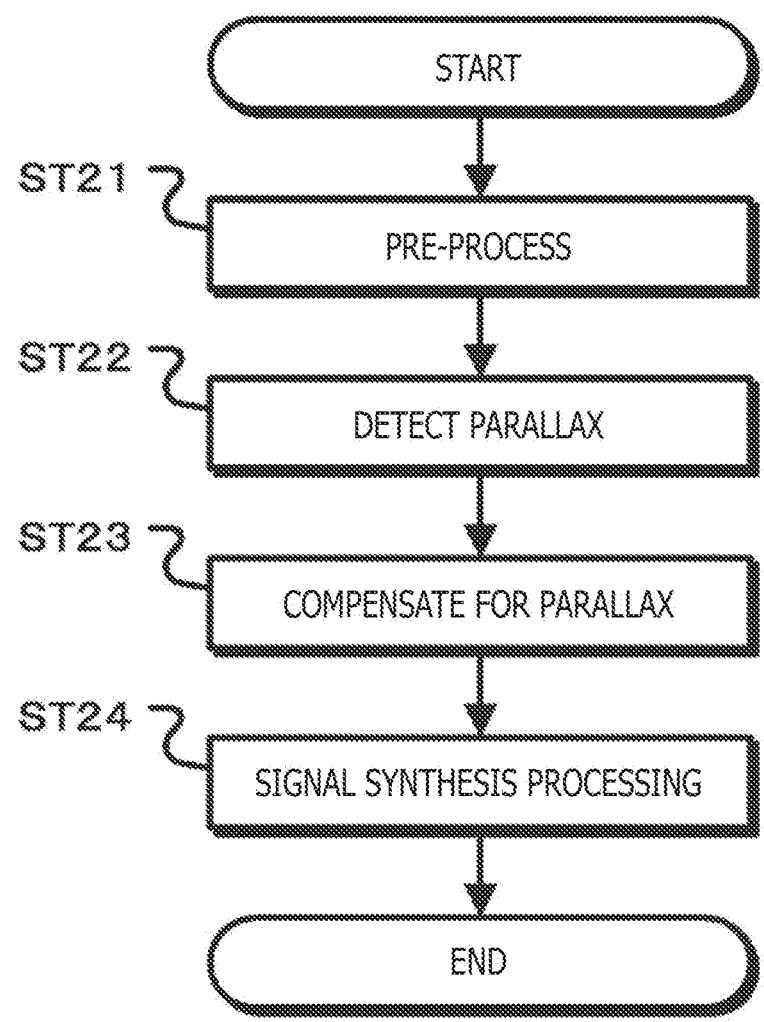
FIG. 23 is a flowchart illustrating operations of the second embodiment of the image processing section.

FIG. 23 is a flowchart illustrating operations of the second embodiment of the image processing section. In step ST21, the image processing section 30-2 executes preprocessing. The image processing section 30-2 executes processing in the flowchart illustrated in FIG. 17 to generate a luminance signal SDw and a color difference signal Huv, and a luminance signal Cy and a color difference signal Cuv, and then proceeds to step ST22.

In step ST22, the image processing section 30-2 performs parallax detection. The image processing section 30-2 uses the luminance signal Hy and the luminance signal Cy generated by the preprocessing in step ST21 to perform parallax detection to generate parallax information DTa indicative of a parallax detection result, and then proceeds to step ST23.

In step ST23, the image processing section 30-2 performs parallax compensation. The image processing section 30-2 uses the parallax information DTa generated in step ST22 to perform parallax compensation for the color difference signal Cuv for the viewpoint of the imaging section 21-C generated in step ST21. The image processing section 30-2 thus generates a parallax-compensated color difference signal CPuv corresponding to the viewpoint of the imaging section 21-H, and proceeds to step ST24.

In step ST24, the image processing section 30-2 executes signal selection processing. The image processing section 30-2 synthesizes the color difference signal Huv and the parallax-compensated color difference signal CPuv to generate a color difference signal SDuv so as not to degrade the image quality performance. Furthermore, the image processing section 30-2 outputs, to the display section, the recording section, and the like, the luminance signal SDw generated by the preprocessing in step ST21 and the color difference signal SDuv generated by the signal synthesis processing. Note that the image processing section 30-2 may use spline processing to execute sequential processing for each pixel instead of ordered processing in which processing is executed in order of steps.

According to the second embodiment as described above, the image processing section 30-2 executes processing of performing parallax compensation for the color difference signal corresponding to the second viewpoint and having a high color resolution and synthesizing, in pixel units according to the risk of degradation of the image quality performance, the generated parallax-compensated color difference signal and the color difference signal corresponding to the first viewpoint and having a lower color resolution than the color difference signal for the second viewpoint. In addition, the image processing section 30-2 outputs, to the display section 53 and the recording section 56, the luminance signal corresponding to the first viewpoint and having a high resolution and the color difference signal generated by the synthesis processing. Accordingly, the use of the image processing section 30-2 allows display and recording of a captured image having higher image quality performance than the captured image acquired by the imaging section 21-H or the imaging section 21-C. In addition, the processing is executed in which the color difference signals are synthesized in pixel units so as not to degrade the image quality performance, allowing prevention of the color shift or missing or the like in pixel units.

5. Third Embodiment

Now, a third embodiment of the image processing section will be described. In the third embodiment, parallax detection accuracy is improved to allow parallax compensation to be accurately performed on the parallax-compensated color difference signal CPuv. This reduces degradation of the image quality caused by selection between the color difference signal Huv and the parallax-compensated color difference signal CPuv in captured image units and improves determination accuracy of the fallback determination.

Figure 24:
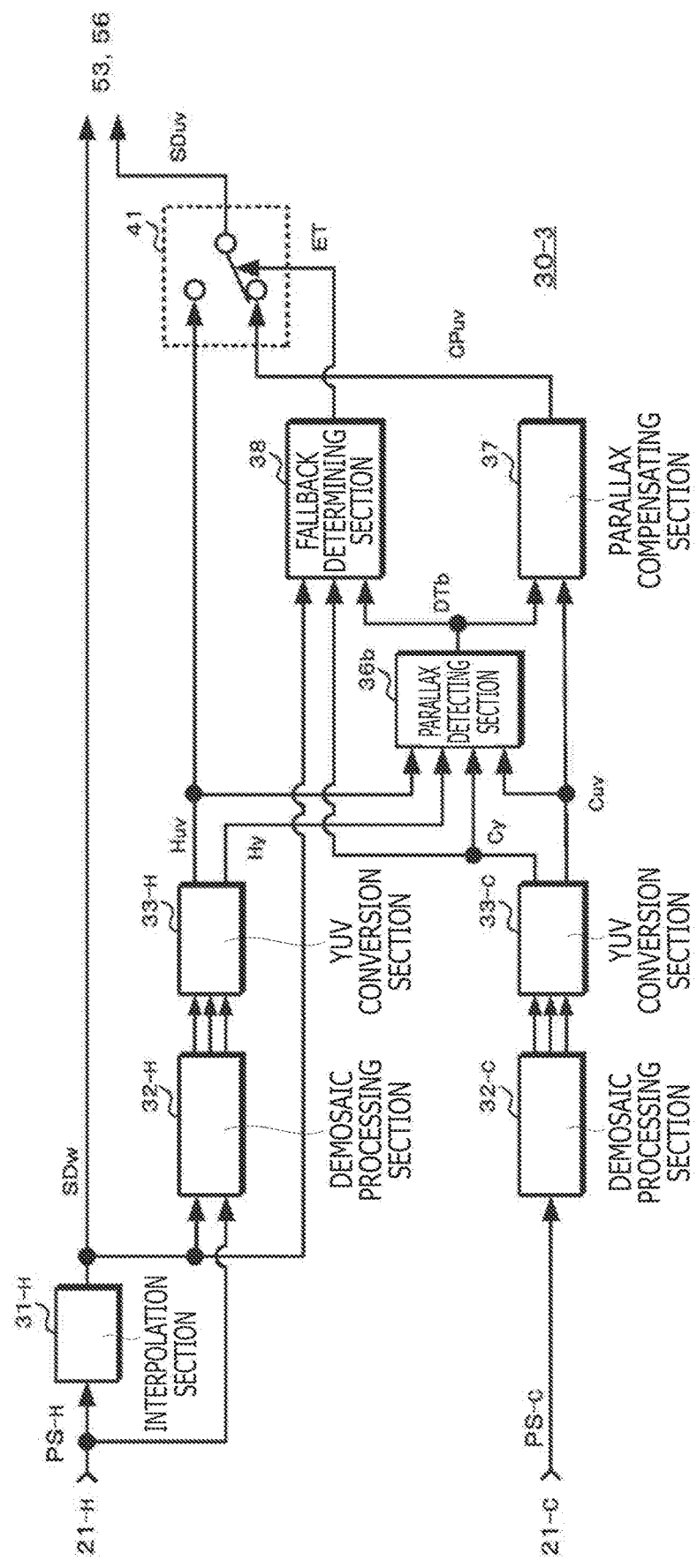
FIG. 24 is a diagram illustrating a configuration of a third embodiment of the image processing section.

FIG. 24 illustrates a configuration of the third embodiment of the image processing section. An image processing section 30-3 includes the interpolation section 31-H, the demosaic processing section 32-H, the YUV converting section 33-H, the demosaic processing section 32-C, the YUV converting section 33-C, a parallax detecting section 36b, the parallax compensating section 37, the fallback determining section 38, and the signal selecting section 41.

The imaging signal PS-H output from the imaging section 21-H is input to the interpolation section 31-H and the demosaic processing section 32-H. In addition, the imaging signal PS-C output from the imaging section 21-C is input to the demosaic processing section 32-C.

The interpolation section 31-H uses the imaging signal PS-H to execute interpolation processing to calculate the pixel value for each white pixel at the position of a red pixel or a blue pixel, generating a luminance signal SDw. The interpolation section 31-H outputs the luminance signal SDw to the demosaic processing section 32-H and the fallback determining section 38 and to the display section 53 and the recording section 56.

The demosaic processing section 32-H uses the imaging signal PS-H output from the imaging section 21-H and the luminance signal SDw generated by the interpolation section 31-H to generate an image signal for each color component and outputs the resultant image signals to the YUV converting section 33-H. The demosaic processing section 32-C uses the imaging signal PS-C output from the imaging section 21-C to execute demosaic processing similar to that of the related art to generate an image signal for each color component, and outputs the resultant image signals to the YUV converting section 33-C.

The YUV converting section 33-H performs color space conversion on the image signals for the three primary colors generated by the demosaic processing section 32-H to generate a luminance signal Hy and a color difference signal Huv. The YUV converting section 33-H outputs the generated luminance signal Hy to the parallax detecting section 36b and outputs the color difference signal Huv to the parallax detecting section 36b and the signal selecting section 41. The YUV converting section 33-C performs color space conversion on the image signals for the three primary colors generated by the demosaic processing section 32-C to generate a luminance signal Cy and a color difference signal Cuv. The YUV converting section 33-C outputs the generated luminance signal Cy to the parallax detecting section 36b and the fallback determining section 38 and outputs the color difference signal Cuv to the parallax detecting section 36b and the parallax compensating section 37.

Figure 25:
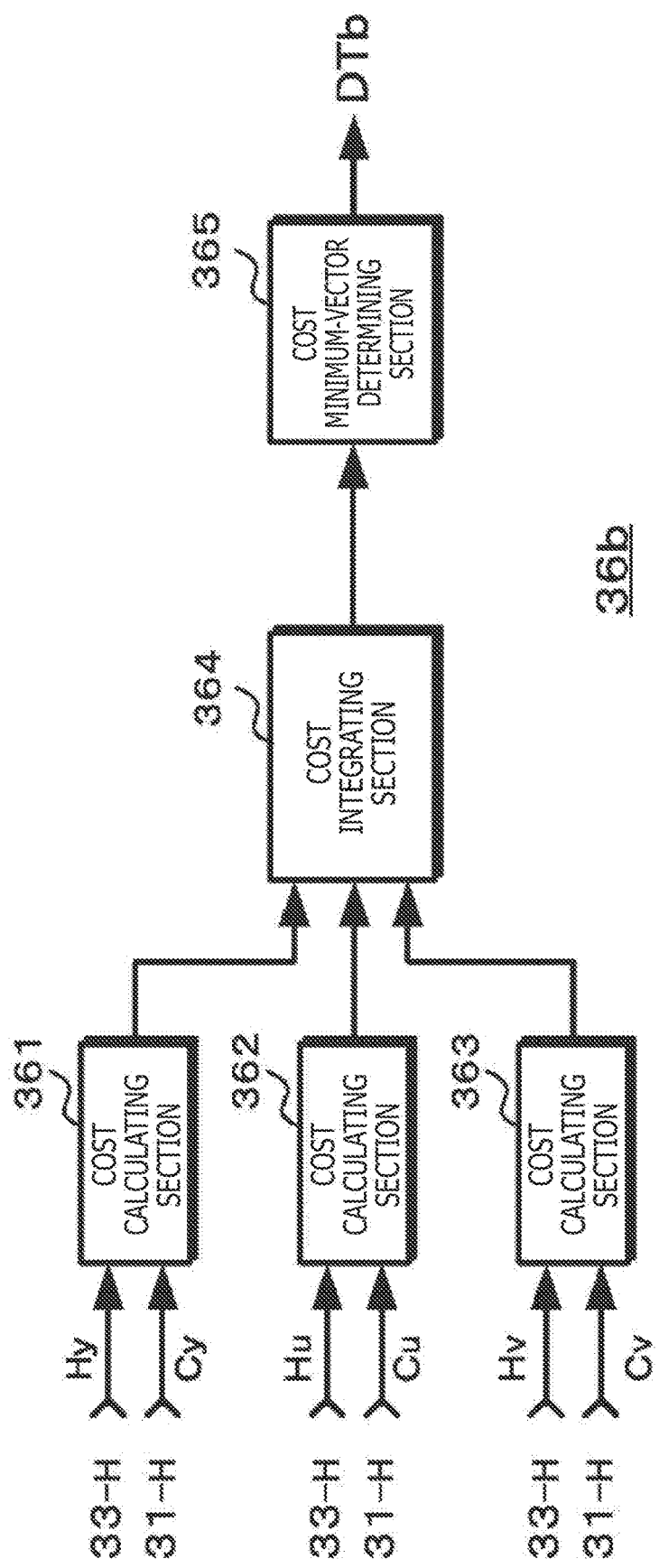
FIG. 25 is a diagram illustrating a configuration of a parallax detecting section.

The parallax detecting section 36b uses the luminance signals Hy and Cy and the color difference signals Huv and CuV to perform parallax detection. FIG. 25 illustrates a configuration of the parallax detecting section. The parallax detecting section 36b includes cost calculating sections 361, 362, and 363, a cost integrating section 364, and a cost minimization vector determining section 365.

The cost calculating sections 361, 362, and 363 calculates a cost using a base image based on a parallax detection target pixel position in the captured image acquired by the imaging section 21-H and a reference image in the captured image acquired by the imaging section 21-C.

The cost calculating section 361 uses a signal for the base image in the luminance signal Hy and a signal for the reference image in the luminance signal Cy to calculate a cost value (for example, SAD) COSTy and outputs the cost value COSTy to the cost integrating section 364. The cost calculating section 362 uses a signal for the base image in the color difference signal Hu and a signal for the reference image in the color difference signal Cu to calculate a cost value (for example, SAD) COSTu and outputs the cost value COSTu to the cost integrating section 364. The cost calculating section 362 uses a signal for the base image in the color difference signal Hv and a signal for the reference image in the color difference signal Cv to calculate a cost value (for example, SAD) COSTv and outputs the cost value COSTv to the cost integrating section 364.

The cost integrating section 364 integrates the cost values calculated by the cost calculating sections 361, 362, and 363. For example, the cost integrating section 364 designates the sum of the cost values as a cost value COST (=COSTy+COCTu+COCTv).

In addition, the cost calculating sections 361, 362, and 363 moves the reference image within a search range and calculates the cost value, and the cost integrating section 364 sequentially calculates the cost value COST for each moved reference image and outputs the cost value COST to the cost minimization vector determining section 365.

The cost minimization vector determining section 365 uses, as parallax information DB, vector information indicative of the position of the reference image corresponding to a minimum cost value COST with respect to the base image. Note that SSD may be used as the cost value and that the present embodiment is not limited to the block matching and any other technology may be used.

The parallax compensating section 37 performs parallax compensation for the color difference signal Cuv generated by the YUV converting section 33-C on the basis of the parallax information DTb supplied from the parallax detecting section 36b. The parallax compensating section 37 moves the pixel positions on the basis of the parallax information generated by the parallax detecting section 36b with respect to the color difference signal Cuv, to generate a parallax-compensated color difference signal CPuv corresponding to the viewpoint of the captured image acquired by the imaging section 21-H. The parallax compensating section 37 outputs the generated parallax-compensated color difference signal CPuv to the signal selecting section 41.

The fallback determining section 38 determines the risk of deterioration of the image quality performance on the basis of the luminance signal SDw supplied from the interpolation section 31-H and the luminance signal Cy supplied from the YUV converting section 33-C, and the parallax information DTb supplied from the parallax detecting section 36b. Furthermore, the fallback determining section 38 generates a signal selection control signal ET for selecting the parallax-compensated color difference signal CPuv, having a higher color resolution than the color difference signal Huv generated by the YUV converting section 33-H, in a case where there is no risk of degradation of the image quality performance, while selecting the color difference signal Huv in a case where there is a risk of degradation of the image quality performance. The fallback determining section 38 then outputs the signal selection control signal ET to the signal selecting section 41.

On the basis of the signal selection control signal ET from the fallback determining section 38, the signal selecting section 41 outputs, as a color difference signal SDuv, one of the color difference signal Huv generated by the YUV converting section 33-H or the parallax-compensated color difference signal CPuv generated by the YUV converting section 33-C and on which the parallax compensation has been performed.

The image processing section 30-3 outputs the luminance signal SDw output from the interpolation section 31-H and the color difference signal SDuv output from the signal selecting section 41, to the display section 53 and the recording section 56 as image signals for a fusion image.

Note that, in the third embodiment of the image processing section, operations depicted in FIG. 16 may be performed and that, in the parallax detection in step ST2, the luminance signals Hy and Cy and the color difference signals Huv and Cuv may be used for the parallax detection as described above.

As described above, according to the third embodiment of the image processing section, a captured image can be displayed or recorded that has higher image quality performance than the captured image acquired by the imaging section 21-H or the imaging section 21-C as is the case with the first embodiment. In addition, even in a case where the fusion processing involves a risk of degradation of the image quality performance, degradation of the image quality performance can be prevented. Furthermore, accurate parallax compensation is achieved, and thus, compared to the first embodiment, the present embodiment can reduce degradation of the image quality caused by selection, in captured image units, between the color the difference signal for the first viewpoint and the parallax-compensated color difference signal with a high resolution. In addition, determination accuracy of the fallback determination can be made higher in the present embodiment than in the first embodiment.

6. Fourth Embodiment

Now, a fourth embodiment of the image processing section will be described. In the fourth embodiment, the parallax detection accuracy is improved to allow accurate parallax compensation for the parallax-compensated color difference signal CPuv. This reduces degradation of the image quality caused by the synthesis processing, in pixel units, for the color difference signal Huv and the parallax-compensated color difference signal CPuv.

Figure 26:
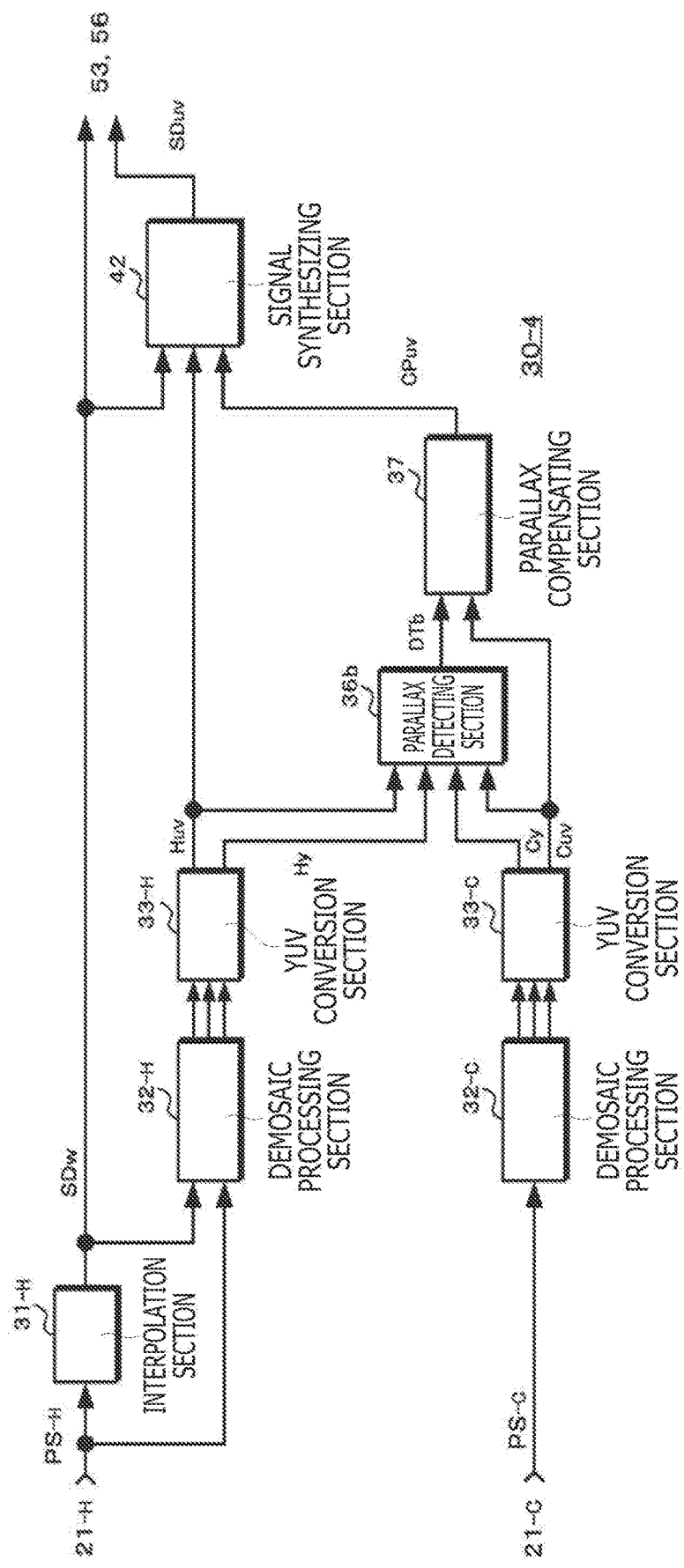
FIG. 26 is a diagram illustrating a configuration of a fourth embodiment of the image processing section.

FIG. 26 illustrates a configuration of the fourth embodiment of the image processing section. Note that, compared to the components of the above-described embodiments, corresponding components are denoted by the same reference signs. An image processing section 30-4 includes the interpolation section 31-H, the demosaic processing section 32-H, the YUV converting section 33-H, the demosaic processing section 32-C, the YUV converting section 33-C, the parallax detecting section 36b, the parallax compensating section 37, and the signal synthesizing section 42.

The imaging signal PS-H output from the imaging section 21-H is input to the interpolation section 31-H and the demosaic processing section 32-H. In addition, the imaging signal PS-C output from the imaging section 21-C is input to the demosaic processing section 32-C.

The interpolation section 31-H uses the imaging signal PS-H to execute interpolation processing to calculate the pixel value for each white pixel at the position of a red pixel or a blue pixel, generating a luminance signal SDw. The interpolation section 31-H outputs the luminance signal SDw to the demosaic processing section 32-H and the signal synthesizing section 42 and to the display section 53 and the recording section 56.

The demosaic processing section 32-H uses the imaging signal PS-H output from the imaging section 21-H and the luminance signal SDw generated by the interpolation section 31-H to generate an image signal for each color component and outputs the resultant image signals to the YUV converting section 33-H. The demosaic processing section 32-C uses the imaging signal PS-C output from the imaging section 21-C to execute demosaic processing similar to that of the related art to generate an image signal for each color component, and outputs the resultant image signals to the YUV converting section 33-C.

The YUV converting section 33-H performs color space conversion on the image signals for the three primary colors generated by the demosaic processing section 32-H to generate a luminance signal Hy and a color difference signal Huv. The YUV converting section 33-H outputs the generated luminance signal Hy to the parallax detecting section 36b and outputs the color difference signal Huv to the parallax detecting section 36b and the signal synthesizing section 42. The YUV converting section 33-C performs color space conversion on the image signals for the three primary colors generated by the demosaic processing section 32-C to generate a luminance signal Cy and a color difference signal Cuv. The YUV converting section 33-C outputs the generated luminance signal Cy to the parallax detecting section 36a and outputs the color difference signal Cuv to the parallax detecting section 36b and the parallax compensating section 37.

The parallax detecting section 36b uses the luminance signal Hy and the color difference signal Huv from the YUV converting section 33-H and the luminance signal Cy and the color difference signal Cuv from the YUV converting section 33-C to detect a parallax of the captured image acquired by the imaging section 21-C using, as a base captured image, the captured image acquired by the imaging section 21-H. The parallax detecting section 36b outputs, to the parallax compensating section 37, parallax information DTb indicative of a parallax detection result.

The parallax compensating section 37 performs parallax compensation for the color difference signal Cuv generated by the YUV converting section 33-C on the basis of the parallax information DTb supplied from the parallax detecting section 36b, to generate a parallax-compensated color difference signal CPuv corresponding to the viewpoint for the captured image acquired by the imaging section 21-H. The parallax compensating section 37 outputs the generated parallax-compensated color difference signal CPuv to the signal synthesizing section 42.

The signal synthesizing section 42 synthesizes the color difference signal Huv and the parallax-compensated color difference signal CPuv so as not to degrade the image quality performance.

The image processing section 30-4 outputs the luminance signal SDw output from the interpolation section 31-H and the color difference signal SDuv generated by the signal synthesizing section 42 and resulting from synthesis, to the display section 53 and the recording section 56 as image signals for a fusion image.

Note that, in the fourth embodiment of the image processing section, operations depicted in FIG. 23 may be performed and that, in the parallax detection in step ST22, the luminance signals Hy and Cy and the color difference signals Huv and Cuv may be used for the parallax detection as described above.

As described above, according to the fourth embodiment of the image processing section, a captured image can be displayed or recorded that has higher image quality performance than the captured image acquired by the imaging section 21-H or the imaging section 21-C as is the case with the second embodiment. In addition, compared to the second embodiment, the present embodiment can reduce degradation of the image quality caused by the synthesis processing, in pixel units, for the color difference signal for the first viewpoint and the parallax-compensated color difference signal with a high resolution.

7. Fifth Embodiment

A fifth embodiment of the image processing section will be described. In the fifth embodiment, as is the case with the third embodiment, the parallax detection accuracy is improved to allow accurate parallax compensation for the parallax-compensated color difference signal CPuv. This reduces degradation of the image quality caused by the selection, in pixel units, between the color difference signal Huv and the parallax-compensated color difference signal CPuv and improves the determination accuracy of the fallback determination. In addition, in the fifth embodiment, the luminance signal SDw is used for the parallax detection.

Figure 27:
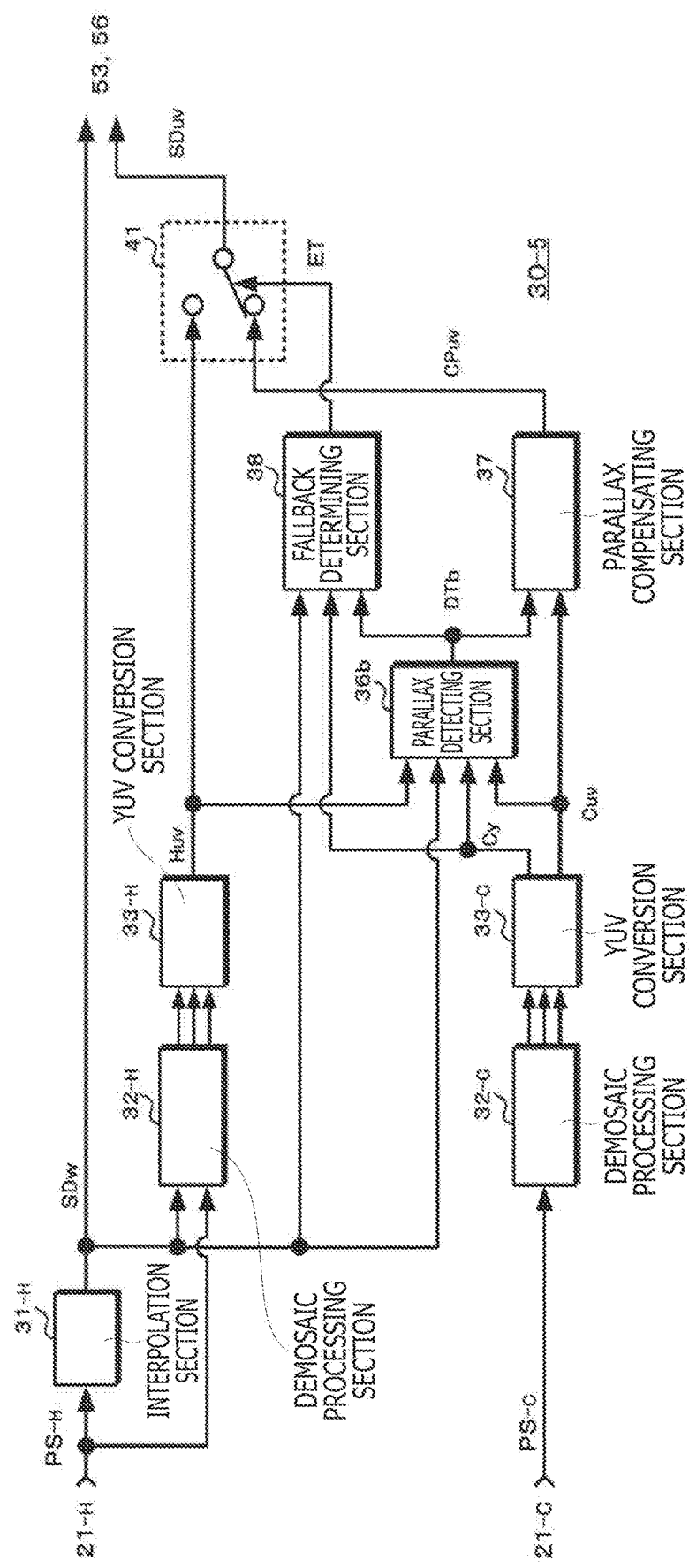
FIG. 27 is a diagram illustrating a configuration of a fifth embodiment of the image processing section.

FIG. 27 illustrates the fifth embodiment of the image processing section. An image processing section 30-5 includes the interpolation section 31-H, the demosaic processing section 32-H, the YUV converting section 33-H, the demosaic processing section 32-C, the YUV converting section 33-C, the parallax detecting section 36b, the parallax compensating section 37, the fallback determining section 38, and the signal selecting section 41.

The imaging signal PS-H output from the imaging section 21-H is input to the interpolation section 31-H and the demosaic processing section 32-H. In addition, the imaging signal PS-C output from the imaging section 21-C is input to the demosaic processing section 32-C.

The interpolation section 31-H uses the imaging signal PS-H to execute interpolation processing to calculate the pixel value for each white pixel at the position of a red pixel or a blue pixel, generating a luminance signal SDw. The interpolation section 31-H outputs the luminance signal SDw to the demosaic processing section 32-H, the parallax detecting section 36b, and the fallback determining section 38 and to the display section 53 and the recording section 56.

The demosaic processing section 32-H uses the imaging signal PS-H output from the imaging section 21-H and the luminance signal SDw generated by the interpolation section 31-H to generate an image signal for each color component and outputs the resultant image signals to the YUV converting section 33-H. The demosaic processing section 32-C uses the imaging signal PS-C output from the imaging section 21-C to execute demosaic processing similar to that of the related art to generate an image signal for each color component, and outputs the resultant image signals to the YUV converting section 33-C.

The YUV converting section 33-H performs color space conversion on the image signals for the three primary colors generated by the demosaic processing section 32-H to generate a color difference signal Huv. The YUV converting section 33-H outputs the generated color difference signal Huv to each of the parallax detecting section 36b and the signal selecting section 412. The YUV converting section 33-C performs color space conversion on the image signals for the three primary colors generated by the demosaic processing section 32-C to generate a luminance signal Cy and a color difference signal Cuv. The YUV converting section 33-C outputs the generated luminance signal Cy to the parallax detecting section 36b and the fallback determining section 38 and outputs the color difference signal Cuv to the parallax detecting section 36b and the parallax compensating section 37.

The parallax detecting section 36b uses the luminance signals SDw and Cy and the color difference signals Huv and CuV to perform parallax detection to generate parallax information DTb indicative of a detected parallax, and outputs the parallax information DTb to the parallax compensating section 37 and the fallback determining section 38.

The parallax compensating section 37 performs parallax compensation for the color difference signal Cuv generated by the YUV converting section 33-C, on the basis of the parallax information DTb supplied from the parallax detecting section 36b. The parallax compensating section 37 moves the pixel positions on the basis of the parallax information generated by the parallax detecting section 36b with respect to the color difference signal Cuv, to generate a parallax-compensated color difference signal CPuv corresponding to the viewpoint of the captured image acquired by the imaging section 21-H. The parallax compensating section 37 outputs the generated parallax-compensated color difference signal CPuv to the signal selecting section 41.

The fallback determining section 38 determines the risk of degradation of the image quality performance on the basis of the luminance signal SDw supplied from the interpolation section 31-H and the luminance signal Cy supplied from the YUV converting section 33-C, and the parallax information DTb supplied from the parallax detecting section 36b. Furthermore, the fallback determining section 38 generates a signal selection control signal ET for selecting the parallax-compensated color difference signal CPuv, having a higher color resolution than the color difference signal Huv generated by the YUV converting section 33-H, in a case where there is no risk of degradation of the image quality performance, while selecting the color difference signal Huv in a case where there is a risk of degradation of the image quality performance. The fallback determining section 38 then outputs the signal selection control signal ET to the signal selecting section 41.

On the basis of the signal selection control signal ET from the fallback determining section 38, the signal selecting section 41 outputs, as a color difference signal SDuv, one of the color difference signal Huv generated by the YUV converting section 33-H or the parallax-compensated color difference signal CPuv generated by the YUV converting section 33-C and on which the parallax compensation has been performed.

The image processing section 30-3 outputs the luminance signal SDw output from the interpolation section 31-H and the color difference signal SDuv output from the signal selecting section 41, to the display section 53 and the recording section 56 as image signals for a fusion image.

Note that, in the fifth embodiment of the image processing section, the operations depicted in FIG. 16 may be performed and that, in the parallax detection in step ST2, the luminance signals SDw and Cy and the color difference signals Huv and Cuv may be used for the parallax detection as described above.

In this manner, according to the fifth embodiment of the image processing section, advantageous effects similar to those of the third embodiment can be obtained. Note that the fifth embodiment uses not only the color difference signal but also the luminance signal for the parallax detection and can thus achieve more accurate parallax detection than the third embodiment, which uses the color difference signal for the parallax detection.

8. Sixth Embodiment

A sixth embodiment of the image processing section will be described. In the sixth embodiment, as is the case with the fourth embodiment, the parallax detection accuracy is improved to allow accurate parallax compensation for the parallax-compensated color difference signal CPuv. This reduces degradation of the image quality caused by the synthesis processing for the color difference signal Huv and the parallax-compensated color difference signal CPuv. In addition, in the sixth embodiment, the luminance signal SDw is used for the parallax detection.

Figure 28:
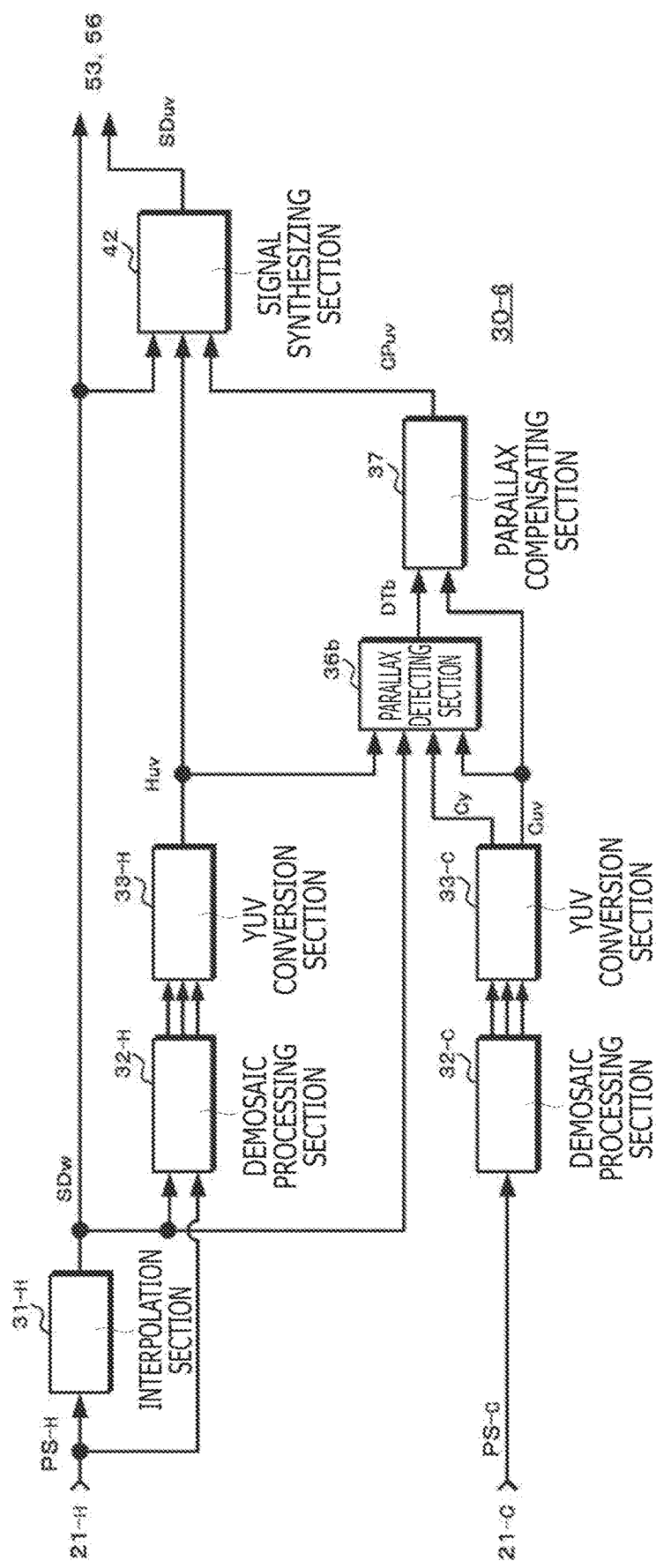
FIG. 28 is a diagram illustrating a configuration of a sixth embodiment of the image processing section.

FIG. 28 illustrates a configuration of the sixth embodiment of the image processing section. Note that, compared to the components of the above-described embodiments, corresponding components are denoted by the same reference signs. An image processing section 30-4 includes the interpolation section 31-H, the demosaic processing section 32-H, the YUV converting section 33-H, the demosaic processing section 32-C, the YUV converting section 33-C, the parallax detecting section 36b, the parallax compensating section 37, and the signal synthesizing section 42.

The imaging signal PS-H output from the imaging section 21-H is input to the interpolation section 31-H and the demosaic processing section 32-H. In addition, the imaging signal PS-C output from the imaging section 21-C is input to the demosaic processing section 32-C.

The interpolation section 31-H uses the imaging signal PS-H to execute interpolation processing to calculate the pixel value for each white pixel at the position of a red pixel or a blue pixel, generating a luminance signal SDw. The interpolation section 31-H outputs the luminance signal SDw to the demosaic processing section 32-H, the parallax detecting section 36b, and the signal synthesizing section 42 and to the display section 53 and the recording section 56.

The demosaic processing section 32-H uses the imaging signal PS-H output from the imaging section 21-H and the luminance signal SDw generated by the interpolation section 31-H to generate an image signal for each color component and outputs the resultant image signals to the YUV converting section 33-H. The demosaic processing section 32-C uses the imaging signal PS-C output from the imaging section 21-C to execute demosaic processing similar to that of the related art to generate an image signal for each color component, and outputs the resultant image signals to the YUV converting section 33-C.

The YUV converting section 33-H performs color space conversion on the image signals for the three primary colors generated by the demosaic processing section 32-H to generate a color difference signal Huv. The YUV converting section 33-H outputs the generated color difference signal Huv to each of the parallax detecting section 36b and the signal synthesizing section 42. The YUV converting section 33-C performs color space conversion on the image signals for the three primary colors generated by the demosaic processing section 32-C to generate a luminance signal Cy and a color difference signal Cuv. The YUV converting section 33-C outputs the generated luminance signal Cy to the parallax detecting section 36a and outputs the color difference signal Cuv to the parallax detecting section 36b and the parallax compensating section 37.

The parallax detecting section 36b uses the luminance signal SDw from the interpolation section 31-H, the color difference signal Huv from the YUV converting section 33-H, and the luminance signal Cy and the color difference signal Cuv from the YUV converting section 33-C to detect a parallax of the captured image acquired by the imaging section 21-C using, as a base captured image, the captured image acquired by the imaging section 21-C. The parallax detecting section 36b outputs, to the parallax compensating section 37, parallax information DTb indicative of a parallax detection result.

The parallax compensating section 37 performs parallax compensation for the color difference signal Cuv generated by the YUV converting section 33-C on the basis of the parallax information DTb supplied from the parallax detecting section 36b, to generate a parallax-compensated color difference signal CPuv corresponding to the viewpoint for the captured image acquired by the imaging section 21-H. The parallax compensating section 37 outputs the generated parallax-compensated color difference signal CPuv to the signal synthesizing section 42.

The signal synthesizing section 42 synthesizes the color difference signal Huv and the parallax-compensated color difference signal CPuv so as not to degrade the image quality performance.

The image processing section 30-6 outputs the luminance signal SDw output from the interpolation section 31-H and the color difference signal SDuv generated by the signal synthesizing section 42 and resulting from synthesis, to the display section 53 and the recording section 56 as image signals for a fusion image.

Note that, in the sixth embodiment of the image processing section, operations depicted in FIG. 23 may be performed and that, in the parallax detection in step ST22, the luminance signals SDw and Cy and the color difference signals Huv and Cuv may be used for the parallax detection as described above.

In this manner, according to the sixth embodiment of the image processing section, advantageous effects similar to those of the fourth embodiment can be obtained. Note that the sixth embodiment uses not only the color difference signal but also the luminance signal for the parallax detection and can thus achieve more accurate parallax detection than the fourth embodiment, which uses the color difference signal for the parallax detection.

9. Seventh Embodiment

Now, a seventh embodiment of the image processing section will be described. In the above-described first to seventh embodiments, the color difference signal Huv is generated using the signal for the captured image acquired by the imaging section 21-H and including fewer color pixels than the captured image acquired by the imaging section 21-C. That is, for the captured image acquired by the imaging section 21-H, a low sampling rate is used for the color pixels, and thus, for example, false colors (aliasing noise) may have occurred in the color difference signal Huv. Thus, in the seventh embodiment, in a case where the color difference signal Huv is used for the parallax detection, the parallax detection accuracy is prevented from being reduced by false colors or the like.

Figure 29:
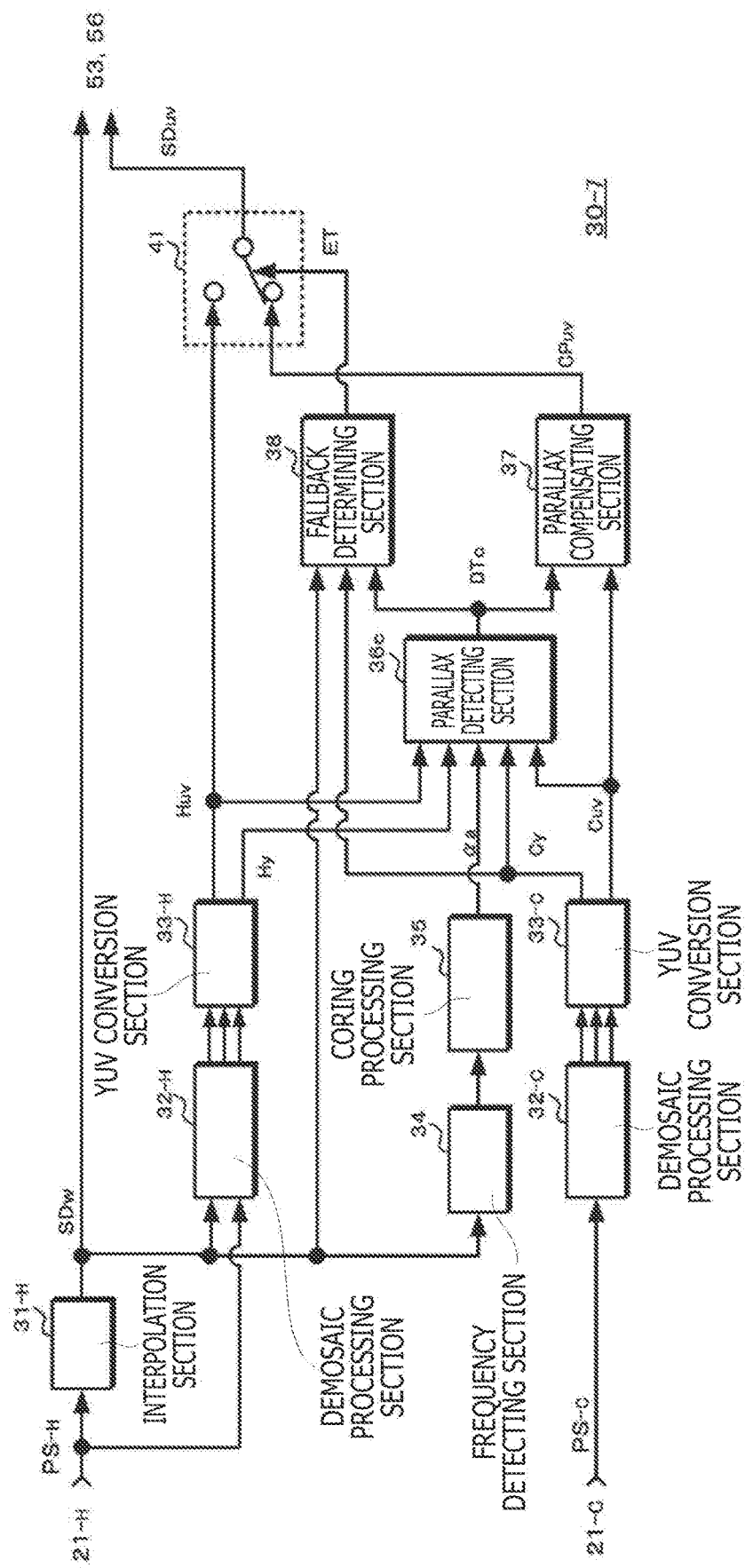
FIG. 29 is a diagram illustrating a configuration of a seventh embodiment of the image processing section.

FIG. 29 illustrates a configuration of the seventh embodiment of the image processing section. An image processing section 30-7 includes the interpolation section 31-H, the demosaic processing section 32-H, the YUV converting section 33-H, the demosaic processing section 32-C, the YUV converting section 33-C, the frequency detecting section 34, a coring processing section 35, a parallax detecting section 36c, the parallax compensating section 37, the fallback determining section 38, and the signal selecting section 41.

The imaging signal PS-H output from the imaging section 21-H is input to the interpolation section 31-H and the demosaic processing section 32-H. In addition, the imaging signal PS-C output from the imaging section 21-C is input to the demosaic processing section 32-C.

The interpolation section 31-H uses the imaging signal PS-H to execute interpolation processing to calculate the pixel value for each white pixel at the position of a red pixel or a blue pixel, generating a luminance signal SDw. The interpolation section 31-H outputs the luminance signal SDw to the demosaic processing section 32-H, the parallax detecting section 36b, and the fallback determining section 38 and to the display section 53 and the recording section 56.

The demosaic processing section 32-H uses the imaging signal PS-H output from the imaging section 21-H and the luminance signal SDw generated by the interpolation section 31-H to generate an image signal for each color component and outputs the resultant image signals to the YUV converting section 33-H. The demosaic processing section 32-C uses the imaging signal PS-C output from the imaging section 21-C to execute demosaic processing similar to that of the related art to generate an image signal for each color component, and outputs the resultant image signals to the YUV converting section 33-C.

The YUV converting section 33-H performs color space conversion on the image signals for the three primary colors generated by the demosaic processing section 32-H to generate a color difference signal Huv. The YUV converting section 33-H outputs the generated color difference signal Huv to each of the parallax detecting section 36b and the signal selecting section 412. The YUV converting section 33-C performs color space conversion on the image signals for the three primary colors generated by the demosaic processing section 32-C to generate a luminance signal Cy and a color difference signal Cuv. The YUV converting section 33-C outputs the generated luminance signal Cy to the parallax detecting section 36b and the fallback determining section 38 and outputs the color difference signal Cuv to the parallax detecting section 36b and the parallax compensating section 37.

The frequency detecting section 34 operates similarly to the frequency detecting section 421 of the signal synthesizing section 42 of the second embodiment depicted in FIG. 19. That is, the frequency detecting section 34 uses the luminance signal SDw generated by the interpolation section 31-H to calculate the activity act, which is a detection result indicating, for each pixel, what frequency characteristics the image including the detection target pixel has. Then, the frequency detecting section 34 outputs the activity act to the coring processing section 35.

The coring processing section 35 operates similarly to the coring processing section 422 of the signal synthesizing section 42 of the second embodiment depicted in FIG. 19. That is, the coring processing section 35 sets the synthesis ratio ta corresponding to the activity act for each pixel. The coring processing section 35 stores a coring curve indicative of the synthesis ratio ca with respect to the activity act, and determines, from the coring curve, the synthesis ratio ta with respect to the activity act detected by the frequency detecting section 34. The coring processing section 35 sets the synthesis ratio αa corresponding to the activity act and outputs the set synthesis ratio αa to the parallax detecting section 36c.

The parallax detecting section 36c uses the luminance signals SDw and Cy and the color difference signals Huv and Cuv and the synthesis ratio αa set by the coring processing section 35 to perform parallax detection to generate parallax information DTc indicative of a detected parallax, and outputs the parallax information DTc to the parallax compensating section 37 and the fallback determining section 38. The parallax detecting section 36c is configured similarly to, for example, the parallax detecting section 36b depicted in FIG. 25. The cost integrating section 364 integrates the cost values calculated by the cost calculating sections 361, 362, and 363 using the synthesis ratio ta as indicated in Math (24). With the parallax detection thus performed on the basis of an integrated cost value, in a case where costs based on the color difference signal are not used when the luminance signal is in a high frequency region, for example, even with inclusion of a false color in the color difference signal, the parallax detection can be achieved without being affected by the false color.

$$COST = COST_y + \alpha a \times (COST_u + COCT_v) \quad (24)$$

The parallax compensating section 37 performs parallax compensation for the color difference signal Cuv generated by the YUV converting section 33-C, on the basis of the parallax information DTc supplied from the parallax detecting section 36c. The parallax compensating section 37 moves the pixel positions on the basis of the parallax information generated by the parallax detecting section 36c with respect to the color difference signal Cuv, to generate a parallax-compensated color difference signal CPuv corresponding to the viewpoint of the captured image acquired by the imaging section 21-H. The parallax compensating section 37 outputs the generated parallax-compensated color difference signal CPuv to the signal selecting section 41.

The fallback determining section 38 determines the risk of degradation of the image quality performance on the basis of the luminance signal SDw supplied from the interpolation section 31-H and the luminance signal Cy supplied from the YUV converting section 33-C, and the parallax information DTc supplied from the parallax detecting section 36c. Furthermore, the fallback determining section 38 generates a signal selection control signal ET for selecting the parallax-compensated color difference signal CPuv, having a higher color resolution than the color difference signal Huv generated by the YUV converting section 33-H, in a case where there is no risk of degradation of the image quality performance, while selecting the color difference signal Huv in a case where there is a risk of degradation of the image quality performance. The fallback determining section 38 then outputs the signal selection control signal ET to the signal selecting section 41.

On the basis of the signal selection control signal ET from the fallback determining section 38, the signal selecting section 41 outputs, as a color difference signal SDuv, one of the color difference signal Huv generated by the YUV converting section 33-H or the parallax-compensated color difference signal CPuv generated by the YUV converting section 33-C and on which the parallax compensation has been performed.

The image processing section 30-3 outputs the luminance signal SDw output from the interpolation section 31-H and the color difference signal SDuv output from the signal selecting section 41, to the display section 53 and the recording section 56 as image signals for a fusion image.

Note that, in the seventh embodiment of the image processing section, the operations depicted in FIG. 16 may be performed and that, in the parallax detection in step ST2, the luminance signals SDw and Cy, the color difference signals Huv and Cuv, and the synthesis ratio αa may be used for the parallax detection as described above.

In this manner, according to the seventh embodiment of the image processing section, advantageous effects similar to those of the fifth embodiment can be obtained. Furthermore, in the seventh embodiment, the parallax detection is performed using the synthesis ratio set on the basis of the detection result indicating, for each pixel, what frequency characteristics the image including the detection target pixel has. Thus, the parallax detection can be performed without being affected by false colors or the like.

10. Eighth Embodiment

Now, an eighth embodiment of the image processing section will be described. In the above-described first to seventh embodiments, the color difference signal Huv is generated using the signal for the captured image acquired by the imaging section 21-H and including fewer color pixels than the captured image acquired by the imaging section 21-C. That is, for the captured image acquired by the imaging section 21-H, a low sampling rate is used for the color pixels, and thus, for example, false colors (aliasing noise) may have occurred in the color difference signal Huv. Thus, in the eighth embodiment, even with the selection of the color difference signal Huv or the synthesis processing using the color difference signal Huv, degradation of the image quality performance is prevented that is caused by the low sampling rate for the color pixels.

Figure 30:
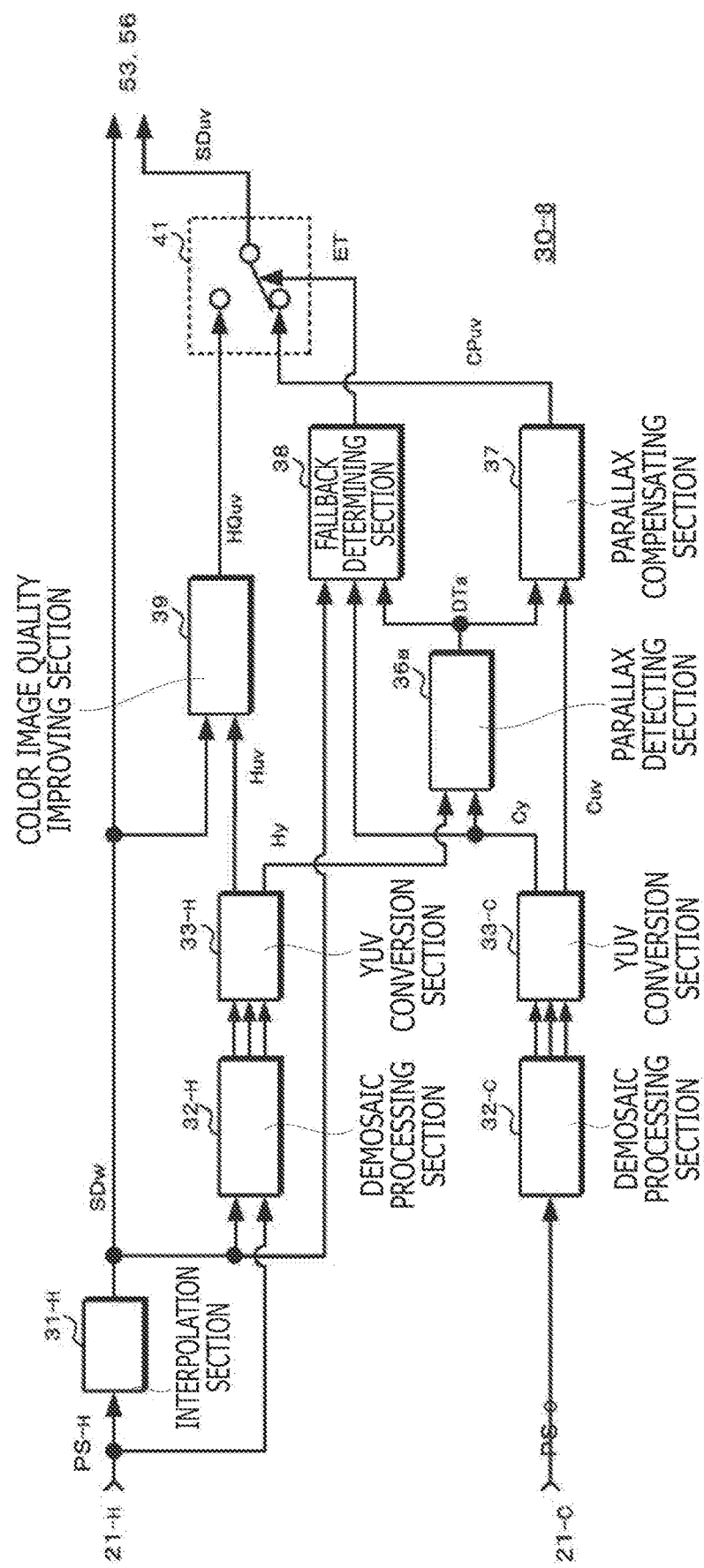
FIG. 30 is a diagram illustrating a configuration of an eighth embodiment of the image processing section.

FIG. 30 illustrates a configuration of the eighth embodiment of the image processing section. An image processing section 30-8 includes the interpolation section 31-H, the demosaic processing section 32-H, the YUV converting section 33-H, the demosaic processing section 32-C, the YUV converting section 33-C, the parallax detecting section 36a, the parallax compensating section 37, the fallback determining section 38, a color image quality improving section 39, and the signal selecting section 41.

The imaging signal PS-H output from the imaging section 21-H is input to the interpolation section 31-H and the demosaic processing section 32-H. In addition, the imaging signal PS-C output from the imaging section 21-C is input to the demosaic processing section 32-C.

The interpolation section 31-H uses the imaging signal PS-H to execute interpolation processing to calculate the pixel value for each white pixel at the position of a red pixel or a blue pixel, generating a luminance signal SDw. The interpolation section 31-H outputs the luminance signal SDw to the demosaic processing section 32-H, the fallback determining section 38, and the color image quality improving section 39 and to the display section 53 and the recording section 56.

The demosaic processing section 32-H uses the imaging signal PS-H output from the imaging section 21-H and the luminance signal SDw generated by the interpolation section 31-H to generate an image signal for each color component and outputs the resultant image signals to the YUV converting section 33-H. The demosaic processing section 32-C uses the imaging signal PS-C output from the imaging section 21-C to execute demosaic processing similar to that of the related art to generate an image signal for each color component, and outputs the resultant image signals to the YUV converting section 33-C.

The YUV converting section 33-H performs color space conversion on the image signals for the three primary colors generated by the demosaic processing section 32-H to generate a luminance signal Hy and a color difference signal Huv. The YUV converting section 33-H outputs the generated luminance signal Hy to the parallax detecting section 36a and outputs the generated color difference signal Huv to the color image quality improving section 39. The YUV converting section 33-C performs color space conversion on the image signals for the three primary colors generated by the demosaic processing section 32-C to generate a luminance signal Cy and a color difference signal Cuv. The YUV converting section 33-C outputs the generated luminance signal Cy to the parallax detecting section 36a and the fallback determining section 38 and outputs the color difference signal Cuv to the parallax compensating section 37.

The parallax detecting section 36a uses the luminance signals Hy and Cy to perform parallax detection to generate parallax information DTa indicative of a detected parallax, and outputs the parallax information DTa to the parallax compensating section 37 and the fallback determining section 38.

The parallax compensating section 37 performs parallax compensation for the color difference signal Cuv generated by the YUV converting section 33-C, on the basis of the parallax information DTa supplied from the parallax detecting section 36a. The parallax compensating section 37 moves the pixel positions on the basis of the parallax information generated by the parallax detecting section 36a with respect to the color difference signal Cuv, to generate a parallax-compensated color difference signal CPuv corresponding to the viewpoint of the captured image acquired by the imaging section 21-H. The parallax compensating section 37 outputs the generated parallax-compensated color difference signal CPuv to the signal selecting section 41.

The fallback determining section 38 determines the risk of degradation of the image quality performance on the basis of the luminance signal SDw supplied from the interpolation section 31-H and the luminance signal Cy supplied from the YUV converting section 33-C, and the parallax information DTa supplied from the parallax detecting section 36a. Furthermore, the fallback determining section 38 generates a signal selection control signal ET for selecting the parallax-compensated color difference signal CPuv, having a higher color resolution than the color difference signal Huv, in a case where there is no risk of degradation of the image quality performance, while selecting an image quality improved color difference signal HQuv on which image quality improvement processing has been executed by the color image quality improving section 39 in a case where there is a risk of degradation of the image quality performance. The fallback determining section 38 then outputs the signal selection control signal ET to the signal selecting section 41.

The color image quality improving section 39 executes image quality improvement processing on the color difference signal Huv generated by the YUV converting section 33-H on the basis of the luminance signal SDw generated by the interpolation section 31-H. The color image quality improving section 39 thus generates and outputs an image quality improved color difference signal HQuv to the signal selecting section 41.

Figure 31:
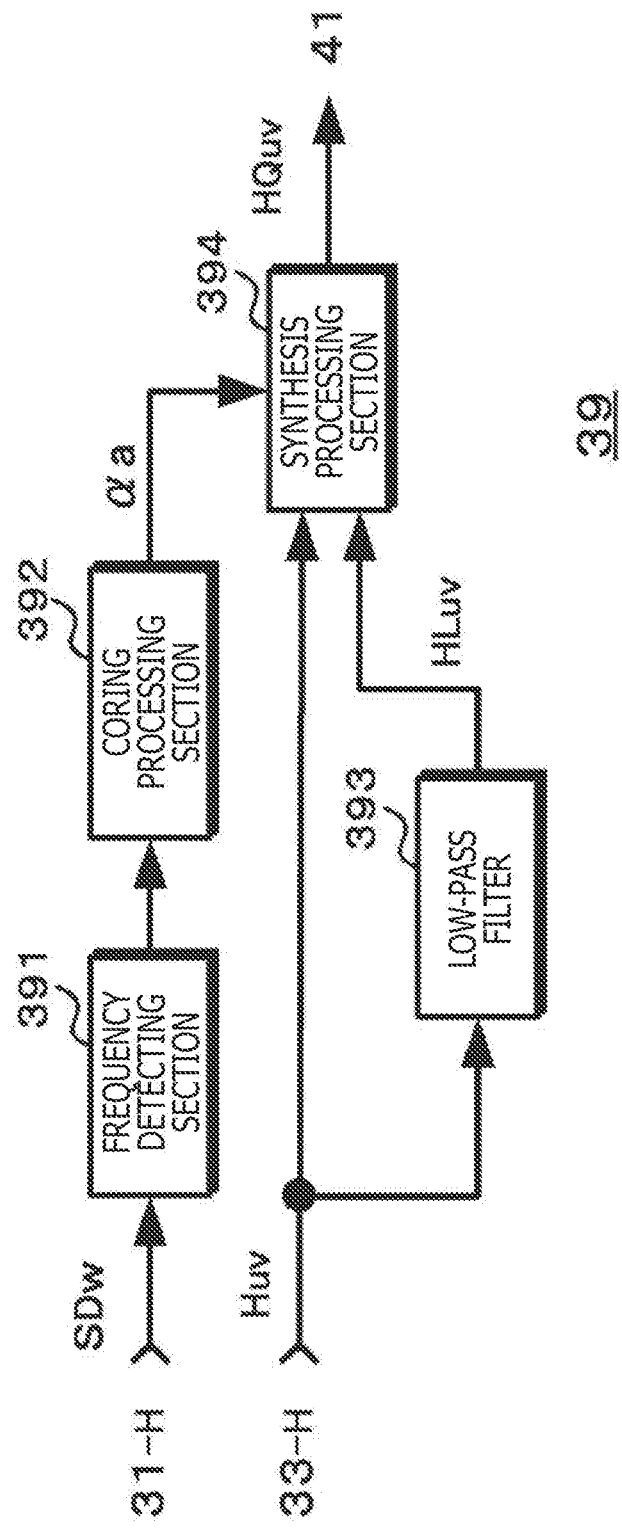
FIG. 31 is a diagram illustrating a configuration of a color image quality improving section.

FIG. 31 illustrates a configuration of the color image quality improving section. The color image quality improving section 39 includes a frequency detecting section 391, a coring processing section 392, a low-pass filter 393, and a synthesis processing section 394.

The frequency detecting section 391 operates similarly to the frequency detecting section 421 of the signal synthesizing section 42 of the second embodiment depicted in FIG. 19. That is, the frequency detecting section 391 uses the luminance signal SDw generated by the interpolation section 31-H to calculate the activity act, which is a detection result indicating, for each pixel, what frequency characteristics the image including the detection target pixel has. The frequency detecting section 391 outputs the activity act to the coring processing section 392.

The coring processing section 392 operates similarly to the coring processing section 422 of the signal synthesizing section 42 of the second embodiment depicted in FIG. 19. That is, the coring processing section 392 sets the synthesis ratio ta corresponding to the activity act for each pixel. The coring processing section 392 stores a coring curve indicative of the synthesis ratio $\alpha a$ with respect to the activity act, and determines, from the coring curve, the synthesis ratio $\alpha a$ with respect to the activity act detected by the frequency detecting section 391. The coring processing section 392 sets the synthesis ratio $\alpha a$ corresponding to the activity act and outputs the set synthesis ratio $\alpha a$ to the synthesis processing section 394.

The low-pass filter 393 executes low-pass filter processing on the color difference signal Huv to remove high-frequency components, for example, components such as false colors, and outputs, to the synthesis processing section 394, a color difference signal $Huv_{LPF}$ resulting from the filter processing.

The synthesis processing section 394 synthesizes the color difference signal Huv and the color difference signal $Huv_{LPF}$ resulting from the filter processing, in the synthesis ratio $\alpha a$ set by the coring processing section 392. Maths (25) and (26) indicate processing executed by the synthesis processing section 394. The synthesis processing section 394 outputs, to the signal selecting section 41, the image quality improved color difference signal HQuv resulting from the synthesis.

$$HQu=(1-\alpha a)HU_{LPF}+\alpha aHu \qquad (25)$$

$$HQv=(1-\alpha a)HV_{LPF}+\alpha aHv \qquad (26)$$

On the basis of the signal selection control signal ET from the fallback determining section 38, the signal selecting section 41 outputs, as a color difference signal SDuv, one of the image quality improved color difference signal HQuv supplied from the color image quality improving section 39 or the parallax-compensated color difference signal CPuv generated by the YUV converting section 33-C and on which the parallax compensation has been performed.

The image processing section 30-8 outputs the luminance signal SDw output from the interpolation section 31-H and the color difference signal SDuv output from the signal selecting section 41, to the display section 53 and the recording section 56 as image signals for a fusion image.

Note that, in the eighth embodiment of the image processing section, the operations depicted in FIG. 16 may be performed and that, in the preprocessing in step ST1, the luminance signal SDw may be used to improve the image quality of the color difference signals Huv as described above.

In this manner, according to the eighth embodiment of the image processing section, advantageous effects similar to those of the first embodiment can be obtained. In addition, in the eighth embodiment, the image quality of the color difference signal Huv for the first viewpoint is improved on the basis of the detection result indicating, for each pixel, what frequency characteristics the image including the detection target pixel has. Thus, even with the selection of or the synthesis processing for the color difference signal for the first viewpoint, degradation of the image quality performance is prevented that is caused by the low sampling rate for the color pixels in the imaging section 21-H.

11. Ninth Embodiment

In the description of the first to eighth embodiments, the fusion processing is executed on the color difference signal so as not to degrade the image quality performance. However, in the ninth embodiment, processing for improving the image quality performance of the luminance signal will be described.

Figure 32:
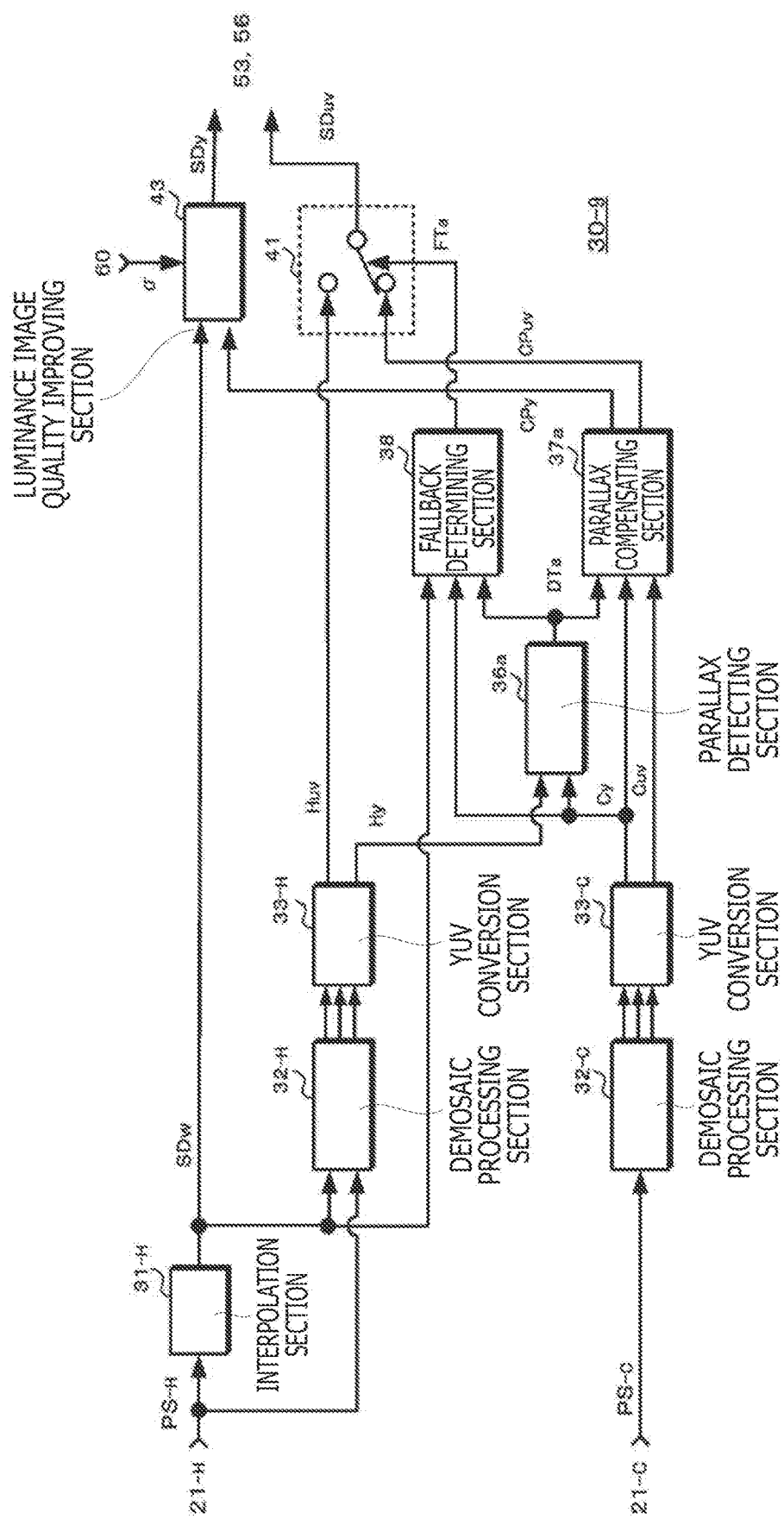
FIG. 32 is a diagram illustrating a configuration of a ninth configuration of the image processing section.

FIG. 32 illustrates a configuration of a ninth embodiment of the image processing section. An image processing section 30-9 includes the interpolation section 31-H, the demosaic processing section 32-H, the YUV converting section 33-H, the demosaic processing section 32-C, the YUV converting section 33-C, the parallax detecting section 36a, the parallax compensating section 37, the fallback determining section 38, the signal selecting section 41, and a luminance image quality improving section 43.

The imaging signal PS-H output from the imaging section 21-H is input to the interpolation section 31-H and the demosaic processing section 32-H. In addition, the imaging signal PS-C output from the imaging section 21-C is input to the demosaic processing section 32-C.

The interpolation section 31-H uses the imaging signal PS-H to execute interpolation processing to calculate the pixel value for each white pixel at the position of a red pixel or a blue pixel, generating a luminance signal SDw. The interpolation section 31-H outputs the luminance signal SDw to the demosaic processing section 32-H, the fallback determining section 38, and the color image quality improving section 39 and to the display section 53 and the recording section 56.

The demosaic processing section 32-H uses the imaging signal PS-H output from the imaging section 21-H and the luminance signal SDw generated by the interpolation section 31-H to generate an image signal for each color component and outputs the resultant image signals to the YUV converting section 33-H. The demosaic processing section 32-C uses the imaging signal PS-C output from the imaging section 21-C to execute demosaic processing similar to that of the related art to generate an image signal for each color component, and outputs the resultant image signals to the YUV converting section 33-C.

The YUV converting section 33-H performs color space conversion on the image signals for the three primary colors generated by the demosaic processing section 32-H to generate a luminance signal Hy and a color difference signal Huv. The YUV converting section 33-H outputs the generated luminance signal Hy to the parallax detecting section 36a and outputs the generated color difference signal Huv to the color image quality improving section 39. The YUV converting section 33-C performs color space conversion on the image signals for the three primary colors generated by the demosaic processing section 32-C to generate a luminance signal Cy and a color difference signal Cuv. The YUV converting section 33-C outputs the generated luminance signal Cy to the parallax detecting section 36a and the parallax compensating section 37 and outputs the color difference signal Cuv to the parallax compensating section 37.

The parallax detecting section 36a uses the luminance signals Hy and Cy to perform parallax detection to generate parallax information DTa indicative of a detected parallax, and outputs the parallax information DTa to the parallax compensating section 37 and the fallback determining section 38.

The parallax compensating section 37 performs parallax compensation for the color difference signal Cuv generated by the YUV converting section 33-C, on the basis of the parallax information DTa supplied from the parallax detecting section 36a. The parallax compensating section 37 moves the pixel positions on the basis of the parallax information generated by the parallax detecting section 36a with respect to the color difference signal Cuv, to generate a parallax-compensated color difference signal CPuv corresponding to the viewpoint of the captured image acquired by the imaging section 21-H. The parallax compensating section 37 outputs the generated parallax-compensated color difference signal CPuv to the signal selecting section 41.

In addition, the parallax compensating section 37 performs parallax compensation for the luminance signal Cy generated by the YUV converting section 33-C, on the basis of the parallax information DTa supplied from the parallax detecting section 36a. The parallax compensating section 37 moves the pixel positions on the basis of the parallax information generated by the parallax detecting section 36a with respect to the luminance signal Cy, to generate a parallax-compensated luminance signal CPy corresponding to the viewpoint of the captured image acquired by the imaging section 21-H. The parallax compensating section 37 outputs the generated parallax-compensated luminance signal CPy to the luminance image quality improving section 43.

The fallback determining section 38 determines the risk of degradation of the image quality performance on the basis of the luminance signal SDw supplied from the interpolation section 31-H and the luminance signal Cy supplied from the YUV converting section 33-C, and the parallax information DTa supplied from the parallax detecting section 36a. Furthermore, the fallback determining section 38 generates a signal selection control signal ET for selecting the parallax-compensated color difference signal CPuv, having a higher color resolution than the color difference signal Huv, in a case where there is no risk of degradation of the image quality performance, while selecting the image quality improved color difference signal HQuv on which image quality improvement processing has been executed by the color image quality improving section 39 in a case where there is a risk of degradation of the image quality performance. The fallback determining section 38 then outputs the signal selection control signal ET to the signal selecting section 41.

On the basis of the signal selection control signal ET from the fallback determining section 38, the signal selecting section 41 outputs, as a color difference signal SDuv, one of the image quality improved color difference signal HQuv supplied from the color image quality improving section 39 or the parallax-compensated color difference signal CPuv generated by the YUV converting section 33-C and on which the parallax compensation has been performed.

The luminance image quality improving section 43 synthesizes the luminance signal SDw generated by the interpolation section 31-H and the parallax-compensated luminance signal CPy supplied from the parallax compensating section 37 in accordance with a noise intensity of the imaging section 21-H, to reduce the adverse effect of noise from the imaging section 21-H to improve luminance image quality. The luminance image quality improving section 43 calculates a synthesis ratio ay for each pixel on the basis of the parallax-compensated luminance signal CPy and the noise intensity a as indicated in Math (27). In addition, the luminance image quality improving section 43 synthesize the luminance signal SDw and the parallax-compensated luminance signal CPy in the synthesis ratio ay to generate a luminance signal SDy as indicated in Math (28).

[Math 5]

$$\alpha y = \exp\left(-\frac{(DW - Cy)^2}{\sigma^2}\right) \quad (27)$$

$$Dy = \alpha y \times Cy + (1 - \alpha y) \times DW \quad (28)$$

The image processing section 30-9 outputs the luminance signal SDy output from the luminance image quality improving section 43 and the color difference signal SDuv output from the signal selecting section 41, to the display section 53 and the recording section 56 as image signals for a fusion image.

Note that, in the ninth embodiment of the image processing section, the operations depicted in FIG. 16 may be performed and that, at a timing following step ST3, the luminance signal SDw and the parallax-compensated luminance signal CPy may be synthesized to generate a luminance signal SDy with the luminance image quality improved.

As described above, according to the ninth embodiment of the image processing section, advantageous effects similar those of the first embodiment can be obtained. In addition, the ninth embodiment executes the synthesis processing for the luminance signal, thus allowing the image quality performance of the luminance signal to be improved compared to the first embodiment.

12. Tenth Embodiment

In the description of the above-described second embodiment, one of the color difference signal Huv or the parallax-compensated color difference signal CPuv, having a higher color resolution, is selected on the basis of the luminance signal SDw so as not to degrade the image quality performance. However, in the description of the tenth embodiment, fallback determination results in captured image units are used to execute synthesis processing for the color difference signal Huv and the parallax-compensated color difference signal CPuv so as not to degrade the image quality performance.

Figure 33:
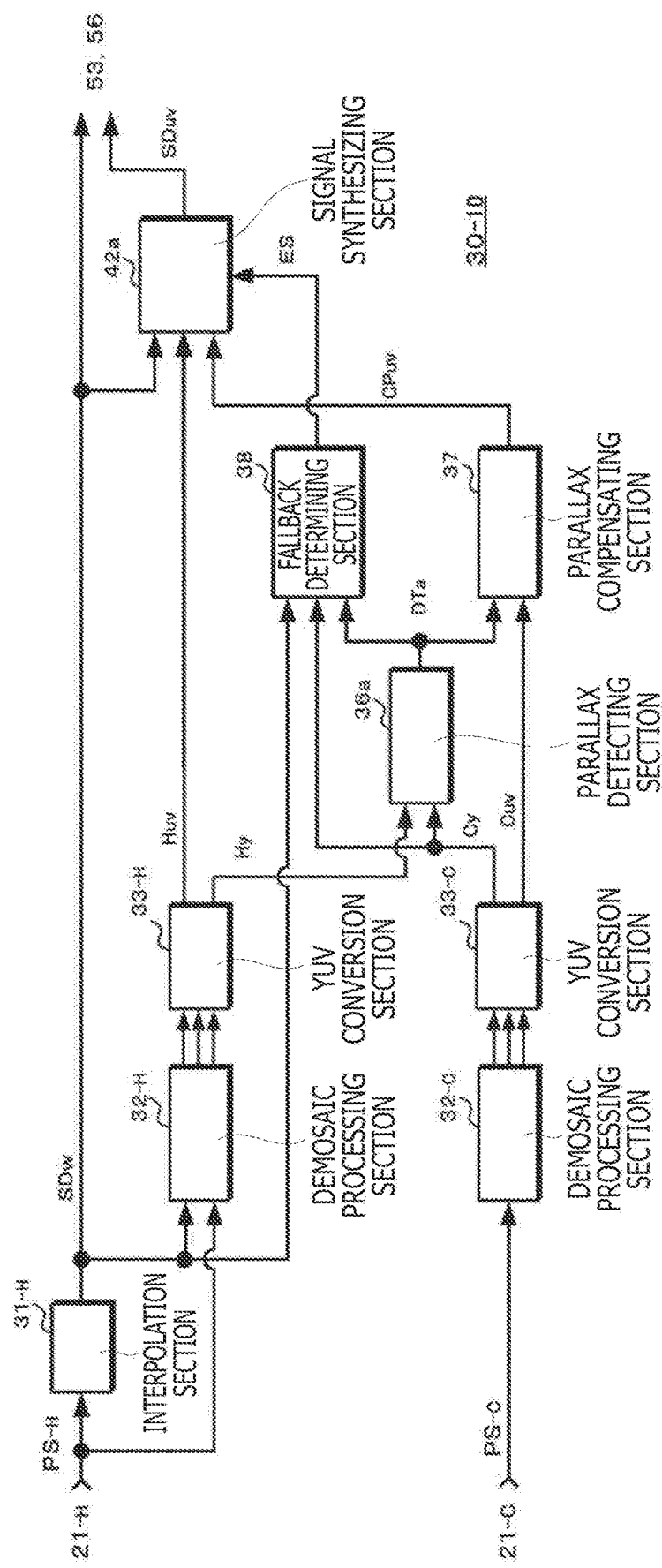
FIG. 33 is a diagram illustrating a configuration of a tenth configuration of the image processing section.

FIG. 33 illustrates a configuration of the tenth embodiment of the image processing section. An image processing section 30-10 includes the interpolation section 31-H, the demosaic processing section 32-H, the YUV converting section 33-H, the demosaic processing section 32-C, the YUV converting section 33-C, the parallax detecting section 36a, the parallax compensating section 37, the fallback determining section 38, and a signal synthesizing section 42a.

The imaging signal PS-H output from the imaging section 21-H is input to the interpolation section 31-H and the demosaic processing section 32-H. In addition, the imaging signal PS-C output from the imaging section 21-C is input to the demosaic processing section 32-C.

The interpolation section 31-H uses the imaging signal PS-H to execute interpolation processing to calculate the pixel value for each white pixel at the position of a red pixel or a blue pixel, generating a luminance signal SDw. The interpolation section 31-H outputs the luminance signal SDw to the demosaic processing section 32-H, the fallback determining section 38, and the signal synthesizing section 42a and to the display section 53 or the recording section 56.

The demosaic processing section 32-H uses the imaging signal PS-H output from the imaging section 21-H and the luminance signal SDw generated by the interpolation section 31-H to generate an image signal for each color component and outputs the resultant image signals to the YUV converting section 33-H. The demosaic processing section 32-C uses the imaging signal PS-C output from the imaging section 21-C to execute demosaic processing similar to that of the related art to generate an image signal for each color component, and outputs the resultant image signals to the YUV converting section 33-C.

The YUV converting section 33-H performs color space conversion on the image signals for the three primary colors generated by the demosaic processing section 32-H to generate a luminance signal Hy and a color difference signal Huv. The YUV converting section 33-H outputs the generated luminance signal Hy to the parallax detecting section 36a and outputs the generated color difference signal Huv to the signal synthesizing section 42a. The YUV converting section 33-C performs color space conversion on the image signals for the three primary colors generated by the demosaic processing section 32-C to generate a luminance signal Cy and a color difference signal Cuv. The YUV converting section 33-C outputs the generated luminance signal Cy to the parallax detecting section 36a and the fallback determining section 38 and outputs the color difference signal Cuv to the parallax compensating section 37.

The parallax detecting section 36a uses the luminance signals Hy and Cy to perform parallax detection to generate parallax information DTa indicative of a detected parallax, and outputs the parallax information DTa to the parallax compensating section 37 and the fallback determining section 38.

The parallax compensating section 37 performs parallax compensation for the color difference signal Cuv generated by the YUV converting section 33-C, on the basis of the parallax information DTa supplied from the parallax detecting section 36a. The parallax compensating section 37 moves the pixel positions on the basis of the parallax information generated by the parallax detecting section 36a with respect to the color difference signal Cuv, to generate a parallax-compensated color difference signal CPuv corresponding to the viewpoint of the captured image acquired by the imaging section 21-H. The parallax compensating section 37 outputs the generated parallax-compensated color difference signal CPuv to the signal selecting section 41.

The fallback determining section 38 determines, captured image units, the risk of degradation of the image quality performance on the basis of the luminance signal SDw supplied from the interpolation section 31-H and the luminance signal Cy supplied from the YUV converting section 33-C, and the parallax information DTa supplied from the parallax detecting section 36a. Furthermore, the fallback determining section 38 scores the determined risk of degradation of the image quality performance in captured image units to obtain determination information ES. The integrated determination processing section 3828 of the fallback determining section 38 depicted in FIG. 10 uses the individual determining results supplied from the individual determining sections 3821 to 3825 to make fallback determination. For example, the integrated determination processing section 3828 may determine, as the determination information ES, the number of determination results indicating that the image quality is likely to be degraded or may individually score the determination results indicating that the image quality is likely to be degraded and determine the score sum of the determination results as the determination information ES.

On the basis of the determination information ES from the fallback determining section 38, the signal synthesizing section 42a synthesizes the color difference signal Huv supplied from the YUV converting section 33-H and the parallax-compensated color difference signal CPuv generated by the YUV converting section 33-C and on which the parallax compensation has been performed, to generate a color difference signal SDuv.

Figure 34:
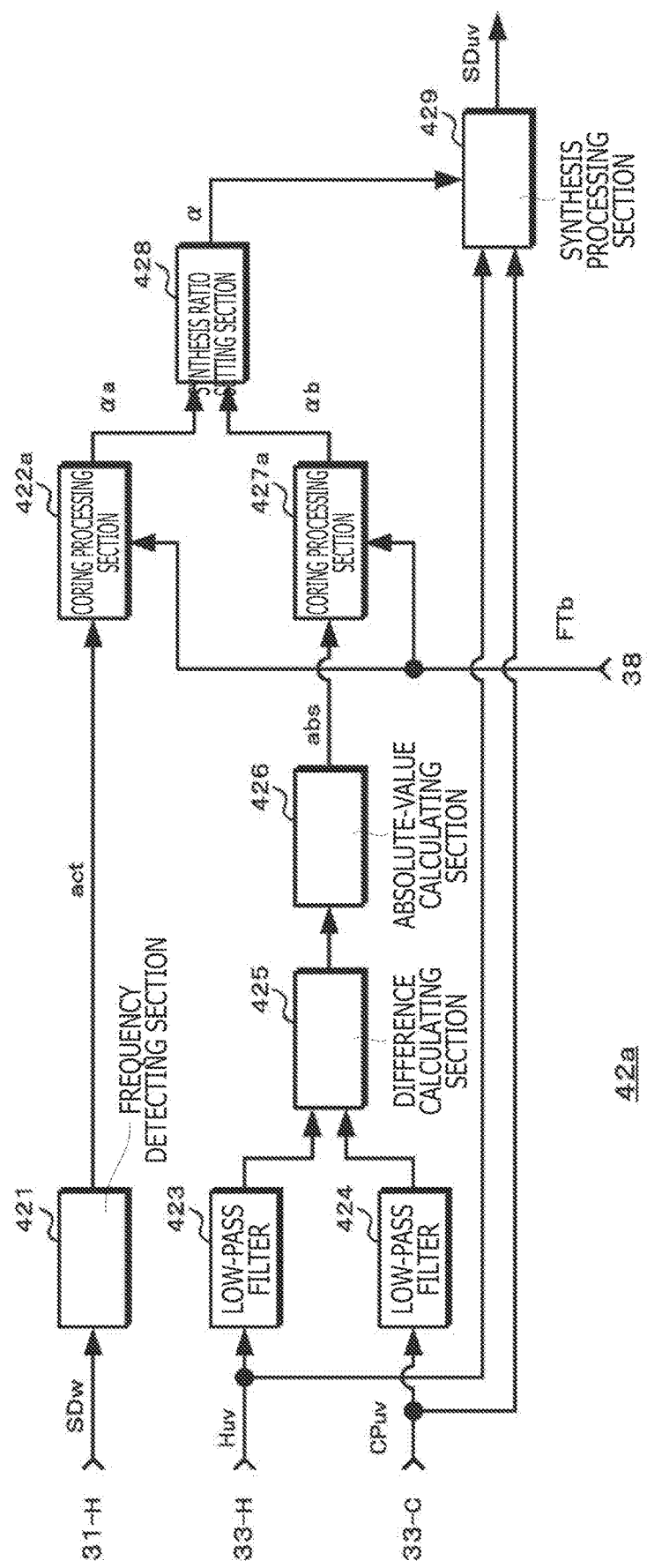
FIG. 34 is a diagram illustrating a configuration of the signal synthesizing section.

FIG. 34 illustrates a configuration of the signal synthesizing section. Note that, compared to the components of the signal synthesizing section 42 in the second embodiment depicted in FIG. 19, corresponding components are denoted by the same reference signs.

The signal synthesizing section 42a includes the frequency detecting section 421, a coring processing section 422a, the low-pass filters 423 and 424, the difference calculating section 425, the absolute-value calculating section 426, a coring processing section 427a, the synthesis ratio setting section 428, and the synthesis processing section 429.

The frequency detecting section 421 uses the luminance signal SDw generated by the interpolation section 31-H to detect, for each pixel, what frequency characteristics the image including the detection target pixel has, and calculates the activity act for each pixel and outputs the activity act to the coring processing section 422a.

The coring processing section 422a sets the synthesis ratio αa corresponding to the activity act for each pixel on the basis of a coring curve. The coring curve indicates the synthesis ratio ta corresponding to the activity act. In addition, the coring processing section 422a uses a coring curve corresponding to the determination information ES. The coring curve may be prestored in the coring processing section 422a or the coring processing section 422a may generate a coring curve in accordance with the determination information ES. Note that the coring curve corresponding to the determination information ES will be described below.

The low-pass filter 423 executes low-pass filter processing on the color difference signal Huv and the low-pass filter 424 executes low-pass filter processing on the parallax-compensated color difference signal CPuv to make bands of the respective color difference signals equal. In addition, the low-pass filters 423 and 424 execute the low-pass filter processing to remove noise components such as false colors from the color difference signals. The low-pass filters 423 and 424 output the filtered color difference signals to the difference calculating section 425.

The difference calculating section 425 calculates, for each pixel, the difference between the color difference signal Huv resulting from the low-pass filter processing and supplied from the low-pass filter 423 and the parallax-compensated color difference signal CPuv resulting from the low-pass filter processing and supplied from the low-pass filter 423, and outputs the difference to the absolute-value calculating section 426.

The absolute-value calculating section 426 calculates a difference absolute value abs calculated for each pixel by the difference calculating section 425, and outputs the difference absolute value abs to the coring processing section 427a.

The coring processing section 427a sets the synthesis ratio αb corresponding to the difference absolute value abs on the basis of the coring curve. The coring curve indicates the synthesis ratio αb with respect to the difference absolute value abs. In addition, the coring processing section 427a uses the coring curve corresponding to the determination information ES.

Figure 35:
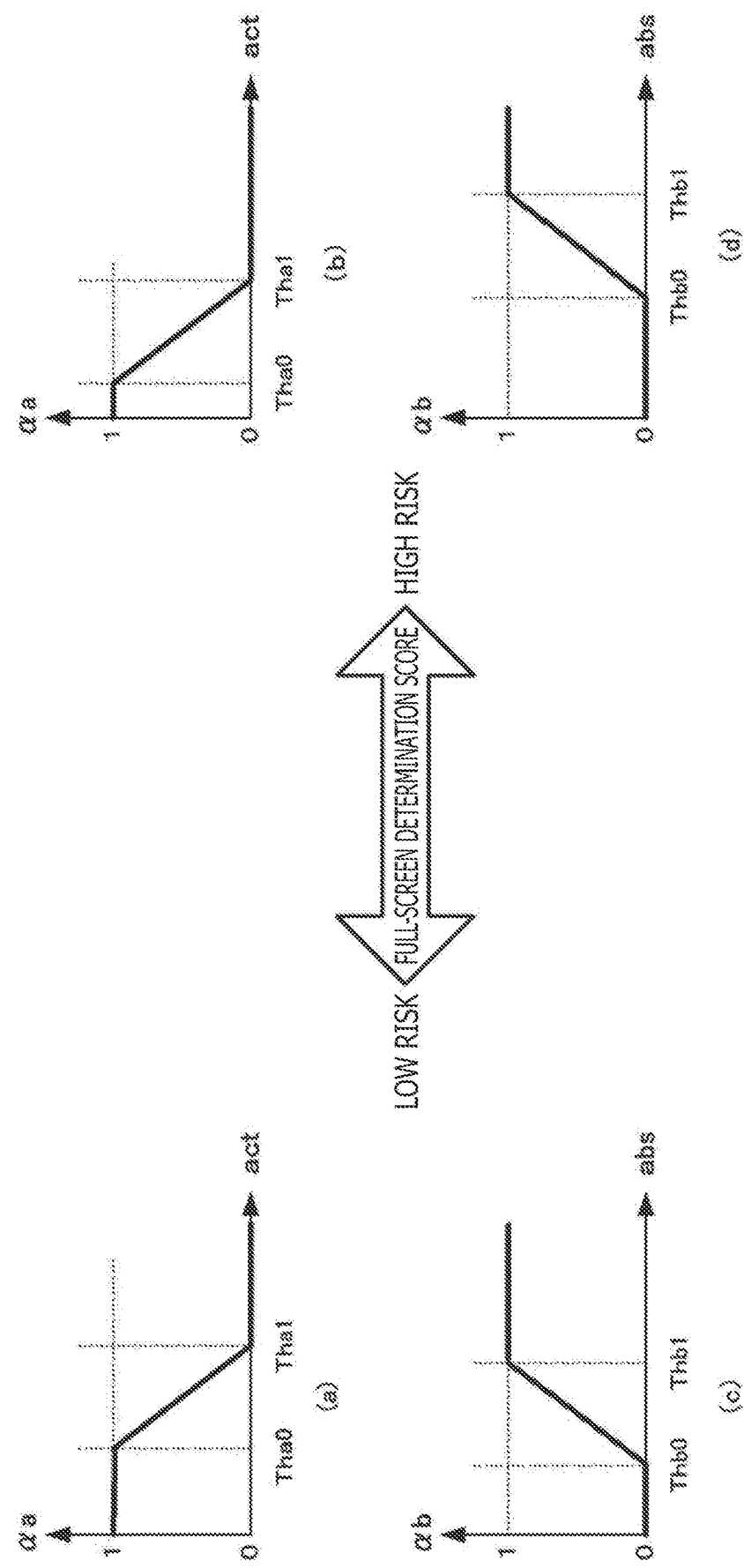
FIG. 35 is a diagram illustrating a relationship between a cording curve and determination information.

FIG. 35 illustrates a relationship between the coring curve and the determination information. Note that (a) and (c) in FIG. 35 illustrate coring curves used by the coring processing section 422a and that (b) and (d) in FIG. 35 illustrate coring curves used by the coring processing section 427a.

The coring processing section 422a reduces the thresholds Tha0 and Tha1 with increasing risk of degradation of the image quality performance on the basis of the determination information ES, thus decreasing the synthesis ratio αa with respect to the activity act.

In addition, the coring processing section 427a increases the thresholds Thb0 and Thb1 consistently with risk of degradation of the image quality performance on the basis of the determination information ES, thus increasing the synthesis ratio αb with respect to the difference absolute value abs.

The synthesis ratio setting section 428 uses the synthesis ratio αa supplied from the coring processing section 422a and the synthesis ratio αb supplied from the coring processing section 427a to execute the processing in Math (22). The synthesis ratio setting section 428 sets the larger of the values of the synthesis ratios αa and αb as a synthesis ratio for the color difference signal Huv and the parallax-compensated color difference signal CPuv, and outputs the synthesis ratio to the synthesis processing section 429.

The synthesis processing section 429 uses the synthesis ratio α set by the synthesis ratio setting section 428 to perform the calculation in Math (23) for each pixel to generate a color difference signal SDuv into which the color difference signal Huv and the parallax-compensated color difference signal CPuv are synthesized.

The image processing section 30-10 outputs the luminance signal SDw output from the interpolation section 31-H and the color difference signal SDuv output from the signal synthesizing section 42a, to the display section 53 and the recording section 56 as image signals for a fusion image.

Note that, in the tenth embodiment of the image processing section, the operations depicted in FIG. 16 may be performed and that, at a timing following step ST5, processing in step ST24 in FIG. 23 may be executed and that the coring curve corresponding to the determination information ES generated in step ST5 may be used to synthesize the color difference signal Huv and the parallax-compensated color difference signal CPuv to generate a color difference signal SDuv.

As described above, according to the tenth embodiment of the image processing section, advantageous effects similar those of the second embodiment can be obtained. In addition, in the tenth embodiment, the synthesis ratio is set also using the fallback determination results in captured image units, and thus, degradation of the image quality can be prevented more effectively than in the second embodiment, the degradation being caused by the synthesis processing, in pixel units, for the color difference signal for the first viewpoint and the parallax-compensated color difference signal having a high resolution.

13. Applied Example

The technology according to the present disclosure is applicable to various products. For example, the technology according to the present disclosure is not limited to the information processing terminal but may be implemented as a device mounted in any type of moving body such as an automobile, an electric vehicle, a hybrid electric vehicle, a motorcycle, a bicycle, a personal mobility vehicle, an airplane, a drone, a ship, a robot, a construction machine, or an agricultural machine (tractor).

Figure 36:
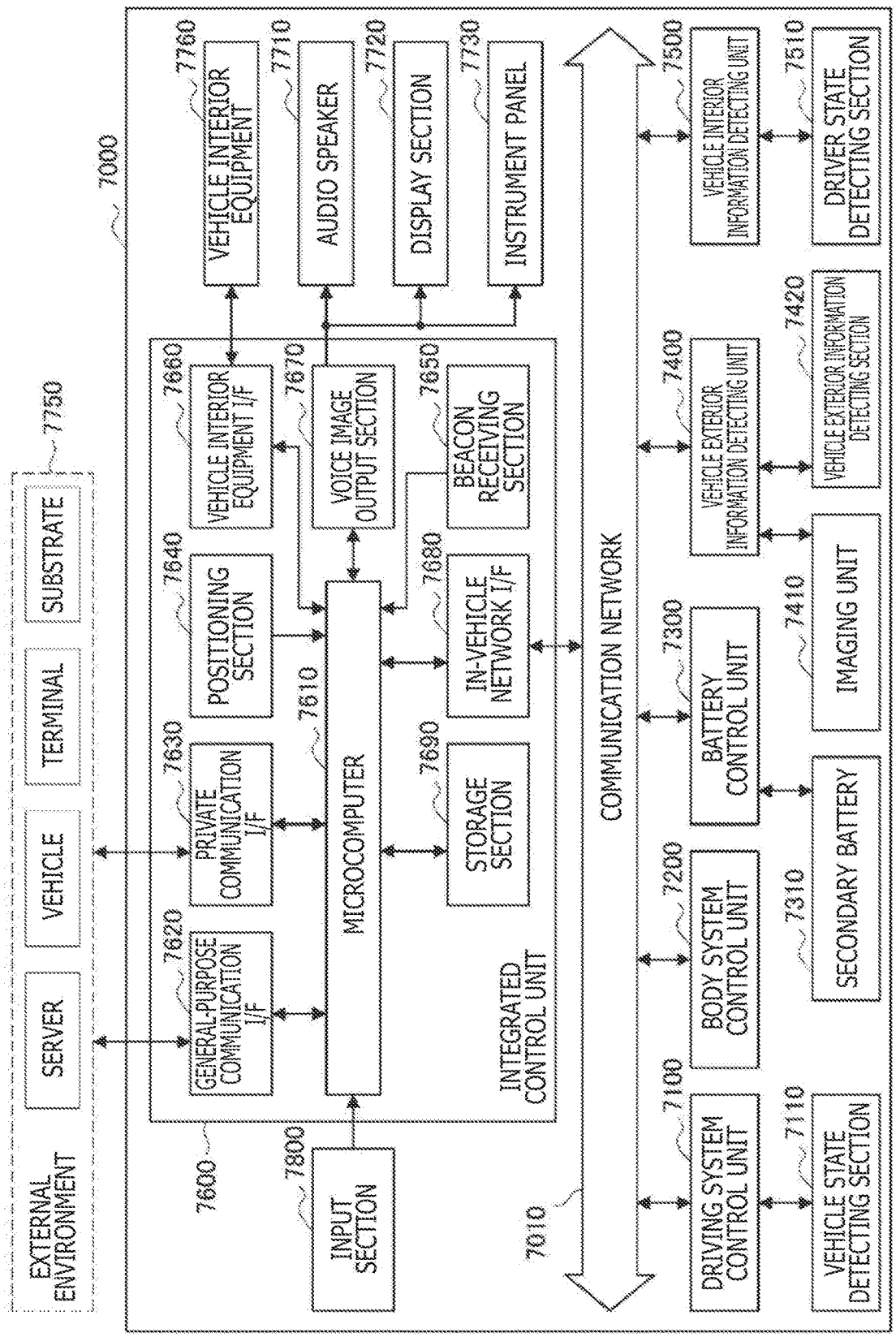
FIG. 36 is a block diagram depicting an example of schematic configuration of a vehicle control system.

FIG. 36 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 36, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 36 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 37:
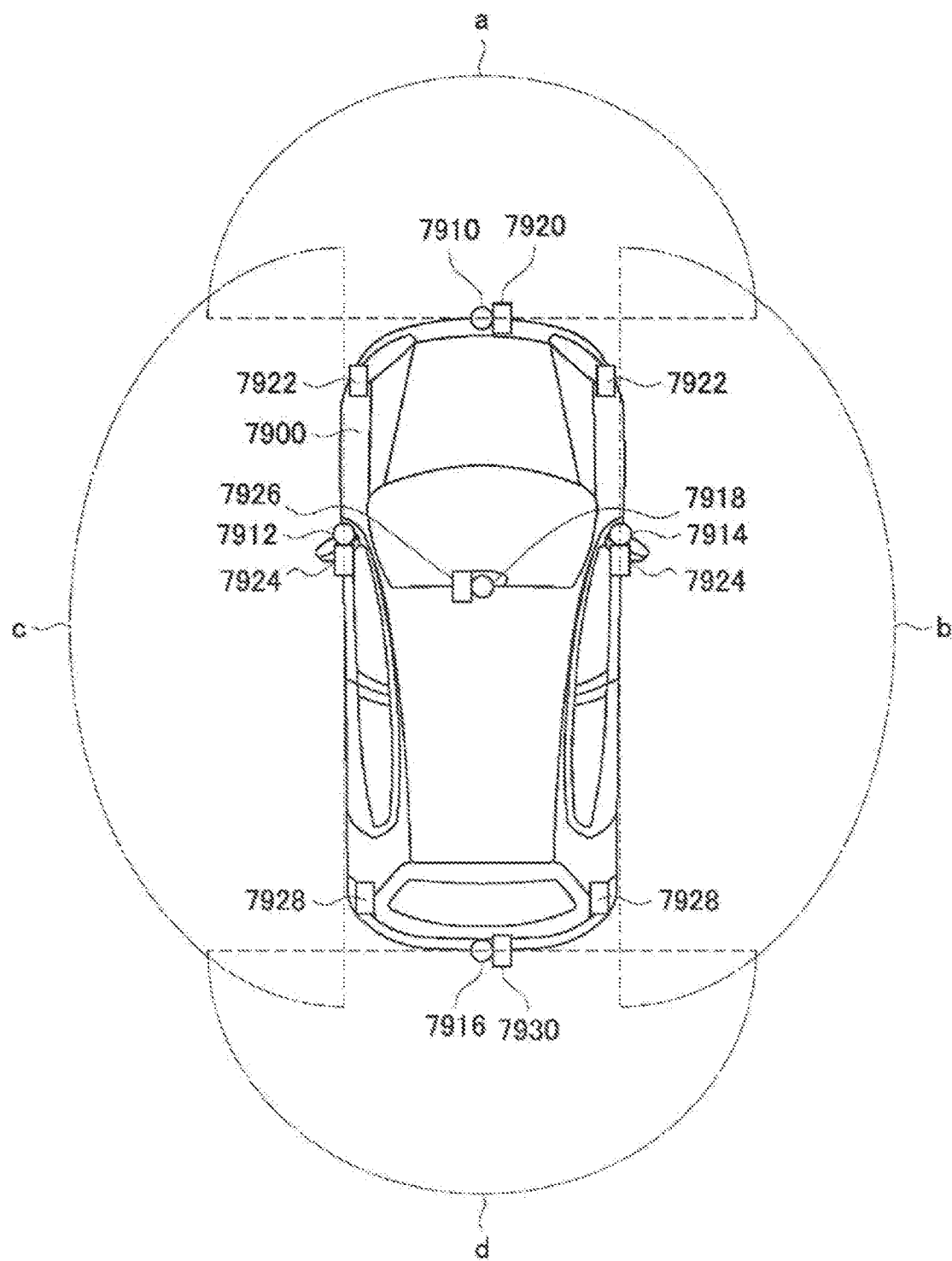
FIG. 37 is a diagram of assistance in explaining an example of installation positions of an outside-vehicle information detecting section and an imaging section.

FIG. 37 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 37 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 36, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 36, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 36 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the above-described vehicle control system 7000, a plurality of imaging sections, for example, the imaging sections 21-H and 21-C, are used as each of the imaging sections 7410, 7910, 7912, 7914, 7916, and 7918 as necessary. In addition, the image processing section 30 is provided in the integrated control unit 7600 in the applied example depicted in FIG. 36. With such a configuration, even in a case where the imaging sections 7410, 7910, 7912, 7914, 7916, and 7918 each have a reduced size and a reduced thickness, captured images with high image quality performance can be acquired and thus used for driving assistance, driving control, and the like. Note that the image processing section 30 may be implemented in a module (for example, an integrated circuit module constituted of one die) for the integrated control unit 7600 depicted in FIG. 36.

In addition, the series of processing described herein can be executed by hardware or software or a composite configuration of hardware and software. In a case where the processing is executed by software, a program in which a processing sequence is recorded is installed in a memory in a computer integrated in dedicated hardware, to cause the computer to execute the program. Alternatively, the program can be installed in a general-purpose computer capable of executing various types of processing, to cause the computer to execute the program.

For example, the program can be pre-recorded in a hard disk, an SSD (Solid State Drive), or a ROM (Read Only Memory) used as a recording medium. Alternatively, the program can be temporarily or permanently stored (recorded) in a removable recording medium such as a flexible disc, a CD-ROM (Compact Disc Read Only Memory), an MO (Magneto Optical) disc, a DVD (Digital Versatile Disc), a BD (Blu-Ray Disc (registered trademark)), a magnetic disk, or a semiconductor memory card. Such a removable recording medium can be provided as what is called package software.

In addition, instead of being installed in the computer through the removable recording medium, the program may be transferred by radio or wire from a download site to the computer via a network such as a LAN (Local Area Network) or the Internet. The computer can receive and install the transferred program in a recording medium such as a built-in hard disk.

Note that the effects described herein are only illustrative and not restrictive and that additional effects may be produced. In addition, interpretation of the present technology should not be limited to the above-described embodiments of the technology. The embodiments of the technology disclose the present technology in an illustrative form, and obviously those skilled in the art may make modifications or substitutions for the embodiments without departing from the spirits of the present technology. That is, claims should be taken into account in order to determine the spirits of the present technology.

In addition, the image processing device of the present technology can be configured as follows.

(1) An image processing device including:
a parallax detecting section detecting, on the basis of a first imaging signal for a first viewpoint and a second imaging signal for a second viewpoint different from the first viewpoint, a parallax of the second viewpoint with respect to the first viewpoint, and
an image generating section generating a color image using the first imaging signal and a parallax-compensated second imaging signal resulting from parallax compensation for the second imaging signal based on the parallax detected by the parallax detecting section, in which
the first imaging signal includes white pixels and color component pixels, and the second imaging signal includes fewer white pixels and more color component pixels than the first imaging signal.

(2) The image processing device according to (1), in which
the image generating section uses the first imaging signal and the parallax-compensated second imaging signal to generate the color image in a case where a predetermined condition is satisfied, and generates the color image from the first imaging signal in a case where the predetermined condition is not satisfied.

(3) The image processing device according to (2), in which
the case where the predetermined condition is satisfied is such that, in a case where a risk that the color image generated using the first imaging signal and the parallax-compensated second imaging signal has degraded image quality performance compared to the color image generated from the first imaging signal is lower than a threshold.

(4) The image processing device according to (3), in which
the image generating section determines the risk of degradation of the image quality performance on the basis of the first imaging signal and the parallax-compensated second imaging signal, and synthesizes the first imaging signal with the parallax-compensated second imaging signal in a synthesis ratio corresponding to the determined risk.

(5) The image processing device according to any one of (1) to (4), in which
the image generating section generates a first luminance signal and a first color signal from the first imaging signal, generates a second luminance signal and a second color signal from the second imaging signal, generates a parallax-compensated second color signal on the basis of the second color signal and the parallax detected by the parallax detecting section, and selects one of the first color signal and the parallax-compensated second color signal or synthesizes the first color signal and the parallax-compensated second color signal, in accordance with a risk that the color image generated using the parallax-compensated second imaging signal has degraded image quality performance compared to the color image generated from the first imaging signal, and
the parallax detecting section performs parallax detection using the first luminance signal and the second luminance signal.

(6) The image processing device according to (5), in which
in accordance with the risk, the image generating section selects one of the first color signal and the parallax-compensated second color signal in captured image units or synthesizes the first color signal and the parallax-compensated second color signal in pixel units.

(7) The image processing device according to (5) or (6), in which
the parallax detecting section performs parallax detection using the first luminance signal and the second luminance signal and the first color signal and the second color signal.

(8) The image processing device according to (7), including a parallax detection control section performing frequency detection on the basis of the first imaging signal and controlling the parallax detecting section in accordance with a detection result, in which
the parallax detecting section performs parallax detection using a cost value calculated on the basis of the first luminance signal and the second luminance signal and a cost value calculated on the basis of the first color signal and the second color signal, and
the parallax detection control section causes the parallax detection to be performed on the basis of an integrated cost value resulting from integration of the two cost values in a synthesis ratio corresponding to the frequency detection result.

(9) The image processing device according to any one of (5) to (8), in which
the image generating section performs frequency detection on the basis of the first luminance signal and executes image quality improvement processing on the first color signal in accordance with the frequency detection result.

(10) The image processing device according to any one of (5) to (9), in which
the image generating section performs parallax compensation for the second luminance signal to generate a parallax-compensated second luminance signal, and synthesizes the first luminance signal with the parallax-compensated second luminance signal to improve image quality of the first luminance signal.

(11) The image processing device according to (10), in which
the image generating section sets a synthesis ratio between the first luminance signal and the parallax-compensated second luminance signal in accordance with a noise intensity of an imaging section generating the first imaging signal.

(12) The image processing device according to any one of (5) to (11), in which
the image generating section generates the first color signal by interpolation processing for a white pixel signal in the first imaging signal, demosaic processing using a pixel signal for the color component pixels and the white pixel signal resulting from the interpolation processing, and color space conversion on the signal resulting from the demosaic processing.

(13) The image processing device according to (12), in which
the image generating section uses a color ratio based on the white pixel signal resulting from the interpolation processing and the pixel signal for color component pixels and the white pixel signal for a processing target pixel, to generate a pixel signal for each color component of the processing target pixel.

(14) The image processing device according to any one of (5) to (13), in which
the image generating section executes the interpolation processing for the white pixel signal in the first imaging signal to generate a first luminance signal, and
the parallax detecting section performs parallax detection using the first imaging signal generated by the signal generating section by the interpolation processing for the white pixel signal.

(15) The image processing device according to any one of (1) to (14), in which
the first imaging signal is a signal including, within a 2×2-pixel block, the white pixels equal or larger in number to or than the color component pixels.

In addition, the imaging device of the present technology can have the following configuration.

(1) An imaging device including:
a first imaging section generating a first imaging signal corresponding to a first viewpoint and including white pixels and color component pixels,
a second imaging section generating a second imaging signal corresponding to a second viewpoint different from the first viewpoint and including fewer white pixels than the first imaging section to increase a rate of the color component pixels in the second imaging signal,
a parallax detecting section detecting a parallax of the second viewpoint with respect to the first viewpoint on the basis of the first imaging signal and the second imaging signal, and
an image generating section generating a color image using the first imaging signal and a parallax-compensated second imaging signal resulting from parallax compensation based on the parallax detected by the parallax detecting section.

(2) The imaging device according to (1), in which,
in the first imaging section, within a 2×2-pixel block, the white pixels provided are equal or larger in number to or than the color component pixels.

(3) The imaging device according to (1) or (2), in which
the color component pixels in the first imaging section are color component pixels in two colors of three primary colors.

(4) The imaging device according to any one of (1) to (3), in which
the second imaging section includes three-primary-color component pixels or the three-primary-color component pixels and white pixels.

INDUSTRIAL APPLICABILITY

In the image processing device and image processing method and the imaging device according to the present technology, a parallax of the second viewpoint with respect to the first viewpoint is detected on the basis of the first imaging signal for the first viewpoint and the second imaging signal for the second viewpoint different from the first viewpoint. In addition, the image generating section generates the color image using the first imaging signal and the parallax-compensated second imaging signal resulting from parallax compensation for the second imaging signal based on the parallax detected by the parallax detecting section. Furthermore, the first imaging signal includes white pixels and color component pixels, and the second imaging signal includes fewer white pixels than the first imaging signal to increase the number of the color component pixels in the second imaging signal. In this manner, with reference to the first imaging signal including more white pixels than the second imaging signal, the second imaging signal is fused to the first imaging signal with reference to the first imaging signal. This allows a high-sensitivity captured image to be obtained while suppressing degradation of image quality performance. Accordingly, the present technology is suitable for devices required to deliver high image quality performance while maintaining a low profile, for example, portable devices such as smartphones and in-vehicle devices.

REFERENCE SIGNS LIST

10 . . . Information processing terminal
21, 21-BW, 21-CR, 21-H, 21-C . . . Imaging section
30, 30-1 to 31-10 . . . Image processing section
31-H . . . Interpolation section
32, 32-H, 32-C . . . Demosaic processing section
33-C, 33-H . . . YUV converting section
34 . . . Frequency detecting section
35, 392, 422, 422a, 427, 427a . . . Coring processing section
36a, 36b, 36c . . . Parallax detecting section
37 . . . Parallax compensating section
38 . . . Fallback determining section
39 . . . Color image quality improving section
41 . . . Signal selecting section 42, 42a . . . Signal synthesizing section
43 . . . luminance image quality improving section
51 . . . Sensor section
52 . . . Communication section
53 . . . Display section
54 . . . Touch panel
55 . . . Operation section
56 . . . Storage section
56 . . . Recording section
60 . . . Control section
321b . . . Blue interpolation coefficient calculating section
321r . . . Red interpolation coefficient calculating section
322b . . . Blue component image generating section
322g . . . Green component image generating section
322r . . . Red component image generating section
361, 362, 363 . . . Cost calculating section
364 . . . Cost integrating section
365 . . . Cost minimization vector determining section
381 . . . Image feature amount calculating section
382 . . . Signal selection determining section
391 . . . Frequency detecting section
393 . . . Low-pass filter
394 . . . Synthesis processing section
412 . . . Signal selecting section
421 . . . Frequency detecting section
423, 424 . . . Low-pass filter
425 . . . Difference calculating section
426 . . . Absolute-value calculating section
428 . . . Synthesis ratio setting section
429 . . . Synthesis processing section

The invention claimed is:

1. An image processing device comprising:
a parallax detecting section detecting, on a basis of a first imaging signal for a first viewpoint and a second imaging signal for a second viewpoint different from the first viewpoint, a parallax of the second viewpoint with respect to the first viewpoint; and
an image generating section generating a color image using the first imaging signal and a parallax-compensated second imaging signal resulting from parallax compensation for the second imaging signal based on the parallax detected by the parallax detecting section,
wherein the first imaging signal includes white pixels and color component pixels, and the second imaging signal includes fewer white pixels and more color component pixels than the first imaging signal,
wherein the image generating section uses the first imaging signal and the parallax-compensated second imaging signal to generate the color image in a case where a predetermined condition is satisfied, and generates the color image from the first imaging signal in a case where the predetermined condition is not satisfied, and
wherein the parallax detecting section and the image generating section are each implemented via at least one processor.

2. The image processing device according to claim 1, wherein
the case where the predetermined condition is satisfied is such that, in a case where a risk that the color image generated using the first imaging signal and the parallax-compensated second imaging signal has degraded image quality performance compared to the color image generated from the first imaging signal is determined to be lower than a threshold.

3. The image processing device according to claim 2, wherein
the image generating section determines the risk of degradation of the image quality performance on a basis of the first imaging signal and the parallax-compensated second imaging signal, and synthesizes the first imaging signal with the parallax-compensated second imaging signal in a synthesis ratio corresponding to the determined risk.

4. An image processing device comprising:
a parallax detecting section detecting, on a basis of a first imaging signal for a first viewpoint and a second imaging signal for a second viewpoint different from the first viewpoint, a parallax of the second viewpoint with respect to the first viewpoint; and
an image generating section generating a color image using the first imaging signal and a parallax-compensated second imaging signal resulting from parallax compensation for the second imaging signal based on the parallax detected by the parallax detecting section,
wherein the first imaging signal includes white pixels and color component pixels, and the second imaging signal includes fewer white pixels and more color component pixels than the first imaging signal,
wherein the image generating section generates a first luminance signal and a first color signal from the first imaging signal, generates a second luminance signal and a second color signal from the second imaging signal, generates a parallax-compensated second color signal on a basis of the second color signal and the parallax detected by the parallax detecting section, and selects one of the first color signal and the parallax-compensated second color signal or synthesizes the first color signal and the parallax-compensated second color signal, in accordance with a risk that the color image generated using the parallax-compensated second imaging signal has degraded image quality performance compared to the color image generated from the first imaging signal,
wherein the parallax detecting section performs parallax detection using the first luminance signal and the second luminance signal, and
wherein the parallax detecting section and the image generating section are each implemented via at least one processor.

5. The image processing device according to claim 4, wherein,
in accordance with the risk, the image generating section selects one of the first color signal and the parallax-compensated second color signal in captured image units or synthesizes the first color signal and the parallax-compensated second color signal in pixel units.

6. The image processing device according to claim 4, wherein
the parallax detecting section performs the parallax detection using the first luminance signal and the second luminance signal and the first color signal and the second color signal.

7. The image processing device according to claim 6, comprising:
a parallax detection control section performing frequency detection on a basis of the first imaging signal and controlling the parallax detecting section in accordance with a detection result,
wherein the parallax detecting section performs the parallax detection using a first cost value calculated on a basis of the first luminance signal and the second luminance signal and a second cost value calculated on a basis of the first color signal and the second color signal, wherein the parallax detection control section causes the parallax detection to be performed on a basis of an integrated cost value resulting from integration of the first cost value and the second cost value in a synthesis ratio corresponding to a frequency detection result, and wherein the parallax detection control section is implemented via the at least one processor.

8. The image processing device according to claim 4, wherein
the image generating section performs frequency detection on a basis of the first luminance signal and executes image quality improvement processing on the first color signal in accordance with a frequency detection result.

9. The image processing device according to claim 4, wherein
the image generating section performs parallax compensation for the second luminance signal to generate a parallax-compensated second luminance signal, and synthesizes the first luminance signal with the parallax-compensated second luminance signal to improve image quality of the first luminance signal.

10. The image processing device according to claim 9, wherein
the image generating section sets a synthesis ratio between the first luminance signal and the parallax-compensated second luminance signal in accordance with a noise intensity of an imaging section generating the first imaging signal,
wherein the imaging section is implemented via the at least one processor.

11. The image processing device according to claim 4, wherein
the image generating section generates the first color signal by interpolation processing for a white pixel signal in the first imaging signal, demosaic processing using a pixel signal for the color component pixels and the white pixel signal resulting from the interpolation processing, and color space conversion on a signal resulting from the demosaic processing.

12. The image processing device according to claim 11, wherein
the image generating section uses a color ratio based on the white pixel signal resulting from the interpolation processing and the pixel signal for color component pixels and the white pixel signal for a processing target pixel, to generate the pixel signal for each color component of the processing target pixel.

13. The image processing device according to claim 4, wherein
the image generating section executes an interpolation processing for the white pixel signal in the first imaging signal to generate the first luminance signal, and
the parallax detecting section performs the parallax detection using the first imaging signal generated by the image generating section by the interpolation processing for the white pixel signal.

14. The image processing device according to claim 1, wherein
the first imaging signal is a signal including, within a 2×2-pixel block, the white pixels equal or larger in number to or than the color component pixels.

15. An image processing method comprising:
on a basis of a first imaging signal corresponding to a first viewpoint and including white pixels and color component pixels and a second imaging signal corresponding to a second viewpoint different from the first viewpoint and including fewer white pixels than the first imaging signal to increase a rate of the color component pixels in the second imaging signal, detecting a parallax of the second viewpoint with respect to the first viewpoint; and generating a color image using the first imaging signal and a parallax-compensated second imaging signal resulting from parallax compensation based on the detected parallax, wherein the first imaging signal and the parallax-compensated second imaging signal are used to generate the color image in a case where a predetermined condition is satisfied, and the color image from the first imaging signal is used in a case where the predetermined condition is not satisfied.

16. An imaging device comprising:
a first imaging section generating a first imaging signal corresponding to a first viewpoint and including white pixels and color component pixels,
a second imaging section generating a second imaging signal corresponding to a second viewpoint different from the first viewpoint and including fewer white pixels than the first imaging section to increase a rate of the color component pixels in the second imaging signal,
a parallax detecting section detecting a parallax of the second viewpoint with respect to the first viewpoint on a basis of the first imaging signal and the second imaging signal, and
an image generating section generating a color image using the first imaging signal and a parallax-compensated second imaging signal resulting from parallax compensation based on the parallax detected by the parallax detecting section,
wherein the image generating section uses the first imaging signal and the parallax-compensated second imaging signal to generate the color image in a case where a predetermined condition is satisfied, and generates the color image from the first imaging signal in a case where the predetermined condition is not satisfied, and
wherein the first imaging section, the second imaging section, the parallax detecting section, and the image generating section are each implemented via at least one processor.

17. The imaging device according to claim 16, wherein
in the first imaging section, within a 2×2-pixel block, the white pixels provided are equal or larger in number to or than the color component pixels.

18. The imaging device according to claim 16, wherein
the color component pixels in the first imaging section are the color component pixels in two colors of three primary colors.

19. The imaging device according to claim 16, wherein
the second imaging section includes three-primary-color component pixels or three-primary-color component pixels and the white pixels.

* * * * *